US012589048B2

(12) United States Patent　　(10) Patent No.:　US 12,589,048 B2

Kaiser et al.　　(45) Date of Patent:　Mar. 31, 2026

(54) ANATOMICAL SHOULDER RANGE OF MOTION DEVICE

(71) Applicant: Physiohab LLC, Sunrise, FL (US)

(72) Inventors: Robert T. Kaiser, West Grove, PA (US); Eduardo M. Marti, Sunrise, FL (US)

(73) Assignee: PHYSIOHAB LLC, Sunrise, FL (US)

( * ) Notice: Subject to any disclaimer, the term of this patent is extended or adjusted under 35 U.S.C. 154(b) by 561 days.

(21) Appl. No.: 18/073,271

(22) Filed: Dec. 1, 2022

(65) Prior Publication Data

US 2023/0165744 A1　　Jun. 1, 2023

Related U.S. Application Data

(60) Provisional application No. 63/285,025, filed on Dec. 1, 2021.

(51) Int. Cl.
A61H 1/02　　(2006.01)
F16H 27/08　　(2006.01)

(52) U.S. Cl.
CPC ........... A61H 1/0281 (2013.01); F16H 27/08 (2013.01); *A61H 2001/0203* (2013.01)

(58) Field of Classification Search
None
See application file for complete search history.

(56) References Cited

U.S. PATENT DOCUMENTS 2,883,982 A　　4/1959　Rainey
4,310,154 A　　1/1982　Kauffman 4,671,257 A　　6/1987　Kaiser et al.
4,691,694 A　　9/1987　Boyd et al.
4,825,852 A　　5/1989　Genovese et al.
(Continued)

FOREIGN PATENT DOCUMENTS

WO　　2022047398 A1　　3/2022

OTHER PUBLICATIONS

Kinetec® Centura™ Shoulder CPM, Global Industrial, downloaded from web page: <https://globalindustrial.com/p/medical-lab/physical-therapy/modalities/shoulder-cpm>, Download date: Aug. 20, 2020, original posting date: unknown, 1 page.

(Continued)

*Primary Examiner* — LaToya M Louis
(74) *Attorney, Agent, or Firm* — Panitch Schwarze Belisario & Nadel LLP

(57)　　　ABSTRACT

A shoulder range of motion machine includes a stationary base frame and a shoulder-manipulation mechanism including a movable base frame supported on the stationary base frame for at least pivoting motion about a main vertical axis. A horizontal linear actuator is configured to drive the movable base frame in at least pivoting motion with respect to the stationary base frame about the main vertical axis. A vertical support is mounted on the movable base frame. An arm-carrier support is mounted on the vertical support for at least pivoting motion about a main horizontal axis. An arm-carrier-angle linear actuator is configured to drive the arm-carrier support in at least pivoting motion with respect to the vertical support about the main horizontal axis. An arm carrier is mounted on the arm-carrier support. A controller is operatively connected to at least one of the horizontal linear actuator or the arm-carrier-angle linear actuator.

18 Claims, 36 Drawing Sheets

(56) References Cited

U.S. PATENT DOCUMENTS

| | | | |
|---|---|---|---|
| 4,834,073 | A | 5/1989 | Bledsoe et al. |
| 4,863,499 | A | 9/1989 | Osendorf |
| 4,869,499 | A | 9/1989 | Schiraldo |
| 4,873,967 | A | 10/1989 | Sutherland |
| 4,890,607 | A | 1/1990 | Townsend |
| 4,905,676 | A | 3/1990 | Bond et al. |
| 5,052,375 | A | 10/1991 | Stark et al. |
| 5,167,612 | A | 12/1992 | Bonutti |
| 5,179,939 | A | 1/1993 | Donovan et al. |
| 5,209,223 | A | 5/1993 | McGorry et al. |
| 5,213,094 | A | 5/1993 | Bonutti |
| 5,230,696 | A | 7/1993 | Silver et al. |
| 5,239,987 | A | 8/1993 | Kaiser et al. |
| 5,399,147 | A | 3/1995 | Kaiser |
| 5,403,251 | A | 4/1995 | Belsito et al. |
| 5,683,351 | A | 11/1997 | Kaiser et al. |
| 5,848,979 | A | 12/1998 | Bonutti et al. |
| 5,951,499 | A | 9/1999 | Saringer et al. |
| 6,007,500 | A | 12/1999 | Quintinskie, Jr. |
| 6,113,562 | A | 9/2000 | Bonutti et al. |
| 6,155,994 | A | 12/2000 | Hubbard et al. |
| 6,267,735 | B1 | 7/2001 | Blanchard et al. |
| 6,309,368 | B1 | 10/2001 | Herzberg et al. |
| 6,669,660 | B2 | 12/2003 | Branch |
| 6,695,795 | B2 | 2/2004 | Knoll |
| 6,702,768 | B2 | 3/2004 | Mano et al. |
| 6,872,186 | B2 | 3/2005 | Branch et al. |
| 6,872,187 | B1 | 3/2005 | Stark et al. |
| 6,984,197 | B2 | 1/2006 | Sugiyama et al. |
| 7,108,664 | B2 | 9/2006 | Mason et al. |
| 7,112,179 | B2 | 9/2006 | Bonutti et al. |
| 7,204,814 | B2 | 4/2007 | Peles |
| 7,452,342 | B2 | 11/2008 | Bonutti et al. |
| 7,479,121 | B2 | 1/2009 | Branch |
| 7,547,289 | B2 | 6/2009 | Branch |
| 7,665,167 | B2 | 2/2010 | Branch et al. |
| 7,686,775 | B2 | 3/2010 | Branch |
| 7,695,416 | B2 | 4/2010 | Weiner |
| 7,874,996 | B2 | 1/2011 | Weinstein et al. |
| 7,955,286 | B2 | 6/2011 | Bonutti et al. |
| 7,981,067 | B2 | 7/2011 | Bonutti et al. |
| 7,985,227 | B2 | 7/2011 | Branch et al. |
| 8,012,108 | B2 | 9/2011 | Bonutti et al. |
| 8,066,656 | B2 | 11/2011 | Bonutti et al. |
| 8,206,329 | B2 | 6/2012 | Bonutti et al. |
| 8,273,043 | B2 | 9/2012 | Bonutti et al. |
| 8,287,479 | B2 | 10/2012 | Bonutti et al. |
| 8,361,002 | B2 | 1/2013 | Branch |
| 8,591,441 | B2 | 11/2013 | Bonutti et al. |
| 8,591,443 | B2 | 11/2013 | Bonutti et al. |
| 8,784,343 | B2 | 7/2014 | Bonutti et al. |
| 8,814,816 | B2 | 8/2014 | Bonutti et al. |
| 8,840,570 | B2 | 9/2014 | Branch et al. |
| 8,905,950 | B2 | 12/2014 | Bonutti et al. |
| 8,920,346 | B2 | 12/2014 | Bonutti et al. |
| 9,248,041 | B2 | 2/2016 | Bonutti et al. |
| 9,289,157 | B2 | 3/2016 | Branch et al. |
| 9,314,392 | B2 | 4/2016 | Bonutti et al. |
| 9,320,669 | B2 | 4/2016 | Bonutti et al. |
| 9,333,107 | B2 | 5/2016 | Potter et al. |
| 9,345,606 | B2 | 5/2016 | Bonutti et al. |
| 9,408,771 | B2 | 8/2016 | Branch et al. |
| 9,445,966 | B2 | 9/2016 | Bonutti et al. |
| 9,468,578 | B2 | 10/2016 | Bonutti et al. |
| 9,572,702 | B2 | 2/2017 | Bonutti et al. |
| 9,610,038 | B2 | 4/2017 | Branch et al. |
| 9,669,249 | B2 | 6/2017 | Marti et al. |
| 9,744,091 | B2 | 8/2017 | Branch et al. |
| 9,744,092 | B2 | 8/2017 | Fu et al. |
| 9,814,411 | B2 | 11/2017 | Branch et al. |
| 9,873,010 | B2 | 1/2018 | Marti et al. |
| 9,931,263 | B2 | 4/2018 | Branch et al. |
| 9,980,871 | B2 | 5/2018 | Bonutti et al. |
| 10,159,591 | B2 | 12/2018 | Bonutti et al. |
| 10,220,234 | B2 | 3/2019 | Marti et al. |
| 10,293,198 | B2 | 5/2019 | Marti et al. |
| 10,307,319 | B2 | 6/2019 | Bonutti et al. |
| 10,383,578 | B2 | 8/2019 | Branch et al. |
| 10,456,314 | B2 | 10/2019 | Bonutti et al. |
| 10,603,240 | B2 | 3/2020 | Branch et al. |
| 10,667,938 | B2 | 6/2020 | Bonutti et al. |
| 10,702,734 | B2 | 7/2020 | Pompile et al. |
| 10,765,901 | B2 | 9/2020 | Radcliffe et al. |
| 10,779,984 | B2 | 9/2020 | Bonutti et al. |
| 10,842,439 | B2 | 11/2020 | Branch et al. |
| 11,123,212 | B2 | 9/2021 | Bonutti et al. |
| 11,161,002 | B2 | 11/2021 | Radcliffe et al. |
| 11,712,389 | B1 | 8/2023 | Branch et al. |
| 2005/0197605 | A1 | 9/2005 | Bonutti et al. |
| 2005/0202943 | A1 | 9/2005 | Branch et al. |
| 2005/0273022 | A1 | 12/2005 | Diaz et al. |
| 2007/0062987 | A1 | 3/2007 | Murakami |
| 2007/0265634 | A1 | 11/2007 | Weinstein |
| 2008/0188356 | A1 | 8/2008 | Bonutti et al. |
| 2009/0137369 | A1 | 5/2009 | Branch et al. |
| 2009/0143708 | A1 | 6/2009 | Branch |
| 2009/0264799 | A1 | 10/2009 | Bonutti et al. |
| 2010/0010396 | A1 | 1/2010 | Branch |
| 2010/0229874 | A1 | 9/2010 | Branch |
| 2010/0288802 | A1 | 11/2010 | Sakanishi |
| 2011/0166489 | A1 | 7/2011 | Angold et al. |
| 2012/0143103 | A1 | 6/2012 | Branch et al. |
| 2013/0060171 | A1 | 3/2013 | Fu et al. |
| 2013/0237883 | A1 | 9/2013 | Malosio et al. |
| 2014/0094721 | A1 | 4/2014 | Diallo |
| 2014/0358042 | A1 | 12/2014 | Branch et al. |
| 2015/0286117 | A1 | 10/2015 | Sung et al. |
| 2015/0297934 | A1 | 10/2015 | Agrawal et al. |
| 2015/0351990 | A1 | 12/2015 | Ewing |
| 2015/0360069 | A1 | 12/2015 | Marti et al. |
| 2017/0347963 | A1 | 12/2017 | Branch et al. |
| 2018/0133545 | A1 | 5/2018 | Marti et al. |
| 2018/0333096 | A1 | 11/2018 | Branch et al. |
| 2018/0333318 | A1 | 11/2018 | Branch et al. |
| 2019/0111299 | A1 | 4/2019 | Radcliffe et al. |
| 2019/0192370 | A1 | 6/2019 | Branch et al. |
| 2019/0343705 | A1 | 11/2019 | Bonutti et al. |
| 2019/0365329 | A1 | 12/2019 | Branch et al. |
| 2021/0038417 | A1 | 2/2021 | Marti |
| 2021/0038940 | A1 | 2/2021 | Marti |
| 2021/0038941 | A1 | 2/2021 | Marti |
| 2022/0175567 | A1 | 6/2022 | Bonutti et al. |
| 2022/0331188 | A1 | 10/2022 | Stinton et al. |
| 2023/0165744 | A1 | 6/2023 | Kaiser et al. |
| 2023/0270613 | A1 | 8/2023 | Dan et al. |
| 2024/0065917 | A1 | 2/2024 | Stinton et al. |
| 2024/0216741 | A1 | 7/2024 | Branch et al. |

OTHER PUBLICATIONS

DJO Global OptiFlex S Shoulder CPM Unit, DJO Global, downloaded from web page: <https://4mdmedical.com/catalog/product/view/id/284372/?CAWELAID=1201413100000056386>, Download date: Aug. 20, 2020, original posting date: unknown, 2 pages.

ANATOMICAL SHOULDER RANGE OF MOTION DEVICE

CROSS-REFERENCE TO RELATED APPLICATIONS

This application claims the benefit of priority under 35 USC § 119 (e) of U.S. Provisional Patent Application No. 63/285,025 filed Dec. 1, 2021, the contents of which are incorporated herein by reference.

BACKGROUND OF THE DISCLOSURE

The present disclosure relates generally to a system or device for moving or exercising a shoulder of a user, and more particularly relates to a device for imposing a variety of conditions, including but not limited to stretching or range-of-motion conditions, upon the shoulder of the user. This system or device will be referenced herein as a "SROM machine" (shoulder range of motion machine). The present disclosure also relates to a method of using the SROM machines disclosed herein to impose loading or movement on the shoulder of the user.

SUMMARY OF THE DISCLOSURE

Briefly stated, an example of a shoulder range of motion machine comprises a stationary base frame and a shoulder-manipulation mechanism. The shoulder-manipulation mechanism includes a movable base frame at least pivotally supported on the stationary base frame for at least pivoting motion with respect to the stationary base frame about a main vertical axis. A horizontal linear actuator has a proximal portion and a distal portion. The proximal portion is secured to the stationary base frame, and the distal portion is attached to the movable base frame and configured to drive the movable base frame in at least pivoting motion with respect to the stationary base frame about the main vertical axis. A vertical support is mounted on the movable base frame and extends vertically with respect thereto. An arm-carrier support is at least pivotably mounted on the vertical support for at least pivoting motion with respect to the vertical support about a main horizontal axis. An arm-carrier-angle linear actuator has a lower end portion and an upper portion. The lower end portion is secured to the vertical support, and the upper portion is attached to the arm-carrier support and configured to drive the arm-carrier support in at least pivoting motion with respect to the vertical support about the main horizontal axis. An arm carrier is mounted on the arm-carrier support. A controller is operatively connected to at least one of the horizontal linear actuator or the arm-carrier-angle linear actuator to control extension and contraction thereof.

BRIEF DESCRIPTION OF THE SEVERAL VIEWS OF THE DRAWINGS

The following detailed description will be better understood when read in conjunction with the appended drawings. For the purpose of illustrating the invention, there are shown in the drawings various embodiments, including embodiments which may be presently preferred. It should be understood, however, that the invention is not limited to the precise arrangements and instrumentalities shown. In the drawings.

DETAILED DESCRIPTION OF THE INVENTION

Figure 1:
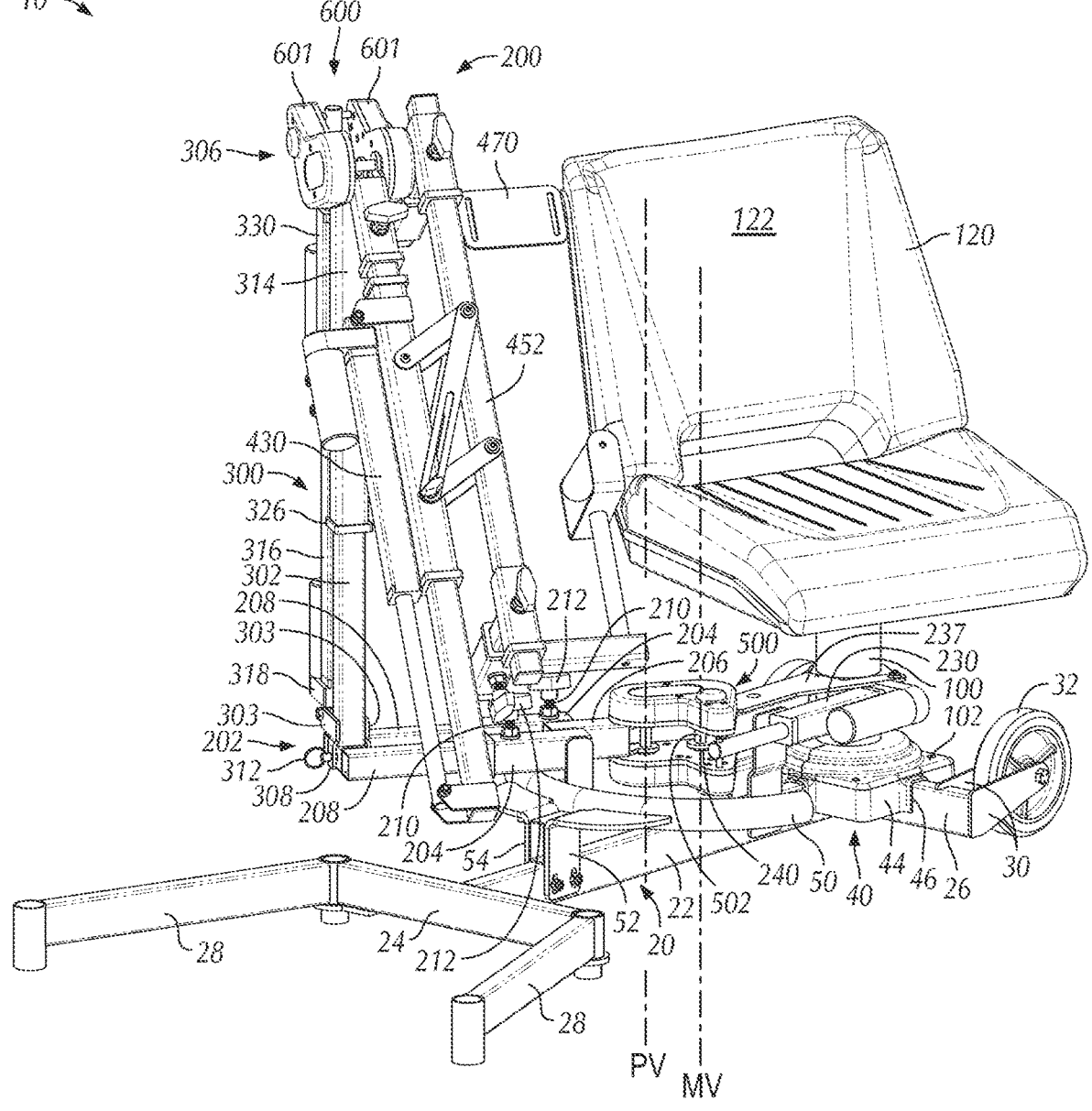
FIG. 1 is a front right perspective view of a SROM machine, arranged to manipulate a right shoulder of a user, with the various elements thereof aligned in a first configuration, according to a first embodiment of the present disclosure.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an object and designated parts thereof. Unless specifically set forth otherwise herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. As used herein, the terms "proximal" and "distal" are relative terms referring to locations or elements that are closer to (proximal) or farther from (distal) with respect to other elements, the user, or designated locations. "Including" as used herein means "including but not limited to." The word "or" is inclusive, so that "A or B" encompasses A and B, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. "At least pivoting movement," "at least pivotably connected," and "at least pivotable connection," and similar phrases, used with respect to two elements mean that the elements are configured or attached for movement with respect to each other, with the movement encompassing pivoting alone or pivoting in combination with another type of relative movement such as, for example, sliding and/or revolution at a distance about a common axis. The terminology set forth in this paragraph includes the words noted above, derivatives thereof, and words of similar import. The devices and methods disclosed herein are disclosed as imposing a movement or a load upon a shoulder or an arm of a user. From the standpoint of the disclosed devices and methods, any mechanism, configuration, or step involving imposing a desired load is interchangeable with the same mechanism, configuration, or step used to impose a desired movement; and any mechanism, configuration, or step involving imposing a desired movement is interchangeable with the same mechanism, configuration, or step used to impose a desired load.

Figure 2:
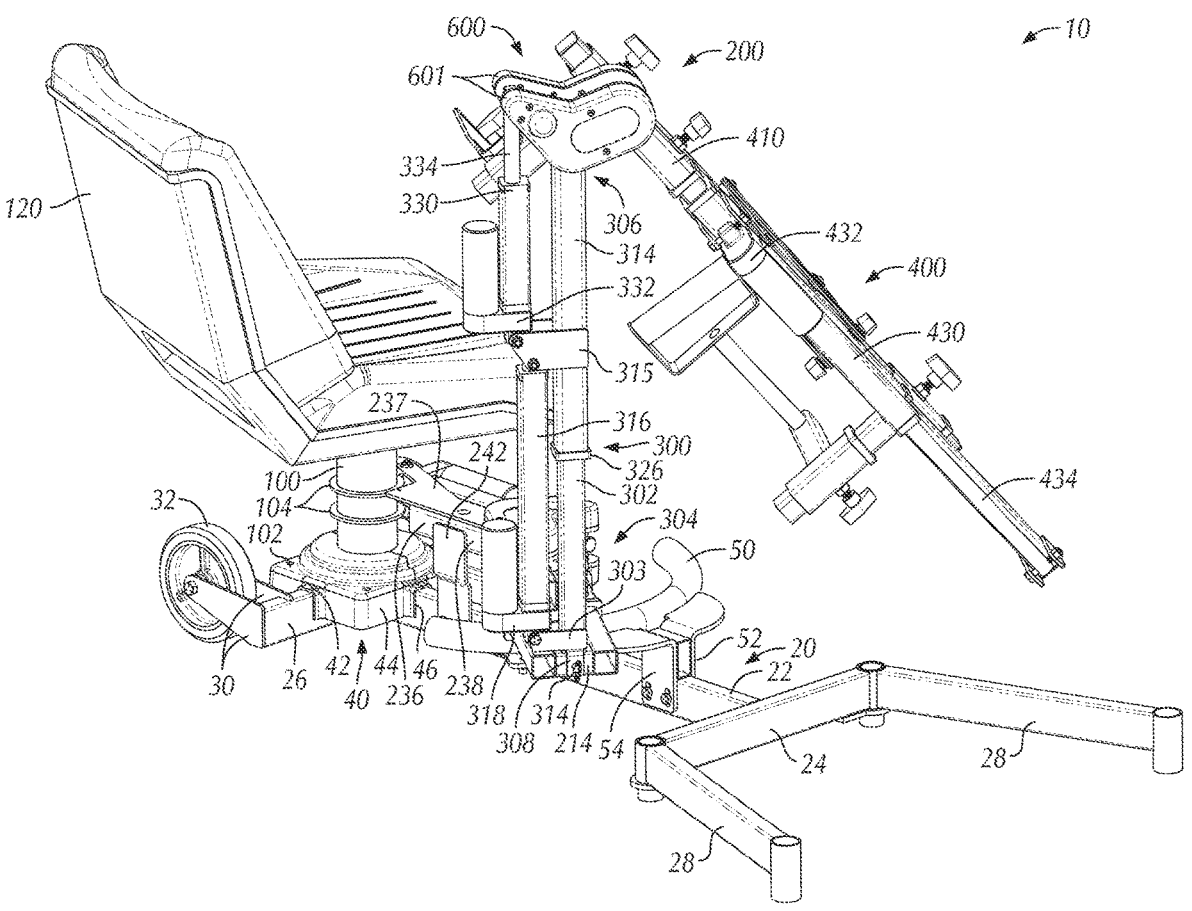
FIG. 2 is a rear right perspective view of the SROM machine of FIG. 1 in the first configuration of FIG. 1.

In one aspect, referring to FIGS. 1-44, a SROM machine 10 is disclosed, with FIGS. 1 and 2 being the most detailed views of the complete SROM machine 10. Referring to FIGS. 1 and 2, the SROM machine 10 includes a stationary base, which may take the form of a stationary base frame 20, which may rest upon or be connected to a support surface (not shown), most commonly a floor such as a floor of a building. Note that here the "stationary" base, in the illustrated embodiment the stationary base frame 20, is stationary during use of the SROM machine 10, despite the SROM machine 10 illustrated as being movable when not in use, as discussed below. The stationary base frame 20 may comprise a main beam 22, a first transverse beam 24, and a second transverse beam 26. The first transverse beam 24 may include one or more stabilizer arms 28, which may be pivotably (as shown) or otherwise movably attached to the first transverse beam 24. The stabilizer arms 28 may be pivoted to extend outwardly from the first transverse beam 24 to stabilize the SROM machine 10, and may be pivoted to extend inwardly to render the stationary base frame 20 of the SROM machine 10 more compact for storage or movement. The stationary base frame 20, and, for example, the second transverse beam 26 thereof, may include mounting plates 30 or other suitable hardware by which wheels 32 may be mounted to support the SROM machine 10 and to permit movement of the SROM machine 10 on the support surface.

Figure 42:
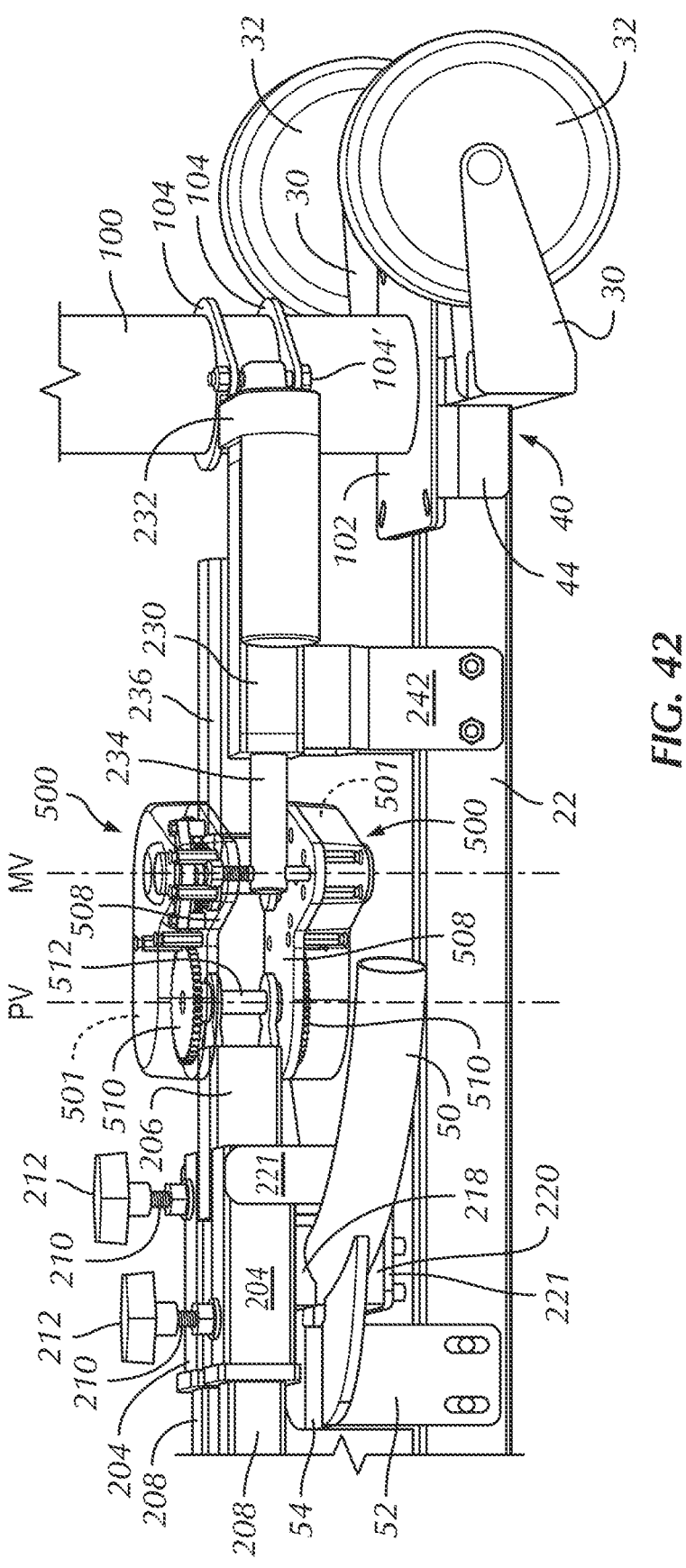
FIG. 42 is a front upper perspective detail view of a lower geared hinge connecting a movable base frame and a support post connected to a stationary base frame of the SROM machine of FIG. 1.

Referring to FIGS. 1, 2, and 42, a support base may be attached to the stationary base frame 20 and may take the form of a support post 100. In the illustrated embodiment, the support post 100 is tubular and is attached to a mounting base 102. The support base and in particular the support post 100 may be attached to the stationary base frame 20 by the mounting base 102 being fixed to a saddle 40. The saddle 40 may in turn be attached to the stationary base frame 20—for example, to the second transverse beam 26 and/or to the main beam 22, as shown. The saddle 40 may include a generally horizontal base plate 42 (FIG. 2) with at least a pair of downwardly extending side plates 44. Each side plate 44 may include a slot 46 fitted to and engaging the second transverse beam 26 or the main beam 22. The saddle 40 thus may be stably supported on the second transverse beam 26 and/or the main beam 22 of the stationary base frame 20. The mounting plate 102 and the base plate 42 may have aligned apertures to facilitate attachment of the mounting plate 102 and the base plate 42 by way of bolts and nuts or by other suitable fasteners (not shown). The support post 100 or other support base may have one or more anchors such as collars 104 (two are shown) fixed thereto and providing a mounting point for components of the SROM machine 10 to be connected to the support post 100, and thus to the stationary base frame 20.

The support post 100 may comprise a fixed support post or a telescoping support post; a telescoping support post (if provided) may be supported by a pneumatic cylinder, spring, or other biasing device (not shown) and may be secured at a selected height in conventional fashion. The support post 100 may support, and in particular may rotatably support, a seat 120 for supporting a user 130; the user 130 is shown in phantom in FIGS. 3-28. The seat 120 may preferably include a backrest 122 and may preferably be rotatable upon the support post 100 so that the user 130 may be seated in a desired orientation with the back of the user 130 supported. The seat 120 may be rotatable so as to be capable of being oriented with a right or left arm of the user 130 being positioned on a corresponding side of the body of the user 130 as a shoulder-manipulation mechanism 200 of the SROM machine 10. Alternatively, a seat used with the SROM machine 10 may not be attached to the stationary base frame 20 and may instead be a folding chair or other seat provided separately.

Referring again to FIG. 1, the shoulder-manipulation mechanism 200 may include a movable base frame 202. The movable base frame 202 may support a vertical support 300 and attached elements, as described below. Referring to FIGS. 1, 2, and 42, the movable base frame 202 may include a pair of tubular base members 204, which may be held, as in the illustrated embodiment, in parallel and spaced relation to one another by being fixed to a central base member 206 (FIGS. 1 and 42). The central base member 206 in this aspect acts as a spacer between the tubular base members 204. Each tubular base member 204 may slidably and lockably engage an indexing member 208. The indexing members 208 (FIGS. 1, 42) may be released, adjusted, and locked in position with respect to the tubular base members 204. Locking may occur by frictional engagement of locking bolts 210 (FIGS. 1, 42), each of which may include a knob 212. As a result of the sliding-and-locking relationship between the tubular base members 204 and the indexing members 208, the SROM machine 10 provides for adjustment of the length of the movable base frame 202 and provides for the placement of elements supported by the indexing members 208. As a result, the location of the vertical support 300 and attached elements of the shoulder-manipulation mechanism 200 with respect to a main vertical axis of rotation MV of the shoulder-manipulation mechanism 200 may be adjusted. The indexing members 208 may be held in spaced relation to one another by each being fixed to a spacing member 214 (FIG. 2). In combination, the base members 204, the central base member 206, the indexing members 208, and the spacing member 214 may provide the movable base frame 202 a rectangular shape with a lockably adjustable length. This configuration may allow the vertical support 300 and attached elements of the shoulder-manipulation mechanism 200 to be supported stably yet adjustably with respect to the stationary base frame 20.

Continuing to refer to FIGS. 1, 2, and 42, the movable base frame 202 may be at least pivotably connected to the stationary base frame 20 and supported on the stationary base frame 20. The movable base frame 202 may be pivotably connected to the stationary base frame 20 or may be connected to the stationary base frame 20 so as to be capable of other movements with respect to the stationary base frame, such as pivoting and translation in combination, or pivoting and revolution along an essentially circular path, in combination. A support rail 50 may be fixed to the stationary base frame 20 by support-rail brackets 52, 54 welded or otherwise fixed to, for example, the main beam 22, as in the illustrated embodiment.

Referring to FIGS. 1, 2, and 42, the support rail 50 may be engaged with and may support the movable base frame 202 on the stationary base frame 20 and in particular may support the tubular base members 204 of the movable base frame 202. Referring to FIG. 42, an upper wear strip 218 or other contact surface may be included on the movable base frame 202 to provide an easily movable or sacrificial element as a contact surface between the movable base frame 202 and the support rail 50. The movable base frame 202 may also include a lower wear strip 220 engaging the support rail 50 from below and may also provide an easily movable and/or sacrificial element as a contact surface between the movable base frame 202 and the support rail 50 for guiding the movement of the movable base frame 202 along the support rail 50. The lower wear strip 220 may be attached to one of the tubular base members 204 of the movable base frame 202 by a wear-strip bracket 221 (FIG. 42) attached to and extending downwardly from the tubular base members 204 to support the lower wear strip below the support rail 50. Together the upper wear strip 218 and the lower wear strip 220 may slidingly engage the support rail 50 from opposite directions and may stably support or guide the movable base frame 202 to move in a curved path along the support rail 50 with respect to the stationary base frame 20. Although the upper wear strip 218 and the lower wear strip 220 may be provided to enable the functions described above, the movable base frame 202 may engage the support rail 50 from other orientations or directions, with the support rail 50 providing support or guidance with respect to the movement of the movable base frame 202 along the support rail 50.

Figure 43:
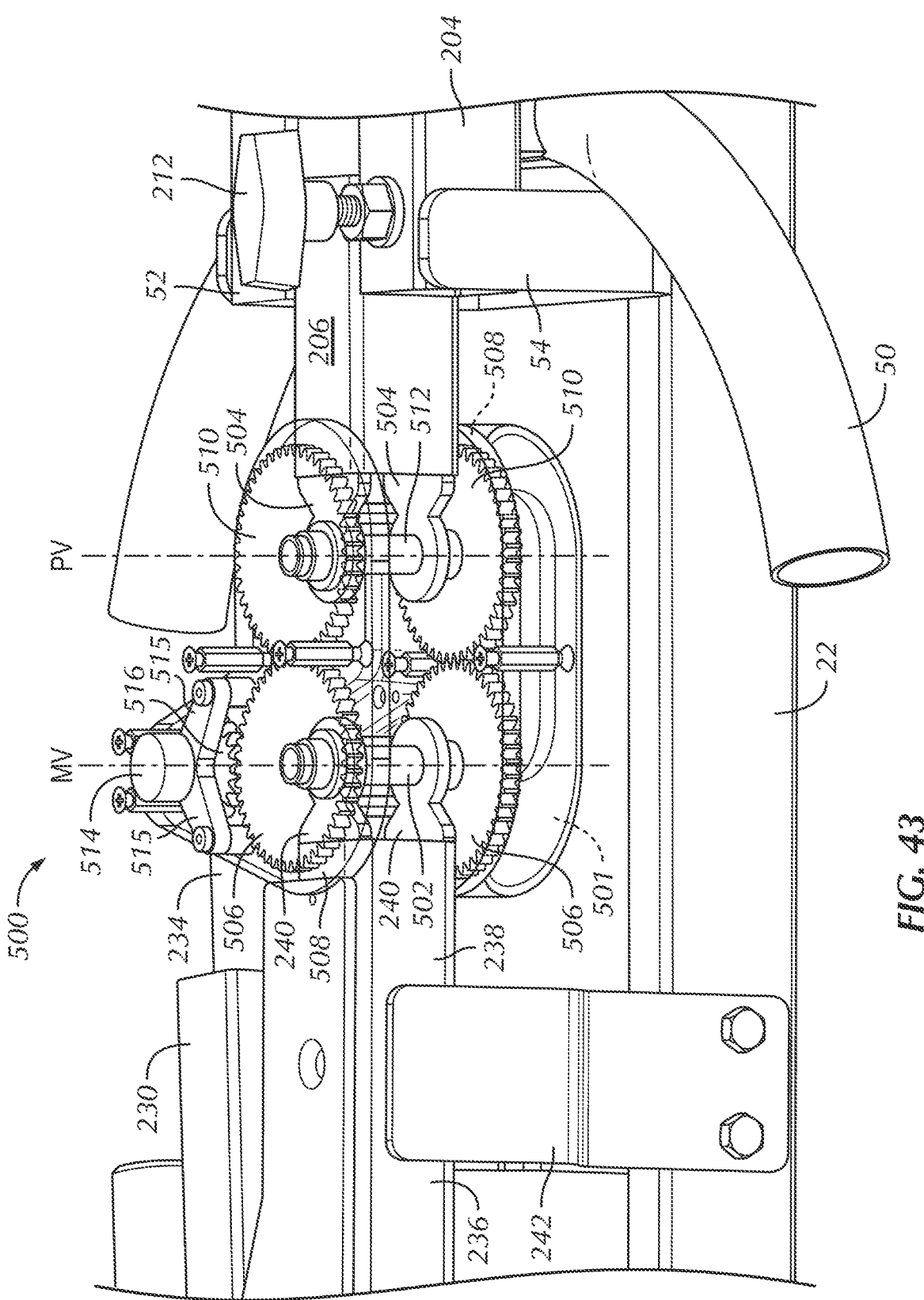
FIG. 43 is a rear upper perspective detail view of the lower geared hinge connecting the movable base frame to the stationary base frame of the SROM machine of FIG. 1.

Referring to FIGS. 1, 42, and 43, the central base member 206 of the movable base frame 202 may extend from between the tubular base members 204 generally toward the support post 100, in a proximal direction (or proximally) with respect to the user 130 (FIGS. 3-26) seated on the seat 120. At a proximal portion of the central base member 206, the central base member 206 may be at least pivotably attached to the stationary base frame 20 by components that may include a lower geared hinge 500 attached to the central base member 206 and attached (through intervening components in the illustrated embodiment) to the stationary base frame 20. As described previously, in the illustrated embodiment, the stationary base frame 20 may have the support post 100 attached thereto. Two collars 104 may be attached to the stationary base frame 20 via the support post 100. The support post 100 and the collars 104 may secure a horizontal linear actuator 230 to the stationary base frame 20. The horizontal linear actuator 230 may have a proximal portion 232 and a distal portion 234 and may be pivotably attached to the collars 104 by a bolt 104' passing through mounting holes in each collar 104 and the proximal portion 232 of the horizontal linear actuator 230. The distal portion 234 of the horizontal linear actuator 230 may be pivotably attached to and may be configured to exert a force on the movable base frame 202 and to be capable of driving the movable base frame 202 at least in rotation or in at least pivoting movement with respect to the stationary base frame 20, via the lower geared hinge 500. The horizontal linear actuator 230 may be operatively connected to a position sensor (not shown), which may be connected (by, for example, a wired or wireless connection) to a controller 1000 (FIG. 44; discussed below) to provide information about the angular position of the shoulder-manipulation mechanism 200 and the components thereof to the controller 1000.

As shown in FIGS. 1-28 in solid lines, and shown as a transparent body in FIGS. 42 and 43 for clarity, the lower geared hinge 500 may include one or more covers 501 for protectively covering the gears and shafts thereof. The upper cover 501 is omitted from FIG. 43 for clarity. Referring to FIG. 43, a rear upper perspective detail view, the lower geared hinge 500 may at least pivotably connect the movable base frame 202 to the stationary base frame 20. An anchor such as an anchor tube 236 (FIGS. 2, 42, and 43) may be attached to the stationary base frame 20 by anchor-tube brackets 242. The anchor tube 236 may have two collars 240 (FIG. 43) non-rotatably mounted to a distal portion 238 thereof. An anchor-tube-collar link 237 (omitted from FIGS. 42 and 43 for clarity) may be attached to the anchor tube 236 and to the at least one collar 104.

Referring to FIGS. 42 and 43, the lower geared hinge 500 may comprise a main shaft 502 (FIG. 43), which may be non-rotatably attached to the anchor tube 236 by being non-rotatably attached to the collars 240. The lower geared hinge 500 may include a sun gear 506 (two are shown, with the upper gear 506 being shown as transparent for clarity), with each sun gear 506 being non-rotatably attached the main shaft 502 (for example, to end portions of the main shaft 502), with the result being that the sun gears 506 are non-rotatably attached to the anchor tube 236. The lower geared hinge 500 may include two carrier plates 508, which may be rotatably attached to the main shaft 502 in parallel and spaced relation to one another to rotate together about the main shaft 502. The carrier plates 508 may be joined by screws, pins, or another suitable connection. Together the carrier plates 508, together with any such connection, may be considered to form a carrier body. At least one carrier plate 508 may be connected to the distal portion 234 of the horizontal linear actuator 230, with the location of the connection being offset from the main shaft 502, so that extension or contraction of the horizontal linear actuator 230 rotates the carrier plates 508 about a main vertical axis MV of the main shaft 502. The main vertical axis MV may be oriented essentially vertically. A planet shaft 512 may extend between the carrier plates 508 and may be rotatably mounted with respect to the carrier plates 508 and the carrier body formed thereby. The planet shaft 512 may include a shoulder or other structure to hold the carrier plates 508 in spaced relation to one another; alternatively, another structural element such as a tubular spacer may be employed to do so. A planet gear 510 (two are shown) may be non-rotatably mounted with respect to the planet shaft 512; and each of the two planet gears 510 thus may be non-rotatably mounted with respect to the other planet gear 510, while being rotatably mounted with respect to the carrier plates 508 and the carrier body formed thereby. Each planet gear 510 may be engaged with and may mesh with a corresponding one of the sun gears 506. The central base member 206 of the movable base frame 202 may also be non-rotatably mounted to the planet shaft 512 by one or more collars (two collars 504 are shown), and may be welded or otherwise fixed to the collars 504. When the horizontal linear actuator 230 extends or contracts, the force of the horizontal linear actuator 230, acting at a distance from the main shaft 502, may apply a torque causing the carrier plates 508 to rotate about the main shaft 502; and the meshing of the sun gears 506 with the planet gears 510 may cause the planet gears 510, the planet shaft 512, the central base member 206, and ultimately the movable base frame 202 to rotate about a planet vertical axis PV of the planet shaft 512. The planet vertical axis PV may be oriented essentially vertically. The planet shaft 512, in addition to rotating about the planet vertical axis PV, may revolve following a radial path about the main vertical axis MV, with the radius of the path being the sum of the radii of the sun gears 506 and the planet gears 510, providing an additional component of movement of an arm-carrier support 400 (described below) as compared to a pure rotational movement.

Referring to FIG. 43, the lower geared hinge 500 may include a sensor such as an electronic or electromechanical sensor configured to sense the angular position of the lower geared hinge 500. In the illustrated embodiment, the sensor includes a potentiometer 514, which is secured to the carrier plate 508 by mounting brackets 515. The potentiometer 514 may be coupled to a potentiometer gear 516, which in turn may be rotatably mounted to one of the carrier plates 508 and may be engaged with the sun gear 506. The potentiometer 514 may be thus arranged to sense the angular position of the lower geared hinge 500, along with changes of the angular position. Data describing the angular position may be processed to derive an angular velocity and an angular acceleration of the lower geared hinge 500.

As a result of the operation of the horizontal linear actuator 230, the above-described mechanism may rotate the movable base frame 202 about the planet vertical axis PV and at the same time may revolve the movable base frame 202 about the main vertical axis MV. The vertical support 300 and attached elements of the shoulder-manipulation mechanism 200 may be releasably coupled to the movable base frame 202. When the vertical support 300 and attached elements of the shoulder-manipulation mechanism 200 are coupled to the movable base frame 202, the orientation of the vertical support 300 and attached elements with respect to the movable base frame 202 is fixed. Thus the vertical support 300 and attached elements of the shoulder-manipulation mechanism 200 undergo the same type of motion as the movable base frame 202, and the vertical support 300 and attached elements of the shoulder-manipulation mechanism 200 may be configured move an arm of the user 130 to rotate the corresponding shoulder of the user 130 in internal or external rotation, with the shoulder also revolving about the main vertical axis MV. This combination of rotation and revolution is compatible with a natural motion of the arm and shoulder of the user 130. In addition, the combination of rotation and revolution, as provided by the geared hinge 500, results in an increase in angular rotation of the vertical support 300 and attached elements of the shoulder-manipulation mechanism 200 relative to the stationary base frame 20 for a given change of length of the horizontal linear actuator 230, as compared to the angular movement that would be achieved if the movable base frame 202 were simply rotatably attached via a pin or the like to the stationary base frame 20, without employing the geared hinge 500. Nevertheless, the geared hinge 500 could be replaced with a simple rotating connection such as a pinned joint, with a reduction in range of motion and mechanical advantage compared to the geared hinge 500.

As a result of the sliding-and-locking relationship between the tubular base members 204 and the indexing members 208 (described above), the SROM machine 10 may provide for adjustment of the length of the movable base frame 202 and thus for adjustment of a radius of a radial path followed by the vertical support 300 and attached elements of the shoulder-manipulation mechanism 200, as driven by the horizontal linear actuator 230.

Referring to FIGS. 3-32, the shoulder-manipulation mechanism 200 may include the vertical support 300, which may be mounted on the movable base frame 202. The vertical support 300 may have the arm-carrier support 400 mounted thereon. The vertical support 300 may be configured to extend and contract in order to raise and lower the arm-carrier support 400, which may have the effect of raising and lowering at least a portion of one of the arms of the user 130, as discussed below.

Figures 31, 32:
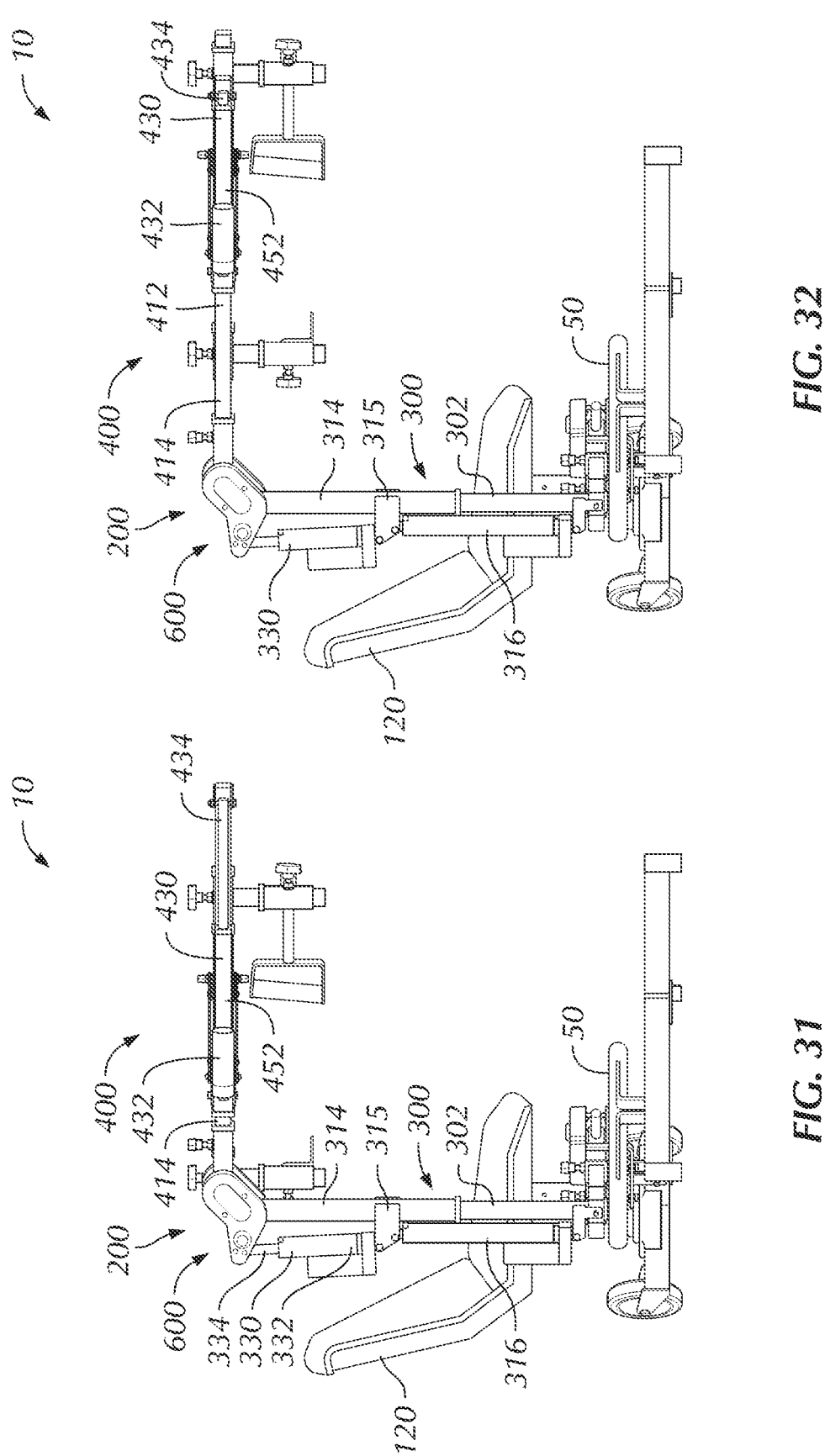
FIGS. 31 and 32 are right side elevational views of the SROM machine of FIG. 1 arranged to manipulate the right shoulder of the user, in the thirteenth configuration and the fourteenth configuration, respectively, as in FIGS. 29 and 30, with the views in combination depicting the same distal movement of the arm carrier along the arm-carrier support as in FIGS. 29 and 30.
Figure 33:
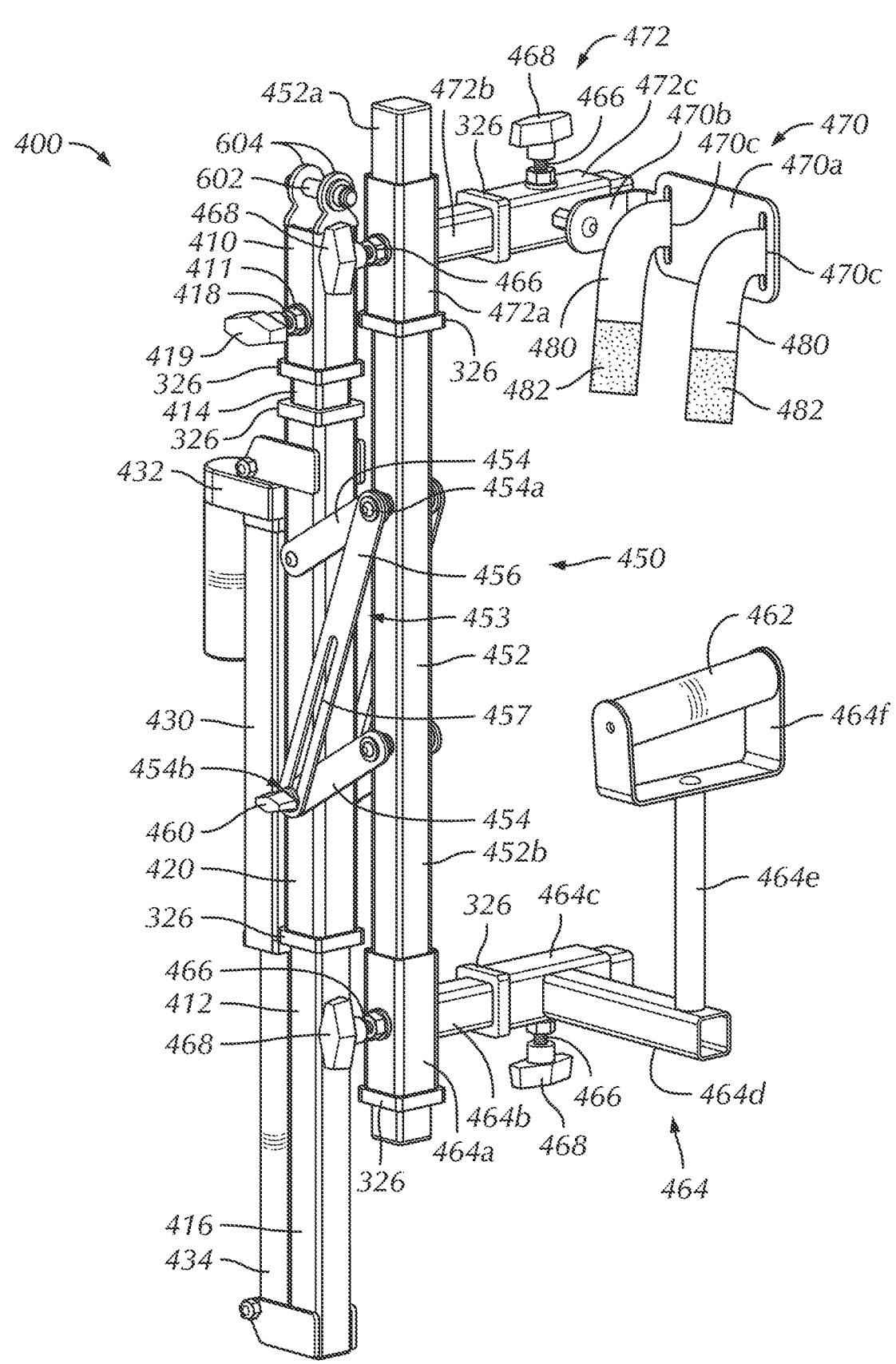
FIG. 33 is a left front perspective view of the arm carrier and arm-carrier support of the SROM machine of FIG. 1, arranged to manipulate the right shoulder of the user, with the arm carrier in a proximal position.
Figure 34:
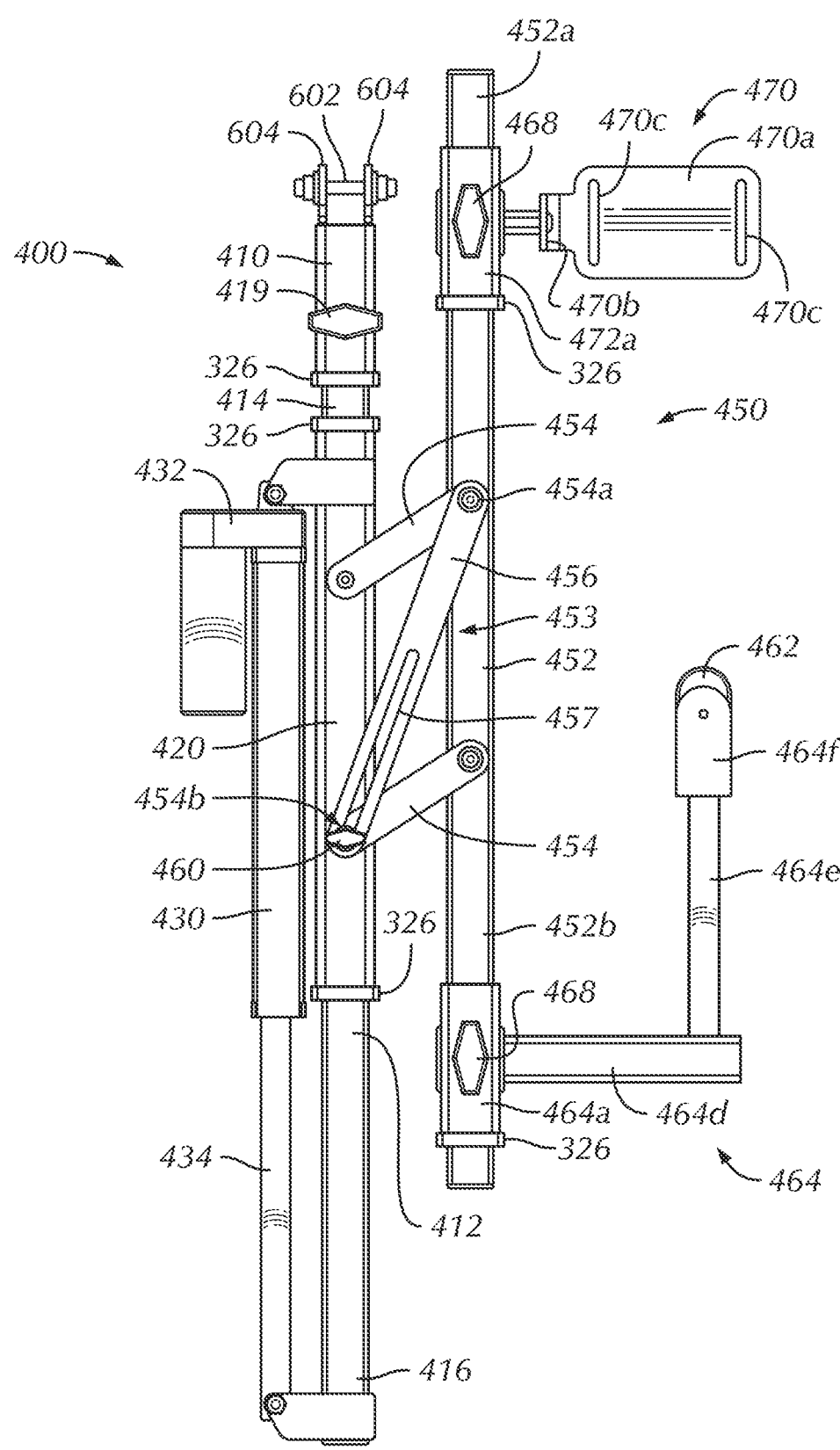
FIG. 34 is a front elevational view of the arm carrier and arm-carrier support of the SROM machine of FIG. 1, arranged to manipulate the right shoulder of the user, with the arm carrier in the proximal position of FIG. 33.

Referring to FIGS. 1-35, the arm-carrier support 400 may have supported thereon an arm carrier 450, (shown but not labeled in FIGS. 1-32; shown and components labeled in FIGS. 33 and 34). An arm carrier such as the arm carrier 450 is a structure for engaging an arm of a user and may include one or more of a limb rest or other platform which may support and/or may be secured to the arm using straps 480, bands, or other fixation elements; and a handgrip such as a handgrip 462 or a handgrip 2462, all as discussed below. The arm carrier 450 may engage an arm of the user 130 in order to manipulate a corresponding shoulder of the user 130.

Referring to FIGS. 1 and 2, the vertical support 300 may have a lower portion 304 and an upper portion 306, with the lower portion 304 being attached to the movable base frame 202. In the illustrated embodiment, the lower portion 304 includes a lower vertical tube 302, which has a lower saddle formed by a pair of downwardly extending support plates 308 spaced in order to bracket or engage a portion of the movable base frame 202. The support plates 308 may have mounting holes (not shown), which may align with mounting holes (not shown) in the spacing member 214. A securement pin 312 may extend through the mounting holes to fix the vertical support 300 to the movable base frame 202, upon the spacing member 214, detachably and re-attachably. The spacing member 214 and the support plates 308 may be mutually configured so that the vertical support 300, with the arm-carrier support 400 and the arm carrier 450 attached thereto, may be detached from the movable base frame 202 upon removal of the securement pin 312. The vertical support 300 may be rotated 180 degrees and reattached to the movable base frame 202 upon re-insertion of the securement pin 312. Compare FIGS. 7 and 8 (setup for right arm) with FIGS. 9 and 11 (setup for left arm), following such a 180-degree rotation of the vertical support 300. By this arrangement, the vertical support 300 may be releasably attached to allow the SROM machine 10 to transition between a right-arm configuration suitable to engage the right arm of the user 130 to manipulate the right shoulder of the user 130, and a left-arm configuration suitable to engage the left arm of the user 130 to manipulate the left shoulder of the user 130. Thus the SROM machine 10 may be configured to manipulate either the right arm and shoulder or the left arm and shoulder of a user. Alternatively, the vertical support 300 may be configured to be capable of being re-oriented with respect to the movable base frame 202 without being detached therefrom; for example, the vertical support 300 may be supported on a rotatable and securable mount configured to allow the vertical support 300 to be secured in a first orientation and a second orientation, the first orientation and the second orientation differing in being rotated with respect to a vertical axis by approximately 180 degrees.

Referring to FIGS. 1, 2, 21, and 22, the upper portion 306 of the upper vertical support 300 may include an upper vertical tube 314 slidably and telescopically engaged with the lower vertical tube 302. A liner such as a liner tube 326 may be disposed within one of the upper vertical tube 314 and the lower vertical tube 302 to guide the relative sliding of the upper vertical tube 314 with respect to the lower vertical tube 302. An arm-support-length linear actuator 316 may be fixed relative to the lower vertical tube 302 and may extend generally parallel to the lower vertical tube 302. A lower portion 318 of the arm-support-length linear actuator 316 may be attached to the lower vertical tube 302, and an upper portion 320 (FIGS. 21, 22) of the arm-support-length linear actuator 316 may be attached to the upper vertical tube 314. The arm-support-length linear actuator 316 may extend and contract and thereby may move the upper vertical tube 314 axially with respect to the lower vertical tube 302. The total length of the upper vertical tube 314 and the lower vertical tube 302, as measured from the point where the lower vertical tube 302 is connected to the movable base frame 202, may be increased or decreased by the relative axial movement of the upper vertical tube 314 with respect to the lower vertical tube 302. Compare FIGS. 19 and 20 to FIGS. 21 and 22, and note the upward movement of the upper vertical tube 314 with respect to the lower vertical tube 302, and the extension of the upper portion 320 of the linear actuator 316. This movement may allow the user 130, or an operator assisting the user 130, to align the shoulder-manipulation mechanism 200 as desired with respect to the shoulder of the user 130. In particular, an upper geared hinge

600 (described below) of the shoulder-manipulation mechanism 200 may be aligned at a selected height with respect to the shoulder of the user 130 for alignment between the mechanical movements of the shoulder-manipulation mechanism 200 and desired movements of the shoulder of the user 130.

In the illustrated embodiment, the lower portion 318 of the arm-support-length linear actuator 316 is fixed to the lower vertical tube 302 by a pair of mounting plates 303 (FIGS. 1 and 2), each having a mounting hole for accepting a mounting bolt. The upper portion 320 of the arm-support-length linear actuator 316 may be attached to the upper vertical tube 314 by way of a further pair of mounting plates 315 (FIGS. 2, 11, 12), each of which is fixed to the upper vertical tube 314 (by, for example, welding, fasteners, or adhesive). Each mounting plate 315 may have a pair of mounting holes, and may have lower mounting holes accepting a mounting bolt for fixation of the upper portion 320 of the arm-support-length linear actuator 316. The mounting plates 315 may be attached to the upper vertical tube 314 at a location spaced above a lower end portion 322 (FIGS. 11 and 12) of the upper vertical tube 314, in order to ensure that the upper vertical tube 314 slides smoothly along the lower vertical tube 302 when the arm-support-length linear actuator 316 urges the upper vertical tube 314 upwardly or downwardly. The arm-support-length linear actuator 316 and the other linear actuators disclosed herein may be any conventional linear actuator—for example, a linear actuator of any of the following types: screw-based, rack-and-pinion, chain-and-sprocket, belt-and-pulley, cable-and-pulley, high-torque gear-motor, hydraulic, pneumatic, or solenoid type. In the illustrated embodiment, Acme screw-and-nut linear actuators of various sizes are used. The arm-support-length linear actuator 316 may be operatively connected to a position sensor (not shown), which may be connected (by, for example, a wired or wireless connection) to the controller 1000 (FIG. 44; discussed below) to provide information about the relative positions of the lower vertical tube 302 and the upper vertical tube 314 to the controller 1000. As a result of the above-described arrangement of the arm-support-length linear actuator 316, the upper vertical tube 314 of the vertical support 300 may be moved upwardly and downwardly through control of the arm-support-length linear actuator 316, with the movement allowing adjustment of the SROM machine 10 to the user 130. Although the disclosed arrangement of the arm-support-length linear actuator 316 enables vertical movement of the arm of the user 130 to manipulate the shoulder of the user 130, such movement may be more conveniently accomplished, without altering the alignment of the shoulder of the user 130 with respect to the upper geared hinge 600, through movement of the arm carrier 450 along the arm-carrier support 400, as described below.

Referring to FIGS. 1-28, 31, 32, and 36-41, an arm-carrier-angle linear actuator 330 may be attached to the upper vertical tube 314 by, for example, an upper set of mounting holes in the mounting plates 315. The arm-carrier-angle linear actuator 330 may have a lower end portion 332, which may be attached to the mounting plates 315, and an upper portion 334, which may be pivotably engaged with the upper geared hinge 600 (described below). At the upper portion of the upper vertical tube 314, the vertical support 300 may be connected to the upper geared hinge 600 for at least pivoting movement with respect to the arm-carrier support 400, which may have the arm carrier 450 connected thereto. The arm-carrier support 400 may be connected to the vertical support 300 by the upper geared hinge 600. The arm-carrier-angle linear actuator 330 may be operatively connected to a position sensor (not shown), which may be connected (by, for example, a wired or wireless connection) to the controller 1000 (FIG. 44; discussed below) to provide information about the extension of the arm-carrier-angle linear actuator 330, and thus about the angular position of the upper geared hinge and the arm-carrier support 400, to the controller 1000.

Referring to FIGS. 36-41, in the embodiment shown, the upper geared hinge 600 may differ in configuration from the previously described lower geared hinge 500. Referring more particularly to FIGS. 38-41, the upper geared hinge 600 may comprise a main shaft 602, which may be non-rotatably attached to the upper vertical tube 314, for example, by being non-rotatably attached to a collar. Two such collars 604 are shown in FIGS. 38-41. The collars 604 may be non-rotatably fixed to an upper end portion of the upper vertical tube 314.

Referring again to FIGS. 36-41, the upper geared hinge 600 may include at least one first sun gear 610 and at least one second sun gear 660, with the first sun gear 610 and the second sun gear 660 both being non-rotatably attached to the main shaft 602. In the embodiment shown, each first sun gear 610 differs in configuration from each second sun gear 660. In the embodiment shown, two coordinated sets of sun gears, with each set containing the first sun gear 610 and the second sun gear 660, are oppositely mounted with respect to the upper vertical tube 314. Each first sun gear 610 and each second sun gear 660 may be a mutilated gear lacking teeth on a portion of the gear's pitch circle. Each first sun gear 610 and each second sun gear 660 may be configured to mesh with a planet gear, as described below. The first sun gears 610 and the second sun gears 660 may be non-rotatably attached to respective end portions of the main shaft 602, with the result being that the first sun gears 610 and the second sun gears 660 are non-rotatably attached to the upper vertical tube 314.

Figure 37:
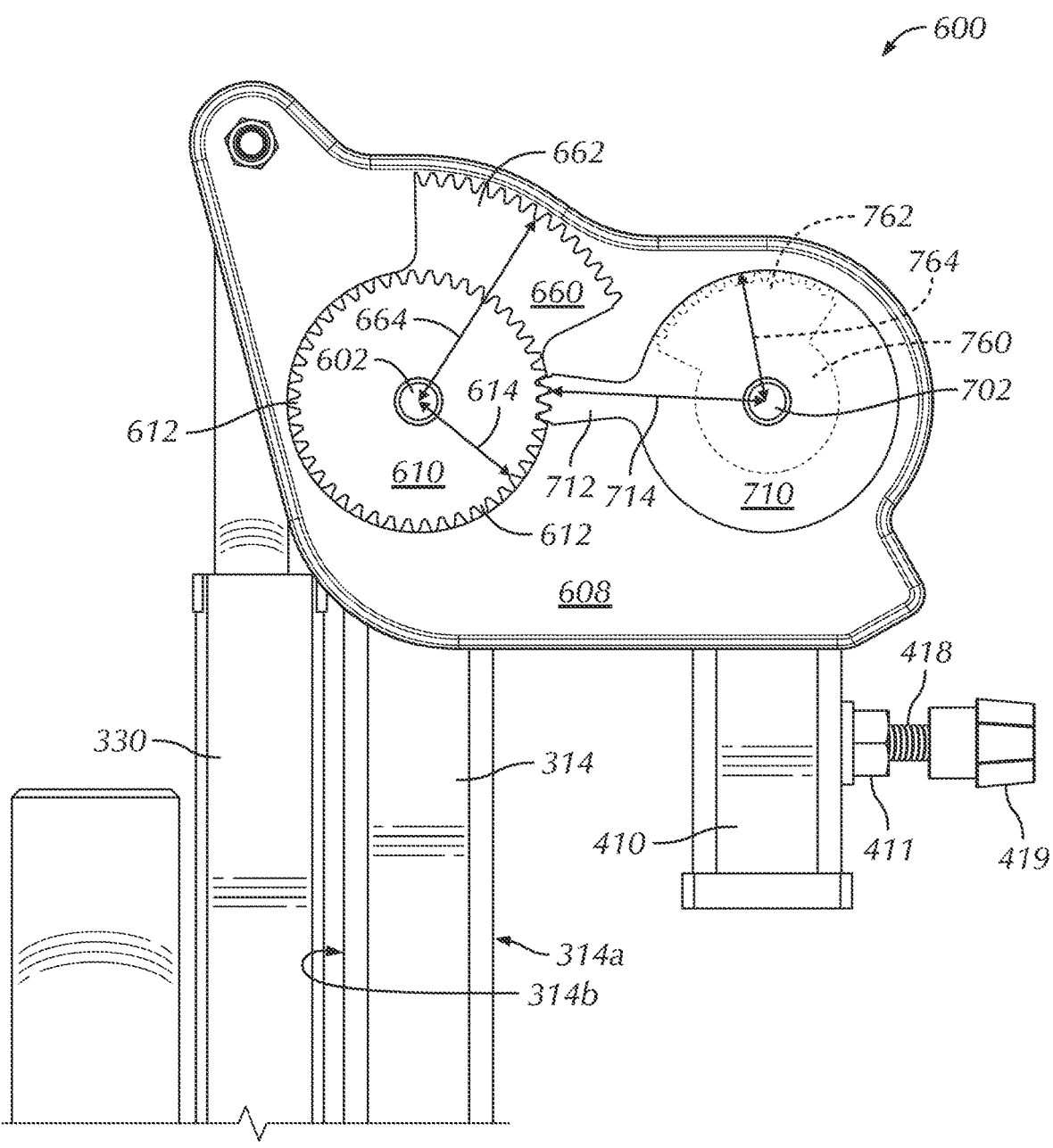
FIG. 37 is a right side elevational partial cutaway view of the upper geared hinge connecting the vertical support, the linear actuator, and the arm-carrier base of the arm-carrier support, of the SROM machine of FIG. 1.
Figure 38:
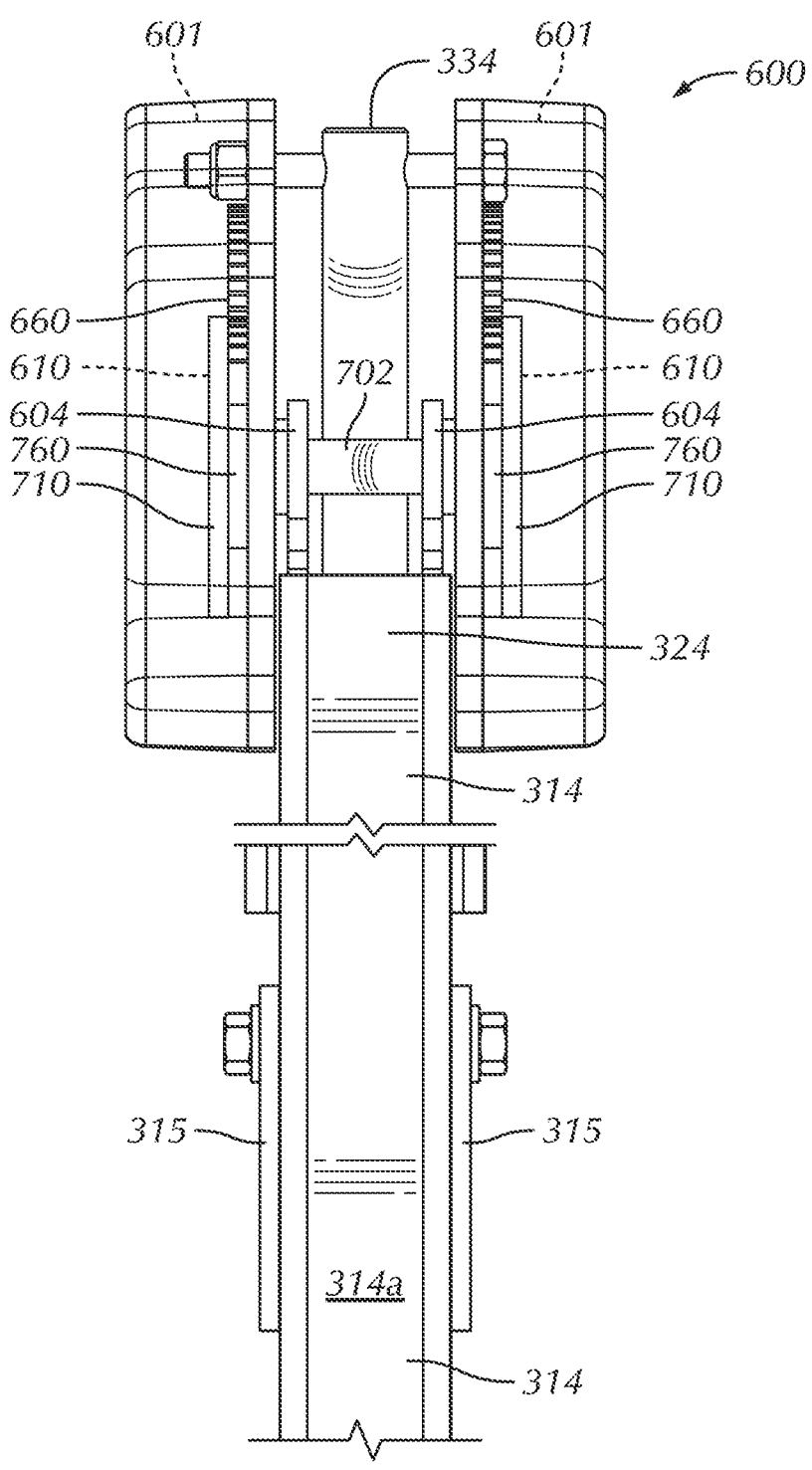
FIG. 38 is a front elevational partial cutaway view of the upper geared hinge connecting the vertical support, the linear actuator, and the arm-carrier base of the arm-carrier support, of the SROM machine of FIG. 1.

The upper geared hinge 600 may also include a carrier plate 608 (two are shown). The two carrier plates 608 may be rotatably attached to the main shaft 602 in parallel and spaced relation to one another and may be connected to rotate together about the main shaft 602. Together the carrier plates 608, and any additional elements extending between or connecting the carrier plates 608 (such as shafts or any additional spacers, not shown), may form a carrier body. Each carrier plate 608 may be connected to, and in particular may be pivotably attached to, the upper portion 334 of the arm-carrier-angle linear actuator 330 (FIGS. 37 and 38). The location of the connection may be offset from the main shaft 602 so that extension or contraction of the arm-carrier-angle linear actuator 330 may exert a torque upon, and may rotate, the carrier plates 608 and the carrier body formed thereby about a main horizontal axis MH of the main shaft 602. The main horizontal axis MH may be oriented generally horizontally. A planet shaft 702 may extend between the carrier plates 608 and may be rotatably mounted with respect thereto. The planet shaft 702 may be provided with shoulders or other features to hold the carrier plates 608 in spaced relation to one another; alternatively, an additional element such as a spacer may extend between the carrier plates 608 and may maintain the carrier plates 608 in spaced relation.

Continuing to refer to FIGS. 36-41, a first planet gear 710 and a second planet gear 760 may be non-rotatably mounted with respect to the planet shaft 702 and thus may be non-rotatably mounted with respect to each other so as to rotate together with the planet shaft 702. In the embodiment shown, each first planet gear 710 differs in configuration from each second planet gear 760. In the embodiment shown, two sets of planet gears, with each set containing the first planet gear 710 and the second planet gear 760, may be non-rotatably mounted to the planet shaft 702 and may be oppositely disposed with respect to the upper vertical tube 314, as shown in FIG. 38.

The first sun gears 610 and the second sun gears 660 may mesh and cooperate such that they are drivingly connected with the first planet gears 710 and the second planet gears 760 to provide for a first phase and a second phase of movement of the arm-carrier support 400 with respect to the vertical support 300. The first and second phases of movement cause the SROM machine 10 to impose two phases of movement and/or two phases of loading upon the arm and shoulder of the user 130.

Figure 36:
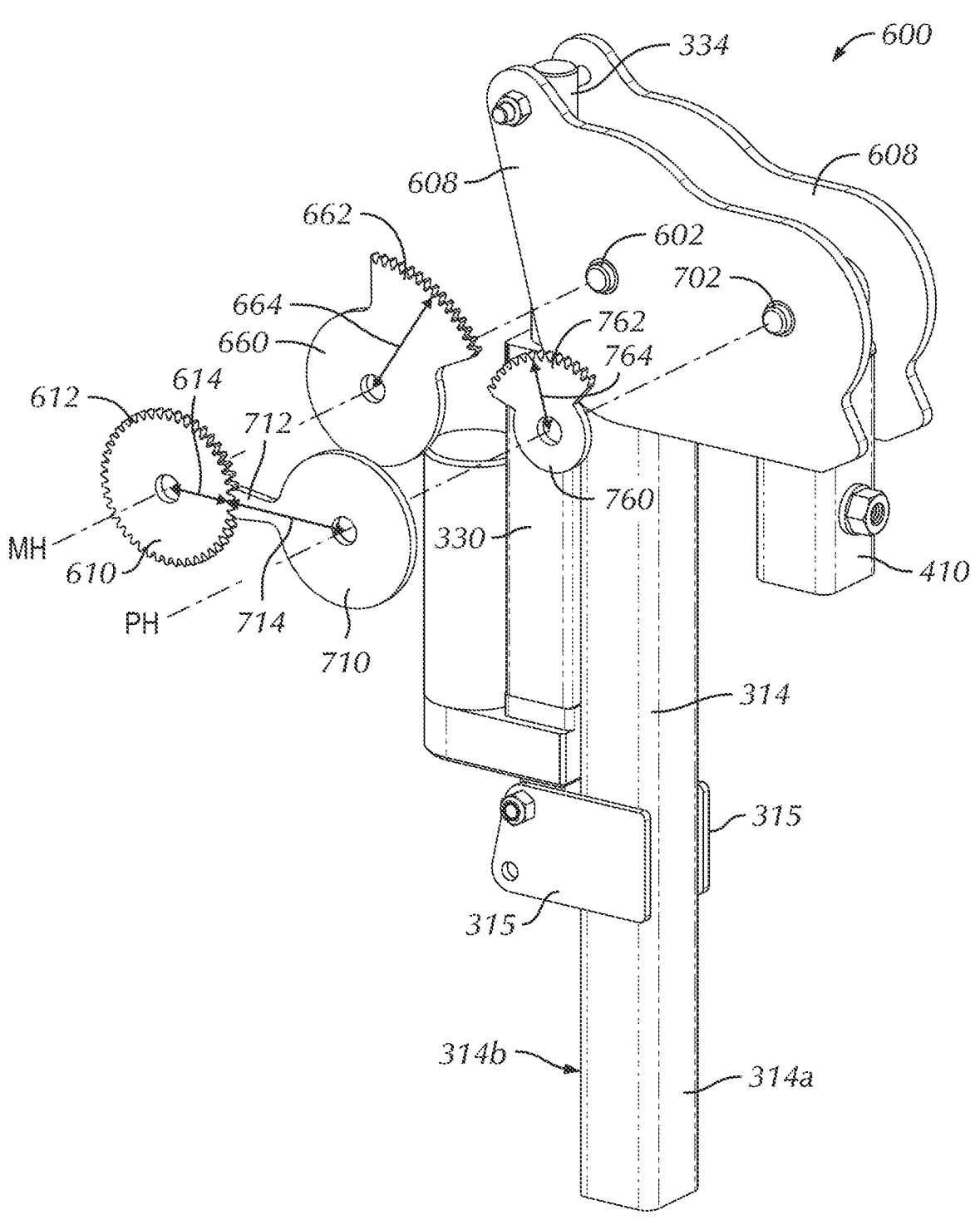
FIG. 36 is a front right exploded partial perspective view of an upper geared hinge connecting a vertical support, a linear actuator, and an arm-carrier base of the arm-carrier support of the SROM machine of FIG. 1.

Referring to FIG. 36, of each cooperating first planet gear 710 and first sun gear 610, at least one may be a mutilated gear with teeth extending only partially around an outer circumference of the first planet gear 710 or the first sun gear 610. For example, as shown in the illustrated embodiment, each first planet gear 710 may be a mutilated gear with a first-planet-gear toothed portion 712 having a radius 714 and extending circumferentially approximately 30 degrees as measured with respect to the planet shaft 702. The first-planet-gear toothed portion 712 may engage and mesh with a first-sun-gear toothed portion 612 (which may be the entire perimeter of the first sun gear 610, as shown, or a portion thereof) having a radius 614 of the corresponding first sun gear 610, where such engagement and meshing occurs for approximately 30 degrees of rotation of the first planet gear 710 and the planet shaft 702.

Figure 39:
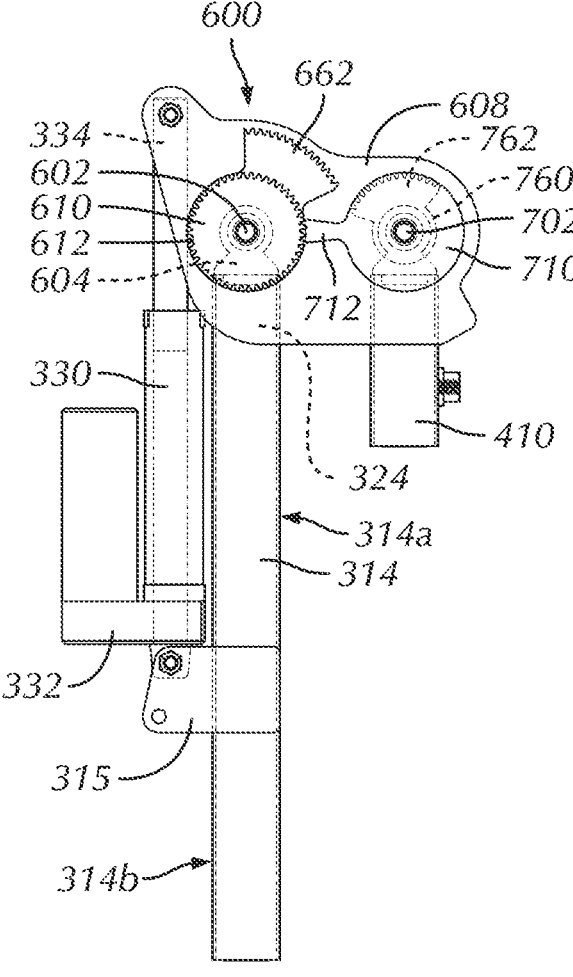
FIGS. 39, 40, and 41 are right elevational partial cutaway views of the upper geared hinge connecting the vertical support, the linear actuator, and the arm-carrier base of the arm-carrier support of the SROM machine of FIG. 1, with the elements shown with the arm carrier in FIGS. 39, 40, and 41 respectively in a lowered position, an intermediate position, and a raised position.
Figure 40:
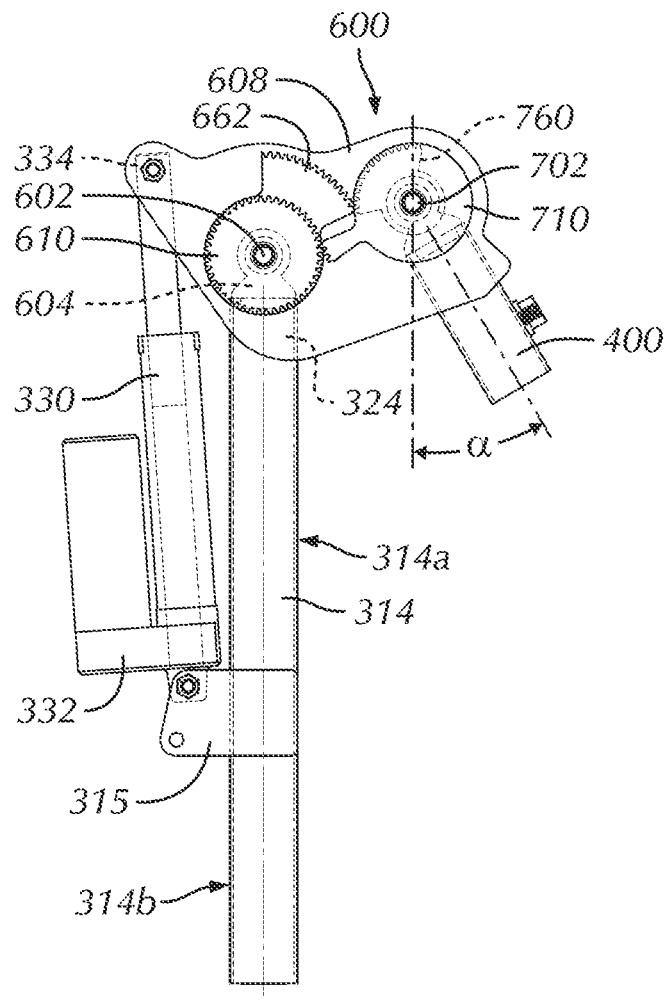
Figure 41:
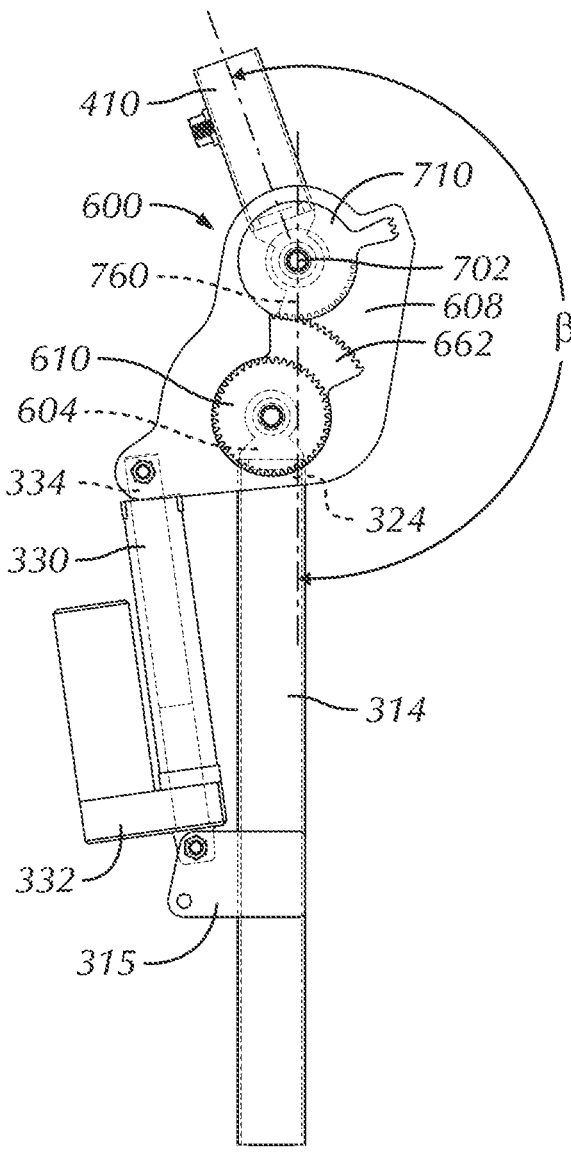

Referring to FIGS. 39-41, the first planet gear 710 and first sun gear 610 may be arranged, aligned, and meshed so that first planet gear 710 and the first sun gear 610 cooperate and determine the motion of the arm-carrier support 400 in a first phase of movement with respect to upper vertical tube 314 of the vertical support 300 starting at a lowered position of the arm-carrier support 400, as shown in FIG. 39. As a result, the planet shaft 702 may revolve in a path having a radius that is the sum of the radius 614 of the first-sun-gear toothed portion 612 and the radius 714 of the first-planet-gear toothed portion 712. The planet shaft 702 while revolving may also rotate as a result of the interaction between the first-planet-gear toothed portion 712 and the first-sun-gear toothed portion 612, with the first planet gear 712 rotating at about half of the rotational velocity at which the planet shaft 702 revolves about the main shaft 602. Upon the first planet gear 710 completing about 60 degrees of revolution about the main shaft 602 from the lowered position, and thus upon the planet shaft 702 completing about 30 degrees of rotation from the lowered position, with the arm-carrier support 400 traversing an angle α of about 30 degrees with respect to an axis parallel to the axis of the vertical support 300, further relative rotation of the first planet gear 710 and the first sun gear 610 may cause the first-planet-gear toothed portion 712 and the first-sun-gear toothed portion 612 to disengage. Slightly before or at the same time as the disengagement of the first-planet-gear toothed portion 712 and the first-sun-gear toothed portion 612 occurs, a second-planet-gear toothed portion 762 of each second planet gear 760 may engage and mesh with a second-sun-gear toothed portion 662 of each second sun gear 660, so that the second planet gears 760 may cooperate with the second sun gears 660 to provide for a second phase of movement of the arm-carrier support 400 with respect to the vertical support 300.

Continuing to refer to FIGS. 39-41, of each cooperating second planet gear 760 and second sun gear 660, at least one may be a mutilated gear with teeth extending only partially around an outer circumference of the second planet gear 760 or the second sun gear 660. For example, as shown in the illustrated embodiment, each second planet gear 760 is a mutilated gear having the second-planet-gear toothed portion 762, which in turn may have a radius 764 (FIG. 37) and may extend circumferentially approximately 95 to 120 degrees as measured with respect to the planet shaft 702. The second-planet-gear toothed portion 762 may engage and mesh with the second-sun-gear toothed portion 662 having a radius 664 (FIG. 39), with the second-sun-gear toothed portion 662 extending circumferentially for about 50 to 60 degrees with respect to the main shaft 602. The second planet gear 760 and the second sun gear 660 may be configured by being arranged, aligned, and meshed so that second planet gear 760 and the second sun gear 660 cooperate and determine the second phase of motion of the arm-carrier support 400. The second phase of motion of the arm-carrier support 400, with respect to the vertical support 300, may start with the arm-carrier support 400 raised about 30 degrees from the lowered position, as shown in FIG. 40. As a result, the planet shaft 702 may revolve in the second phase of motion in a path having a radius that is the sum of the radius 664 of the second-sun-gear toothed portion 662 and the radius 764 of the second-planet-gear toothed portion 762. The planet shaft 702 while revolving may also rotate as a result of the interaction between the second-planet-gear toothed portion 762 and the second-sun-gear toothed portion 662, with the second planet gear 760 rotating at about twice the rotational velocity at which the planet shaft 702 revolves about the main shaft 602 during the second phase of motion. These first and second phases of motion may determine the movement of the shoulder of a user 130 as the arm-carrier support 400 is raised from a lower position (FIG. 40) to an upper position (FIG. 41), in which the arm-carrier support has traversed an angle β, through a total rotation that may exceed 180 degrees.

The upper geared hinge 600 may include one or more covers 601 for covering the gears and shafts thereof, as shown in FIGS. 1-28 and 38 (shown as transparent for clarity). The covers 601 are omitted from FIGS. 39-41.

Alternatively, the upper geared hinge 600 may be configured in similar fashion to the previously described lower geared hinge 500. However, the upper geared hinge 600 as disclosed herein advantageously provides two distinct phases of motion compatible with the natural motion of the arm and shoulder of the user 130. Alternatively, the upper geared hinge 600 could be replaced with a simple rotating connection such as a pinned joint with the movable arm-carrier support 400 rotating about a shaft or pin instead, but such a joint would provide a lesser range of horizontal rotation and reduced mechanical advantage for movement of the arm-carrier support 400.

Referring to FIGS. 33-38, the arm-carrier support 400 may have an arm-carrier base 410. The arm-carrier base 410 may be non-rotatably mounted with respect to the planet shaft 702 (FIG. 38) by a collar (two collars 604 are shown), and may be welded, formed monolithically with, or otherwise fixed to the collars 604.

When the arm-carrier-angle linear actuator 330 extends or contracts, the force of the arm-carrier-angle linear actuator 330, acting at a distance from the main shaft 602, results in a torque causing the carrier plates 608 to rotate about the main shaft 602, as previously noted. The meshing of the first-sun-gear toothed portions 612 with the first-planet-gear toothed portions 712 may cause the first planet gears 710, the planet shaft 702, the arm-carrier base 410, and the arm-carrier support 400 to rotate about a planet horizontal axis PH of the planet shaft 702 (FIG. 36), with the planet horizontal axis PH being oriented essentially horizontally. The planet shaft 702, in addition to rotating about the planet horizontal axis PH, may revolve about the main horizontal axis MH, following an essentially radial path, with the radius thereof being the sum of the radius 614 of the first sun gears 610 and the radius 714 of the first planet gears 710 (FIG. 36). This arrangement provides an additional component of movement of the arm-carrier support 400 as compared to a pure rotational movement. The resulting movement of the arm-carrier support 400 is compatible with the movement of a human shoulder of a user 130 during an abduction or adduction movement.

Referring to FIG. 37, the upper geared hinge 600 may be mounted with each first sun gear 610 and each second sun gear 660 essentially aligned with the upper vertical tube 314. A connection point between the arm-carrier-angle linear actuator 330 and each carrier plate 608 may be located rearwardly or toward a rear side 314*b* of the upper vertical tube 314 with respect to the main shaft 602. The main shaft 602 may be mounted to each carrier plate 608 forward or toward an opposite front side 314*a* of the upper vertical tube 314. The upper geared hinge 600 may have a limited range of motion, with the result being that the arm-carrier support 400 may be movable with respect to the upper vertical tube 314 in a space oriented toward the front side 314*a* of the upper vertical tube 314. To manipulate an arm of the user 130, the seat 120 and the upper vertical tube 314 may be oriented so that the front side 314*a* of the upper vertical tube 314 faces the same direction as the user 130 seated with the back of the user 130 against the backrest 122 of the seat 120.

Figure 35:
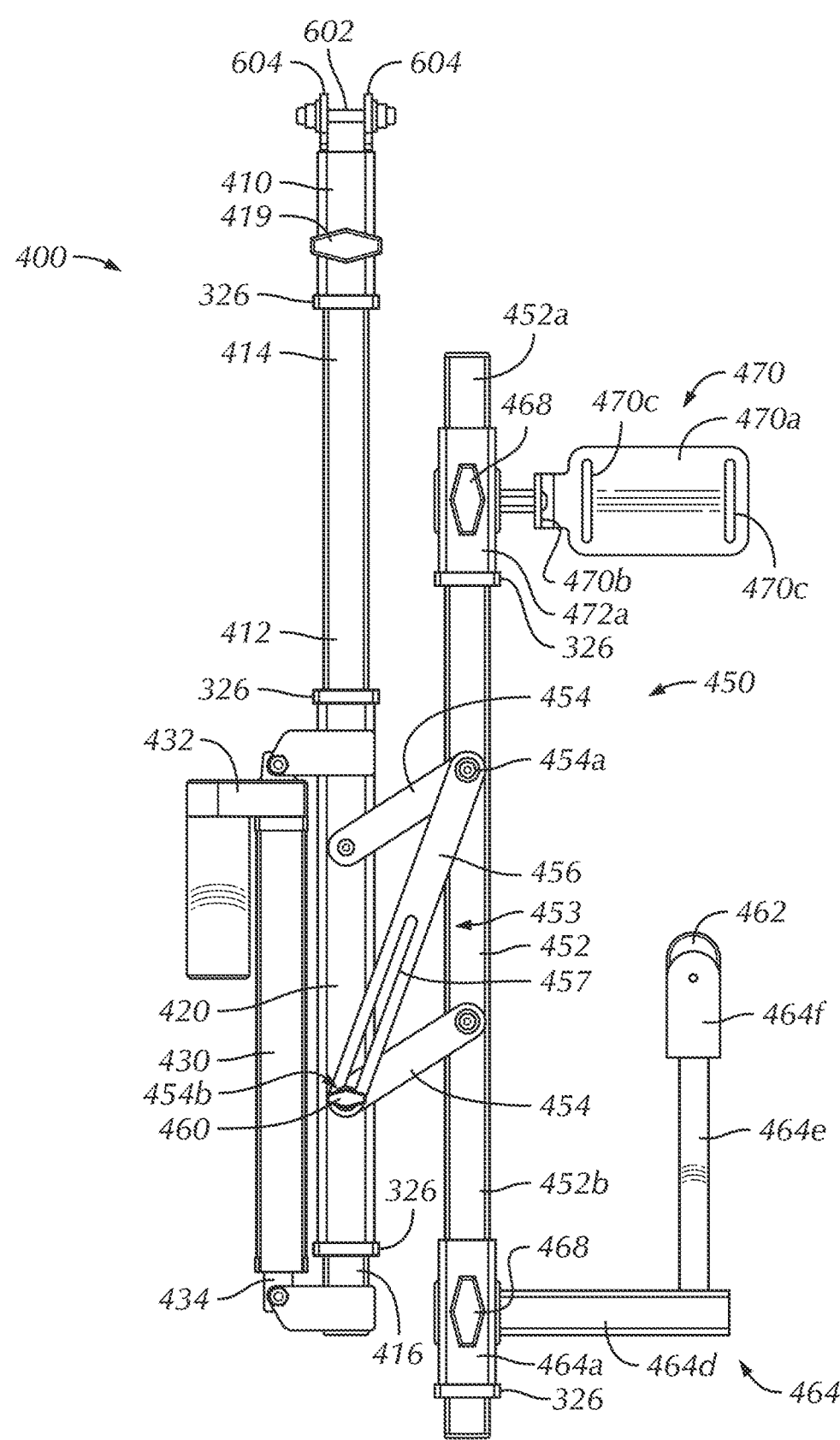
FIG. 35 is a front elevational view of the arm carrier and arm-carrier support of the SROM machine of FIG. 1, arranged to manipulate the right shoulder of the user, with the arm carrier in a distal position.

Referring to FIGS. 33-35, in the illustrated embodiment, the arm-carrier support 400 may include an axially fixed member, which may take the form of an inner tube 412 having a proximal portion 414 and a distal portion 416. The proximal portion 414 may be telescopically engaged by the arm-carrier base 410 and may be adjustably secured thereto by, for example, a bolt 418 with a knob 419. The bolt 418 may threadedly engage the arm-carrier base 410 by threadedly engaging an internally threaded component such as a nut 411 or other threaded element welded or otherwise fixed to the arm-carrier base 410. The bolt 418 may frictionally engage the inner tube 412 or may engage a mounting hole near the proximal portion 414. As a result, the inner tube 412 may be releasably secured to the arm-carrier base 410. In the illustrated embodiment, the bolt 418 may be loosened, and the inner tube 412 may be detached from the arm-carrier base 400, rotated 180 degrees, and reattached to the arm-carrier base 410 upon re-tightening of the bolt 418. The connection between the inner tube 412 and the arm-carrier base 410 may work in combination with the connection between the vertical support 300 and the movable base frame 202 (described above) to allow the SROM machine 10 to be configured into a right-arm configuration or a left-arm configuration to manipulate either the right arm and shoulder or the left arm and shoulder of the user 130. Alternatively, the SROM machine 10 may be configured with the arm carrier 450 being able to be adjustably secured by being configured to be re-oriented with respect to the arm-carrier support 400 without being detached therefrom; for example, the arm carrier 450 may be supported on the arm-carrier support by a rotatable mount (not shown) configured to allow the arm carrier 450 to be secured in either of a first orientation and a second orientation, with the first and second positions differing in being rotated with respect to a vertical axis by at least approximately 180 degrees. Alternatively, the SROM machine 10 may be configured without the arm carrier 450 being able to be re-oriented with respect to the arm-carrier support 400.

Continuing to refer to FIGS. 33-36, an axially movable member may be slidably attached to the axially fixed member. For example, an axially movable member in the form of a sliding base 420 may be attached to the inner tube 412 and may be telescopically engaged with the inner tube 412. The arm-carrier support 400 may include a reach-movement linear actuator 430 for moving the axially movable member with respect to the axially fixed member. For example, the arm-carrier support 400 may include the reach-movement linear actuator 430, which may have a proximal portion 432 attached to the sliding base 420 and a distal portion 434 attached to the inner tube 412 at the distal portion 416 thereof. The reach-movement linear actuator 430 may extend and contract and thereby may move the sliding base 420 axially along the length of the inner tube 412. Note that the illustrated arrangement of the inner tube 412 and the sliding base 420 differs from the arrangement of the vertical support 300, in which the relative axial movement of the upper vertical tube 314 and the lower vertical tube 302 changes the total length of the two members. Here the reach-movement linear actuator 430 may move the sliding base 420 axially along the inner tube 412, but the movement may result in a change of position of the sliding base 420 along the inner tube 412 rather than an extension or contraction of the total length of the arm-carrier support 400. Alternatively, the axially movable member and the axially fixed member can be configured in the manner of upper vertical tube 314 and the lower vertical tube 302, wherein the total length of the upper vertical tube 314 and the lower vertical tube 302 is extendible by action of the arm-support-length linear actuator 316. The reach-movement linear actuator 430 may be operatively connected to a position sensor (not shown), which may be connected (by, for example, a wired or wireless connection) to the controller 1000 (FIG. 44; discussed below) to provide information about the position of the axial movable member, the sliding base 420 in the illustrated embodiment, along axially fixed member, which is the inner tube 412 in the illustrated embodiment, to the controller 1000.

Figure 33A:
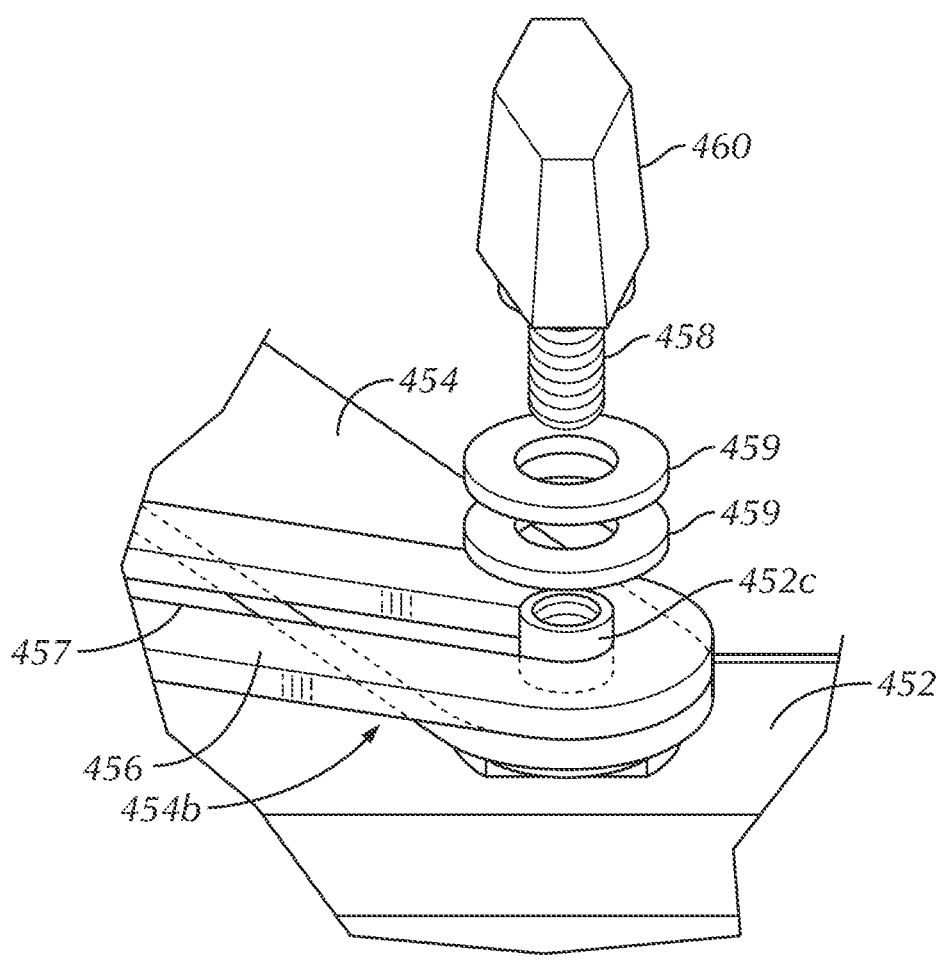
FIG. 33A is a right front partially exploded detail view of a pinned joint of a connector linkage joining the arm carrier to the arm-carrier support of the SROM machine of FIG. 1.

Referring to FIGS. 33-35, the arm carrier 450 may be adjustably secured to the arm-carrier support 400 and in particular may be adjustably secured to the sliding base 420 in order to provide axial movement of the arm carrier 450 with respect to the axially fixed member (the inner tube 412) as a result of extension and contraction of the reach-movement linear actuator 430. The arm carrier 450 may include an axial base 452, which may extend axially and may be comparable in length to the inner tube 412. The axial base 452 may be connected parallel or essentially parallel with respect to the inner tube 412 and the sliding base 420 by a connector linkage 453 (the illustrated embodiment includes two connector linkages 453) extending between facing sides of the axial base 452 and the sliding base 420. A first connector linkage 453 is shown in FIGS. 33-35. Two connector linkages 453 are visible in FIG. 43 and in the paired views of, for example, FIGS. 5 and 6. Each connector linkage 453 may include first and second connector links 454, with each connector link 454 being pivotably attached to both the axial base 452 and the sliding base 420. The connector links 454 of each linkage 453, together with the axial base 452 and the sliding base 420, may form a four-bar linkage allowing the distance between the axial base 452 and the sliding base 420 to be adjusted while maintaining the axial base 452 and the sliding base 420 in a parallel or essentially parallel orientation. A diagonal link 456 of each connector linkage 453 may extend between and may be pivotably attached to a pivoting connection in the form of a first pinned joint 454*a* between the first connector link 454 and the axial base 452. The diagonal link 456 of each connector linkage 453 may have a slot 457 forming a sliding connection with a second pivoting connection in the form of a second pinned joint 454*b* between the second connector link 454 and the sliding base 420. As shown in the detail view of FIG. 33A, the second pinned joint 454*b* may include a stud 452*c*, fixed by, for example, a welded connection, to the axial base 452, or integrally formed with the axial base 452. The stud 452*c* may be internally threaded and may pivotably engage the second connector link 454. The stud 452*c* may further engage the slot 457 of the diagonal link 457. An adjustment screw 458 with a knob 460 may engage the internally threaded stud 452*c*. One or more washers 459 (two are shown) may be disposed between the knob 460 and the diagonal link 460. The sliding connection of each connector linkage 453 may be releasably fixed by tightening the adjustment screw 458 with the knob 460 to fix the diagonal link 456 frictionally against sliding with respect to the second pinned joint 454*b*. The adjustment screw 458 thus may be tightened to lock the connector linkage 453, fixing the distance between the axial base 452 and the sliding base 420. Each adjustment screw 458 may be loosened to permit adjustment of the distance between the axial base 452 and the sliding base 420, and then the connector linkages 453 may be secured to fix the distance between the axial base 452 and the sliding base 420. The first pinned joint 454*a* between the first connector link 454 and the axial base 452 may be formed by a stud of the same type of as the internally threaded stud 454*c*, with a threaded connector engaging the internally threaded stud 454*c* and further pivotably engaging the first connector link 454 and the diagonal link 456.

Continuing to refer to FIGS. 33-35, the arm carrier 450 may include a handgrip 462. The handgrip 462 may be slidably and releasably attached to the axial base 452 and may be attached to a distal portion 452*b* thereof by a handgrip mount 464. The handgrip mount 464 may include a slidable base 464*a*, which may be releasably secured to the axial base 452 for axial movement along the axial base 452 by an adjustment screw 466 with a knob 468. A transverse extension 464*b* may extend from the slidable base 464*a* and may support the handgrip 462 in spaced relation from the axial base 452 in a first direction perpendicular to, and generally below, the axial base 452 when the axial base 452 is in a generally horizontal orientation. A second slidable base 464*c* may be releasably secured to the transverse extension of 464*b* for movement along the transverse extension 464*b*. The second slidable base 464*c* may have a second transverse extension 464*d*. The second transverse extension 464*d* may extend transversely with respect to both the axial base 452 and the transverse extension 464*b* of the of the slidable base 464*a*, generally proximally with respect to the user 130. Connected to the second transverse extension 464*d* may be a support element, for example, a handgrip support post 464*e*. The handgrip support post 464*e* or other support element may extend generally parallel to the axial base 452. A handgrip frame 464*f* may support the handgrip 462 and may be rotatably mounted with respect to the handgrip support post 464*e*, or the handgrip support post 464*e* may be rotatably mounted with respect to the transverse extension 464*d*, or the handgrip 462 may be otherwise rotatably mounted to give the user 130 a degree of rotatability of the wrist of the user 130 in grasping the handgrip 462. The handgrip 462 of the handgrip frame 464*f* may be pivotably attached to the handgrip mount 464. The handgrip 462 thus may be supported in a manner to offset the handgrip 462 from the axial base 452 while supporting the handgrip 462 in a manner providing a degree of rotatability of the handgrip 462. The handgrip mount 464 may be simplified; for example, the second slidable base 464*c* may be omitted, with the second transverse extension 464*d* being fixed to the transverse extension 464*b*. Alternatively, a single extension may support the handgrip frame 464*f* or the handgrip 464 and may be configured to provide a three-dimensional offset as provided by the transverse extension 464*b* and the second transverse extension 464*d*. These adjustments may be used to adapt the position of the arm carrier 450 to the anatomy of the user 130, and/or to adjust the maximum and minimum distances between the shoulder of the user 130 and the handgrip 462.

Continuing to refer to FIGS. 33-35, the arm carrier 450 may also include a limb rest such an elbow rest 470, which may be slidably and releasably secured to the axial base 452 at a proximal portion 452*a* thereof and may be connected to the axial base 452 of the arm carrier 450 by an elbow-rest mount 472 (FIG. 33). The elbow rest 470 may include a platform offset (downwardly) from and substantially parallel to the axial base 452. In the illustrated embodiment, the elbow rest 470 includes a platform 470*a* and a substantially perpendicular mounting extension 470*b* attached to—and in this case integrally formed with—the platform 470*a*. The platform 470*a* may include fixing features such as slots 470*c* for fixing a strap to the mounting platform 470*a*. That is, the slots 470*c* may engage a mounting strap 480, which may include fixation elements such as, for example, hook-and-loop fasteners 482, a belt with buckles, or the like for securing the mounting strap 480 to an arm of the user 130. The elbow-rest mount may include a slidable base 472*a*, which may be fixed and released for axial movement along the axial base 452 by an adjustment screw 466 with a knob 468. The sliding base 472*a* may have a transverse extension 472*b* (FIG. 33). The transverse extension 472*b* may extend from the base 472*a* and may support the elbow rest 470 at a distance from the axial base 452 in a first direction perpendicular to, and generally below, the axial base 452 when the axial base 452 is in a generally horizontal orientation. A second slidable base 472*c* may be releasably secured to the transverse extension of 472*b* for movement along the transverse extension 472*b*. The second slidable base 472*c* may include a mounting post 472*d* for pivotably mounting the elbow rest 470 via the mounting tab 470*b*. The various slidable bases described herein may be, but need not be, similar to or identical to one another.

The interconnections between the handgrip mount 464 and the axial base 452, and between the elbow-rest mount 472 and the axial base 452, may allow adjustment of the device for the length of the arm of the user 130.

Referring to FIGS. 1, 2, and 33-35, liners such as liner tubes 326 may be disposed to guide the relative sliding of the components that are telescopically engaged and/or that move axially relative to one another, in the manner described above with respect to the upper vertical tube 314 and the lower vertical tube 302.

Figure 44:
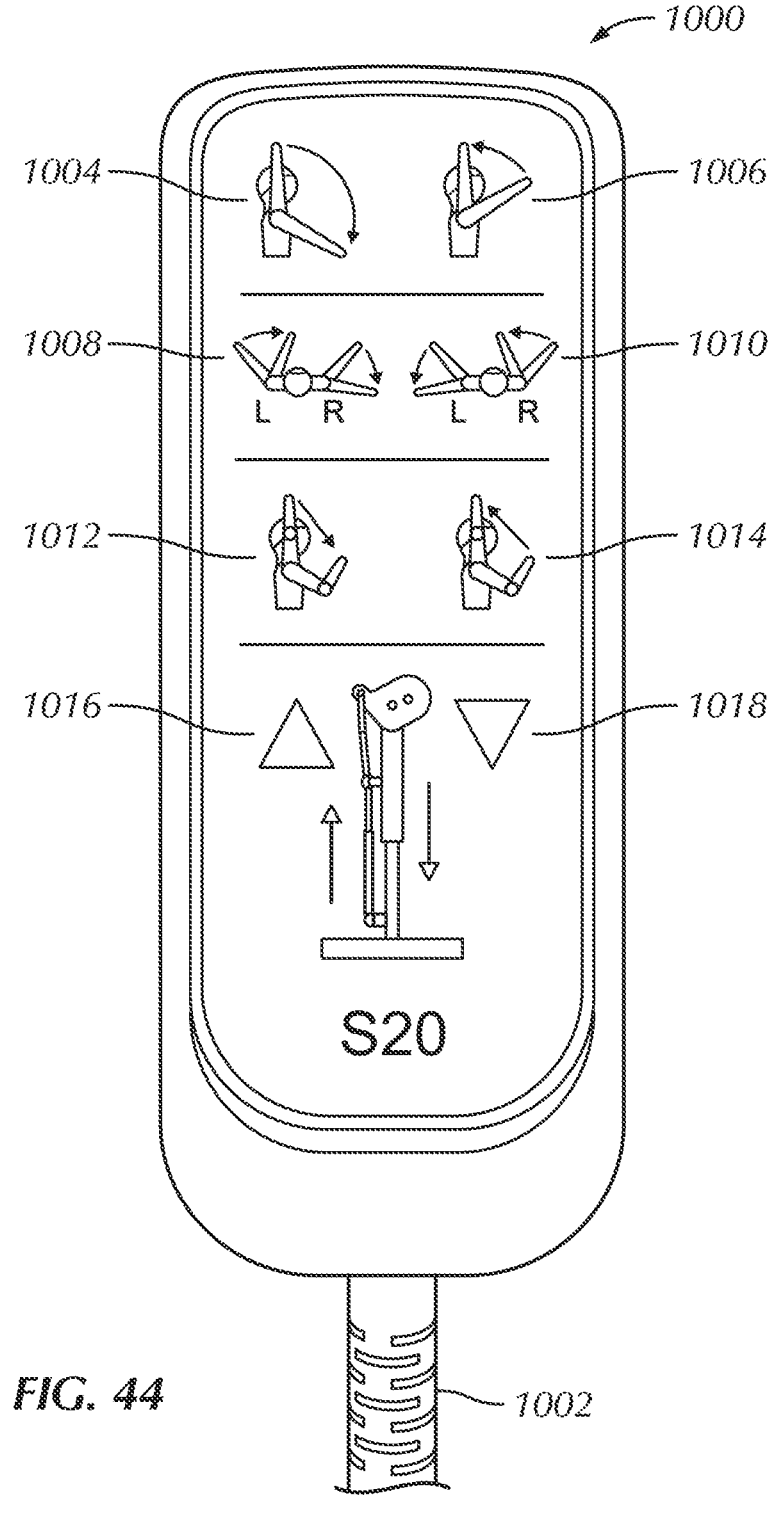
FIG. 44 is a top plan view of a controller for use with the SROM machine of FIG. 1.

Referring to FIG. 44, the controller 1000 may comprise an electrical or electronic device and may provide outputs to govern or operate the linear actuators found within the SROM machine 10, based on inputs from the user (via buttons, switches, touch screens, or the like) and/or from sensors, such as the sensors described herein. The outputs may be based on the inputs directly to provide manual control, or may be derived from such inputs processed by a logic device such as a programmable logic controller, a microprocessor, or the like. The controller 1000 may be operatively connected, wirelessly or, for example, by a cord 1002, to one or more of the horizontal linear actuator 230, the arm-support-length linear actuator 316, the arm-carrier-angle linear actuator 330, or the reach-movement linear actuator 430. The controller 1000 may receive input from one or more position sensors associated with the linear actuators 230, 316, 330, and 430 and may process the inputs to control movement of the SROM machine 10 by controlling the linear actuators 230, 316, 330, and 430. The controller 1000 may also enable manual control of the linear actuators 230, 316, 330, and 430 by including, as in the illustrated embodiment, switches such as membrane switches 1004, 1006, 1008, 1010, 1012, 1014, 1016, 1018 for initiating movements of the linear actuators 230, 316, 330, and 430. The switches may preferably have associated therewith graphical representations of the movement of the SROM machine 10 that is initiated by activating each switch. The controller 1000 may be held and actuated by the user 130 or by an operator (not shown). Actuation by the user 130 may be particularly advantageous, as the user 130 may be able to halt uncomfortable or painful movements immediately.

A method of using the SROM machine 10 to impose loading or movement on the shoulder of a user 13 may include any or all of the following steps. The SROM machine 10 may be configured for manipulation of a shoulder of the user 130. First, the orientation of the seat 120 may be adjusted so that a selected one of the arms of the user 130 may be placed on the side of the user's body adjacent to the shoulder-manipulation mechanism 200. In conjunction with adjustment of the orientation of the seat 120, the vertical support 300 and attached elements of the shoulder-manipulation mechanism 200 may be oriented and secured, and the arm-carrier support 400 may be oriented and secured, so that the arm-carrier support 400 and the attached arm carrier 450 face the same direction as the user 130 when the user 130 is seated with the back of the user 130 against the backrest 122 of the seat 120. The arm-carrier support 400 may also be oriented and secured so that the arm carrier 450 is placed on the side of the arm-carrier support 400 facing to the user 130. The connector linkages 453 may be loosened by loosening the adjustment screws 458 using the knobs 460. The distance from the sliding base 420 of the arm-carrier support 400 to the arm carrier 450 may be set by sliding the diagonal links 456 until the desired distance is reached. The connector linkages 453 may then be locked by tightening the adjustment screws 458 using the knobs 460.

An initial position of the shoulder-manipulation mechanism 200 may be set by actuating (for example, individually) one or more of the horizontal linear actuator 230, the arm-support-length linear actuator 316, the arm-carrier-angle linear actuator 330, or the reach-movement linear actuator 430 via the controller 1000. The device movements and resulting arm and shoulder movements used in adjusting the initial position of the shoulder-manipulation mechanism 200 may be the same as the device movements and resulting arm and shoulder movements used in exercising or treating the user's shoulder, as described below. Once the SROM machine 10 has been configured into the desired initial position, the user 130 may grasp the handgrip 462, and the user's arm (including, for example, the elbow thereof) may rested upon and/or secured to the elbow rest 470.

Figures 3, 4:
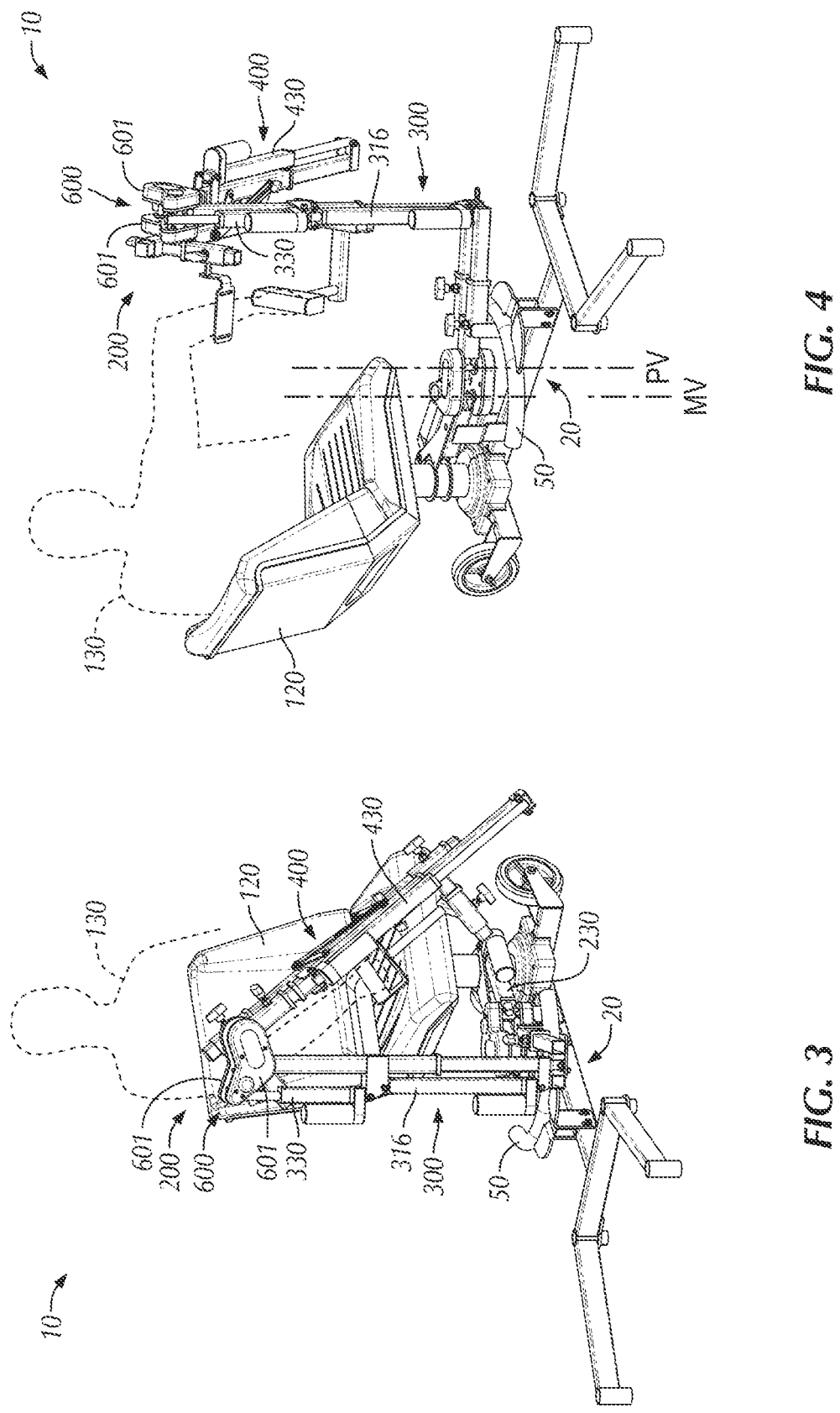
FIGS. 3 and 4 are respectively a front right perspective view and a rear right perspective view of the SROM machine of FIG. 1, with the SROM machine being arranged in the first configuration, as shown in FIGS. 1 and 2, but with the views placed side-by-side for comparison with other configurations shown in subsequent views, and including a user (shown in phantom)
Figure 6:
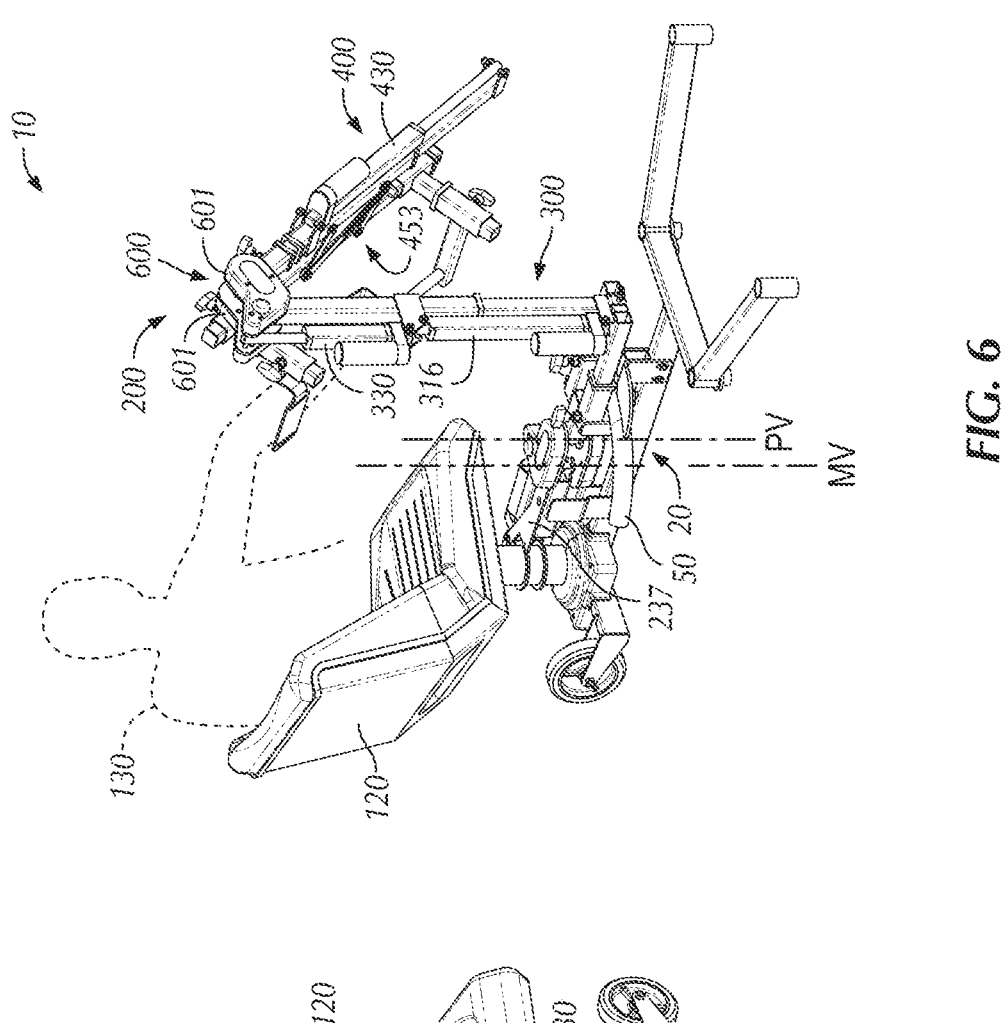
FIGS. 5 and 6 are respectively a front right perspective view and a rear right perspective view of the SROM machine of FIG. 1 arranged to manipulate the right shoulder of the user, in a second configuration.
Figure 5:
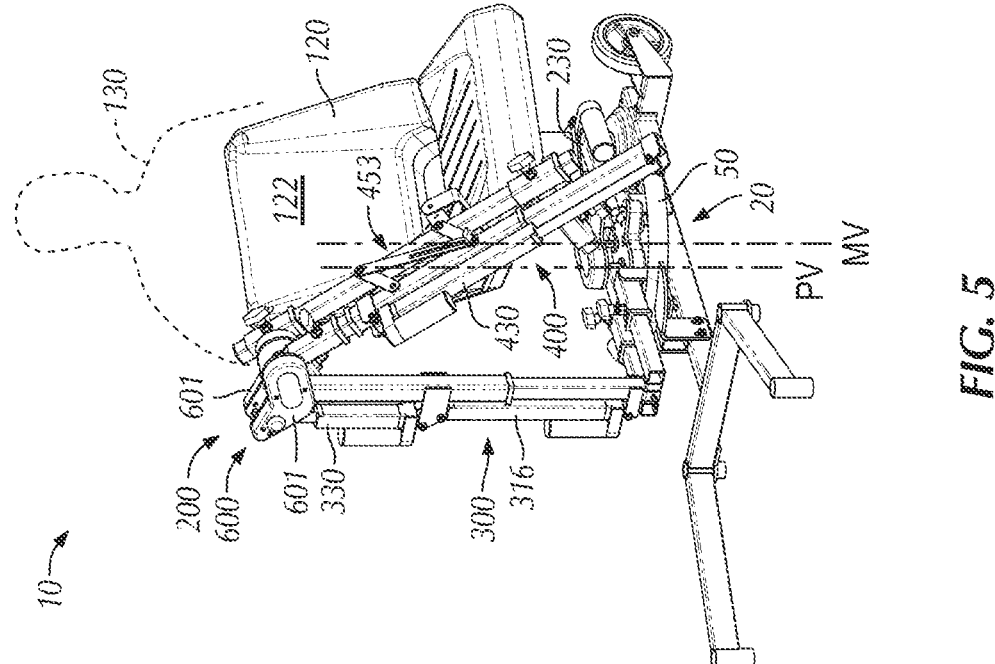
Figures 7, 8:
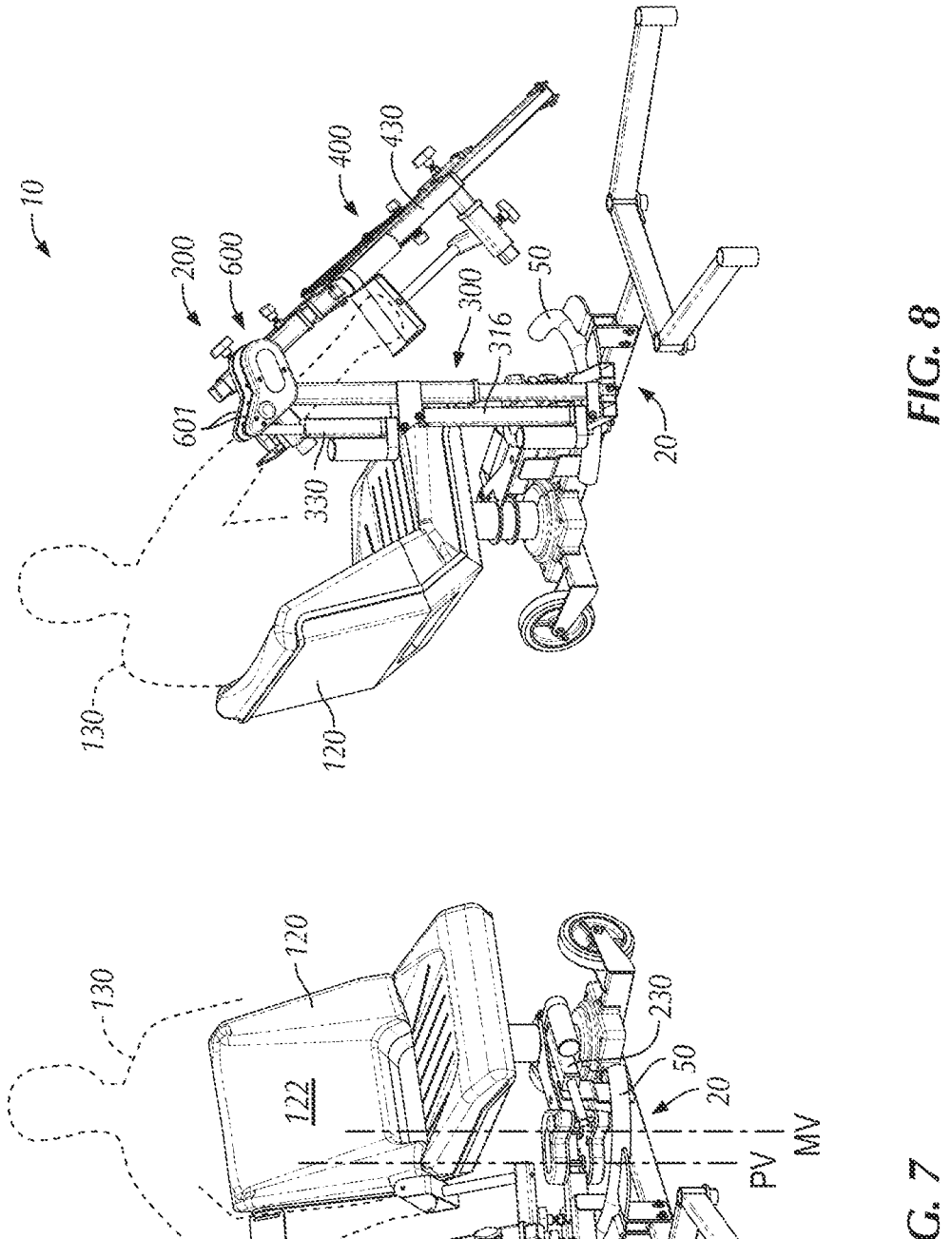
FIGS. 7 and 8 are respectively a front right perspective view and a rear right perspective view of the SROM machine of FIG. 1 arranged to manipulate the right shoulder of the user, in a third configuration.

In use, the SROM machine 10 may provide a variety of movements to impose a variety of forces or movements upon the shoulder of the user 130. Referring to FIGS. 5-8, the horizontal linear actuator 230 may allow the movable base frame 202 to be rotated about the planet vertical axis PV and to be simultaneously revolved around the main vertical axis MV. FIGS. 3 and 4 are perspective views of the device in a first configuration, configured for engagement of the right arm of the user 130, with the right arm of the user 130 oriented relatively internally with respect to both horizontal and vertical rotation, with the arm oriented downwardly with respect to the corresponding shoulder of the user 130. FIGS. 5 and 6 are views of the SROM machine 10 in a second configuration, with the right arm of the user being externally rotated in comparison to FIGS. 3 and 4. Movement of the vertical support 300, the arm-carrier support 400, and the arm carrier 450 from the first configuration of FIGS. 3 and 4 to the second configuration of FIGS. 5 and 6, and vice versa, may be accomplished by actuating the horizontal linear actuator 230 to cause the desired movement with respect to the main vertical axis MV and the planet vertical axis PV, including any desired movement with respect to the main vertical axis MV and the planet vertical axis PV within the operating range of the SROM machine 10. FIGS. 7 and 8 are views of the SROM machine 10 in a third configuration, with the SROM machine 10 configured to position the right arm of the user 130 to be further externally rotated in comparison to FIGS. 5 and 6. Movement of the vertical support 300, the arm-carrier support 400, and the arm carrier 450 from the second configuration of FIGS. 5 and 6 to the third configuration of FIGS. 7 and 8, and vice versa, may be accomplished by actuating the horizontal linear actuator 230 to cause the desired movement with respect to the main vertical axis MV and the planet vertical axis PV. A method of exercising or stretching a shoulder of the user 130 may comprise extending and contracting the horizontal linear actuator 230 of the SROM machine 10, including continuously and repeatedly comprise extending and contracting the horizontal linear actuator 230 of the SROM machine 10, in order to impose external and/or internal rotation upon the shoulder of the user 130, one example of which is illustrated by FIGS. 3-8.

Figures 9, 10:
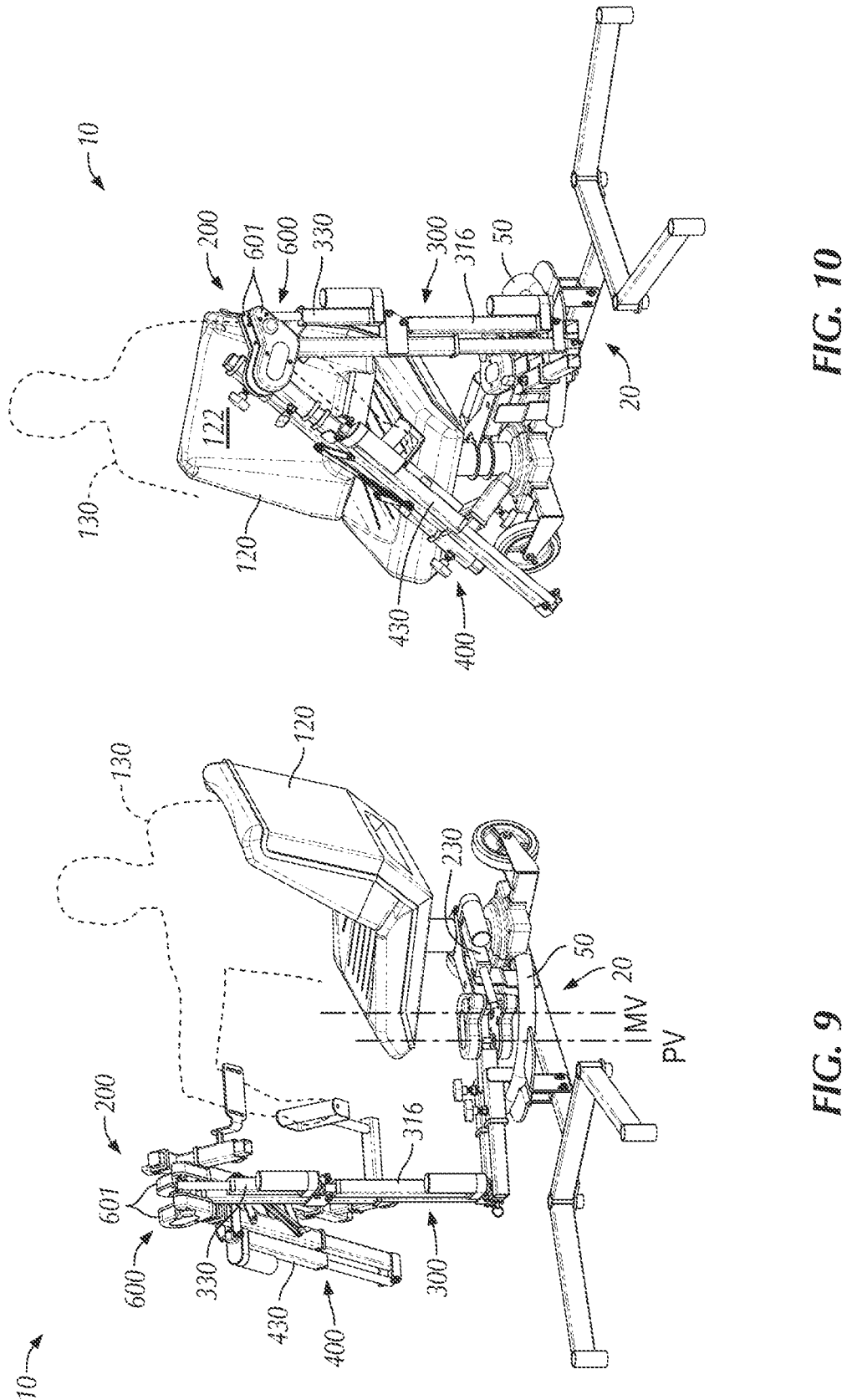
FIGS. 9 and 10 are respectively a front right perspective view and a rear right perspective view of the SROM machine of FIG. 1 arranged to manipulate a left shoulder of the user, in a fourth configuration.
Figures 11, 12:
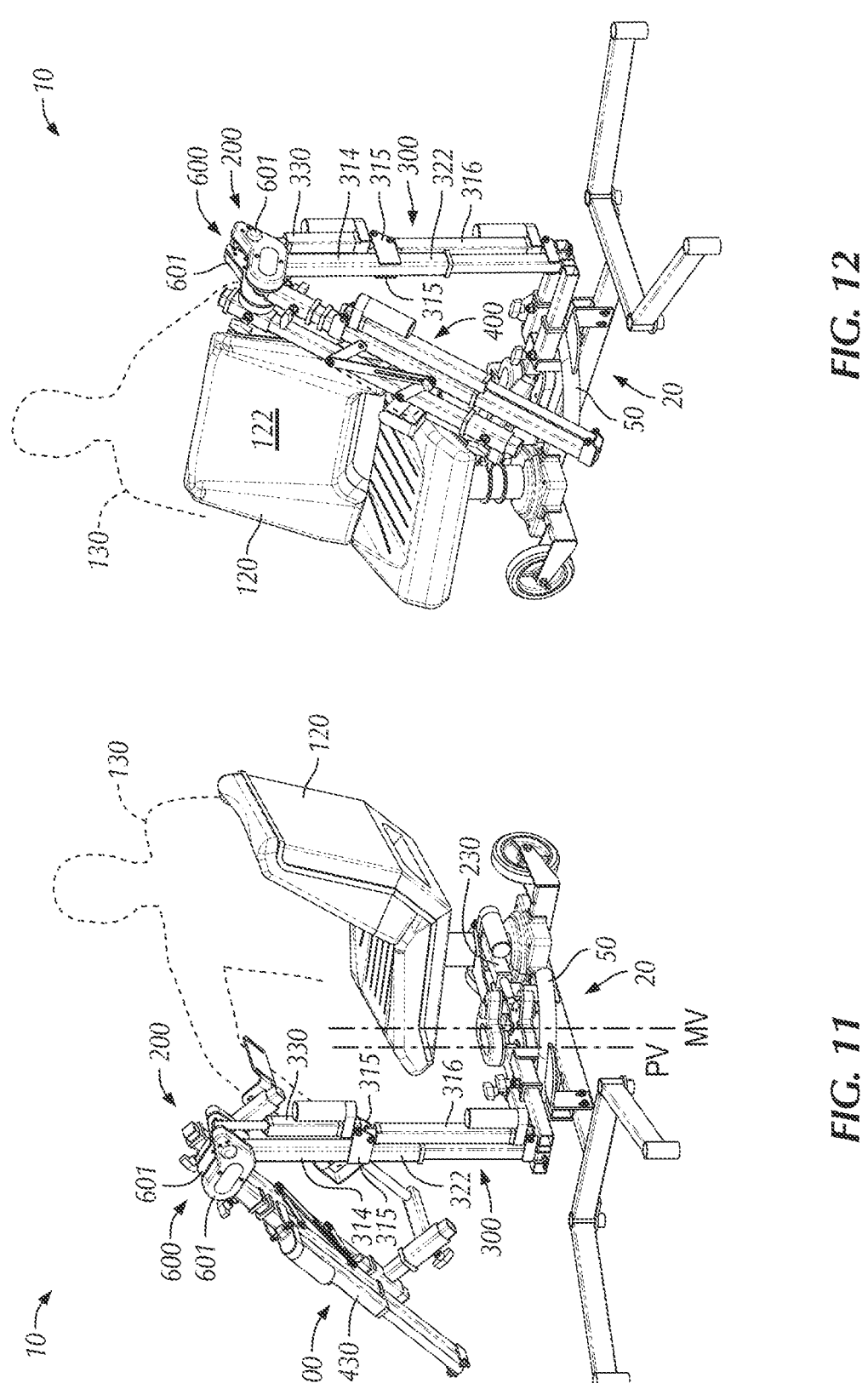
FIGS. 11 and 12 are respectively a front right perspective view and a rear right perspective view of the SROM machine of FIG. 1 arranged to manipulate the left shoulder of the user, in a fifth configuration.
Figures 13, 14:
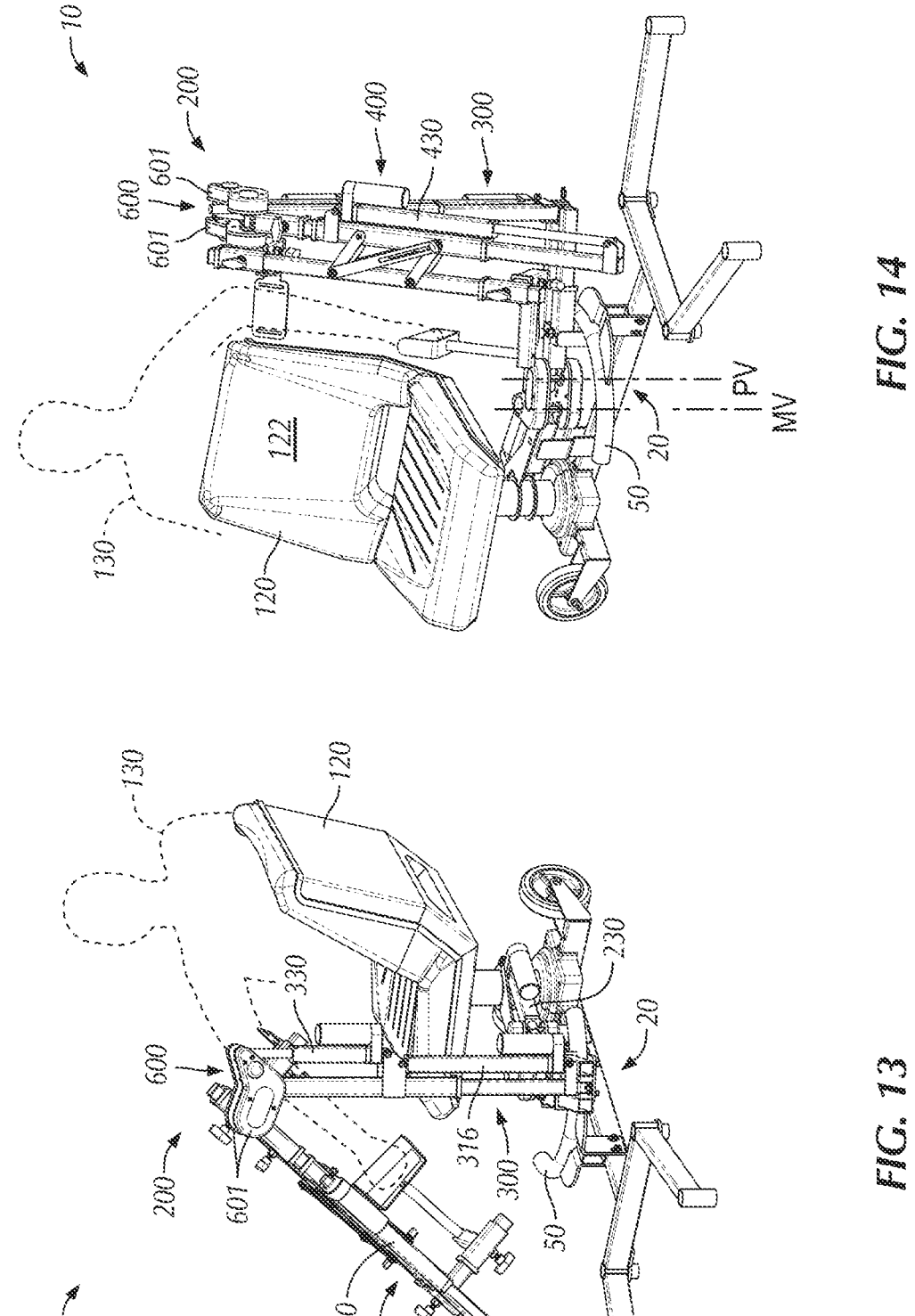
FIGS. 13 and 14 are respectively a front right perspective view and a rear right perspective view of the SROM machine of FIG. 1 arranged to manipulate the left shoulder of the user, in a sixth configuration.

Referring to FIGS. 9-14, the SROM machine 10 is shown in configurations similar to those shown in FIGS. 3-8, with the exception that the SROM machine 10 is configured to manipulate a left arm and shoulder of the user 130 in FIGS. 9-14. FIGS. 9 and 10 are perspective views of the device in a fourth configuration, configured for engagement of the left arm of the user 130, with the left arm of the user oriented relatively internally with respect to both horizontal and vertical rotation, with the arm oriented downwardly with respect to the corresponding shoulder of the user 130. FIGS. 11 and 12 are views of the SROM machine 10 in a fifth configuration, with the left arm of the user 130 being externally rotated in comparison to FIGS. 9 and 10. Movement of the vertical support 300, the arm-carrier support 400, and the arm carrier 450 from the fourth configuration of FIGS. 9 and 10 to the fifth configuration of FIGS. 11 and 12, and vice versa, may be accomplished by actuating the horizontal linear actuator 230 to cause the desired movement with respect to the main vertical axis MV and the planet vertical axis PV, including any desired movement with respect to the main vertical axis MV and the planet vertical axis PV within the operating range of the SROM machine 10. FIGS. 13 and 14 are views of the SROM machine 10 in a sixth configuration, with the left arm of the user being further externally rotated in comparison to FIGS. 11 and 12. Movement of the vertical support 300, the arm-carrier support 400, and the arm carrier 450 from the fifth configuration of FIGS. 11 and 12 to the sixth configuration of FIGS. 13 and 14, and vice versa, may be accomplished by actuating the horizontal linear actuator 230 to cause the desired movement with respect to the main vertical axis MV and the planet vertical axis PV. A method of exercising or stretching a shoulder of the user 130 may comprise extending and contracting the horizontal linear actuator 230 in order to impose external and/or internal rotation upon the shoulder of the user 130. A method of exercising or stretching a shoulder of the user 130 may comprise extending and contracting the horizontal linear actuator 230 in order to impose external and/or internal rotation upon the shoulder of the user 130, one example of which is illustrated by FIGS. 9-14.

Figures 15, 16:
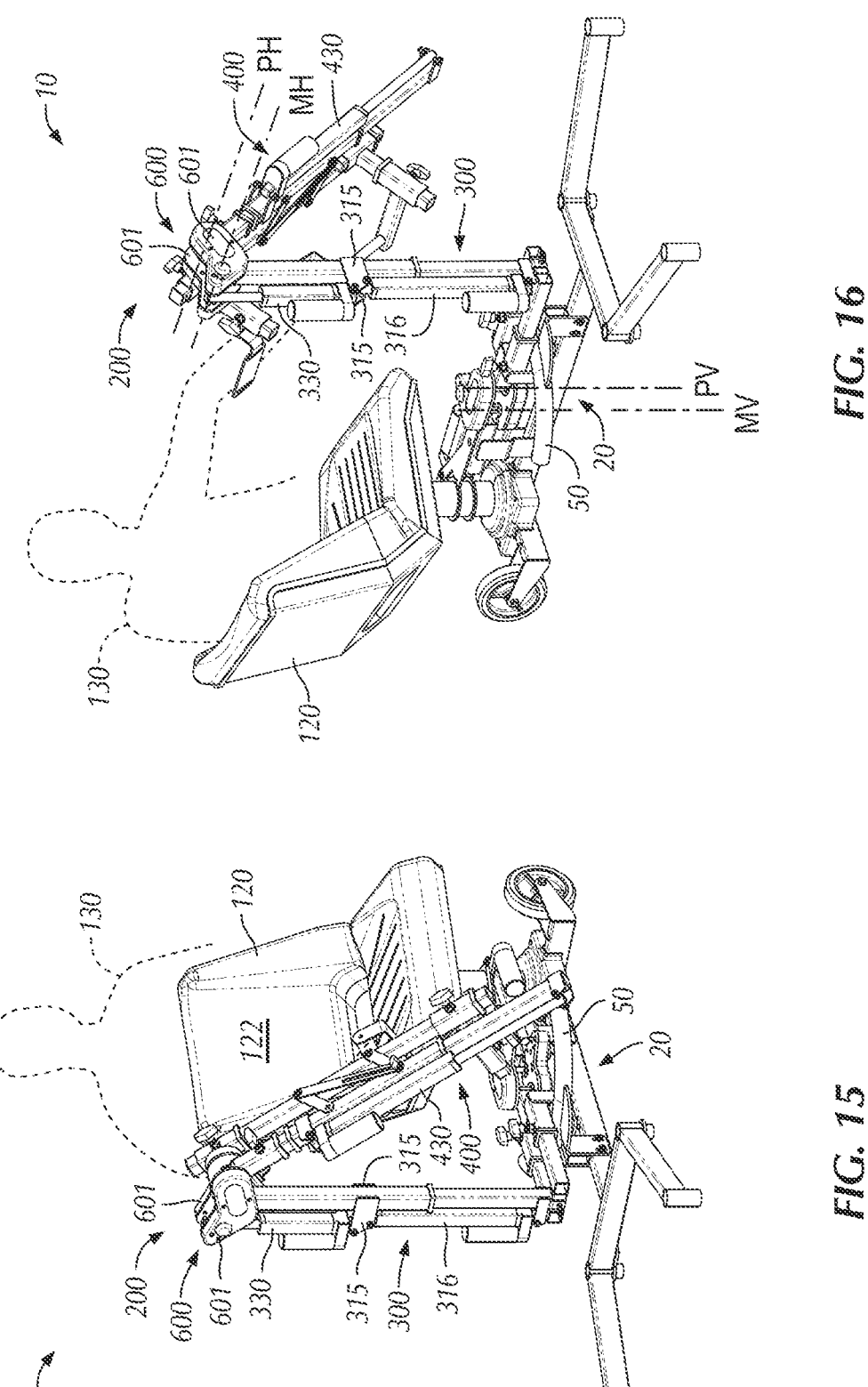
FIGS. 15 and 16 are respectively a front right perspective view and a rear right perspective view of the SROM machine of FIG. 1 arranged to manipulate the right shoulder of the user, in the second configuration, which is the same configuration shown in FIGS. 5 and 6, to allow convenient comparison with a seventh configuration shown in FIGS. 17 and 18.
Figures 17, 18:
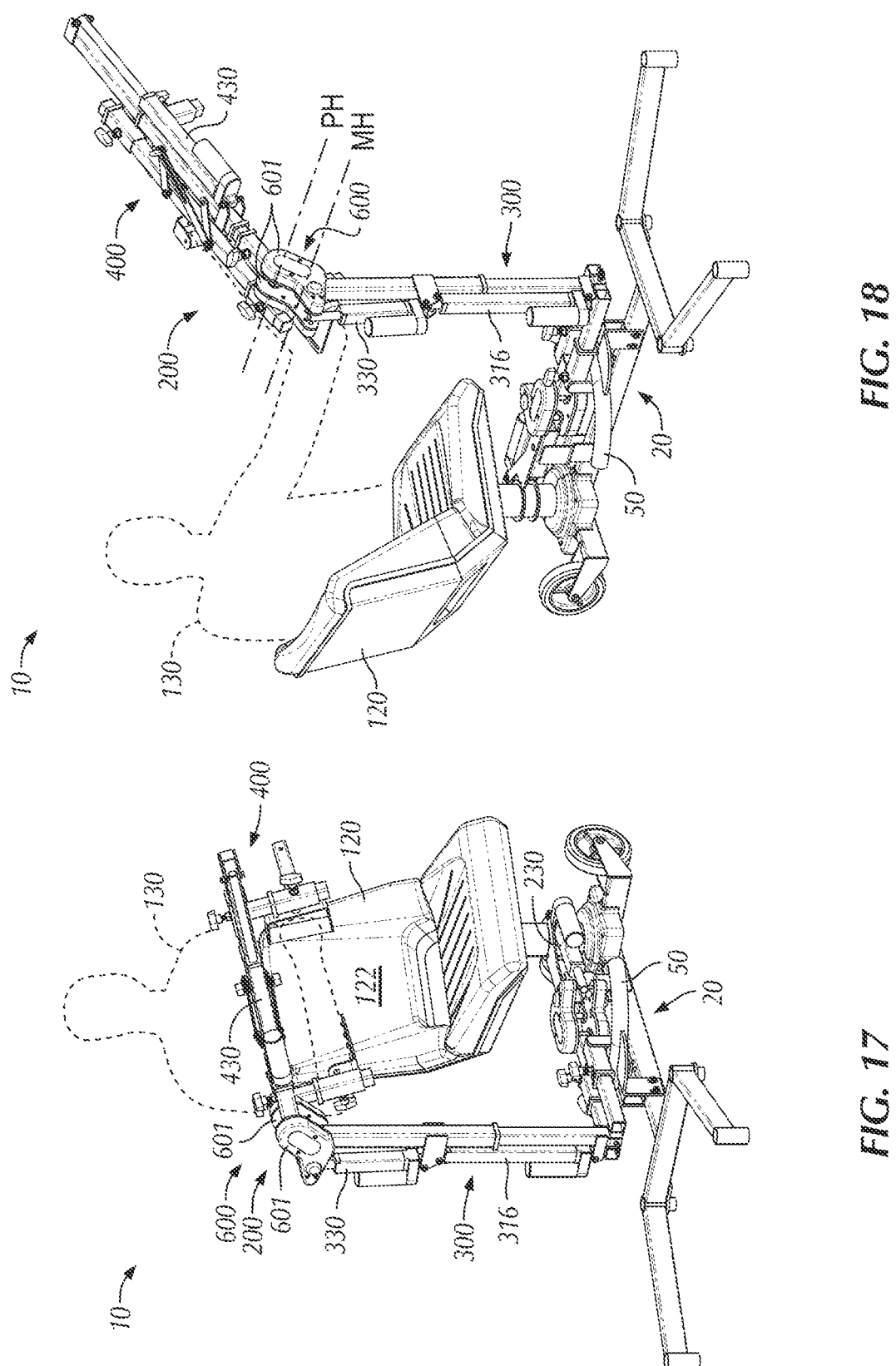
FIGS. 17 and 18 are respectively a front right perspective view and a rear right perspective view of the SROM machine of FIG. 1 arranged to manipulate the right shoulder of the user, in the seventh configuration.
Figures 19, 20:
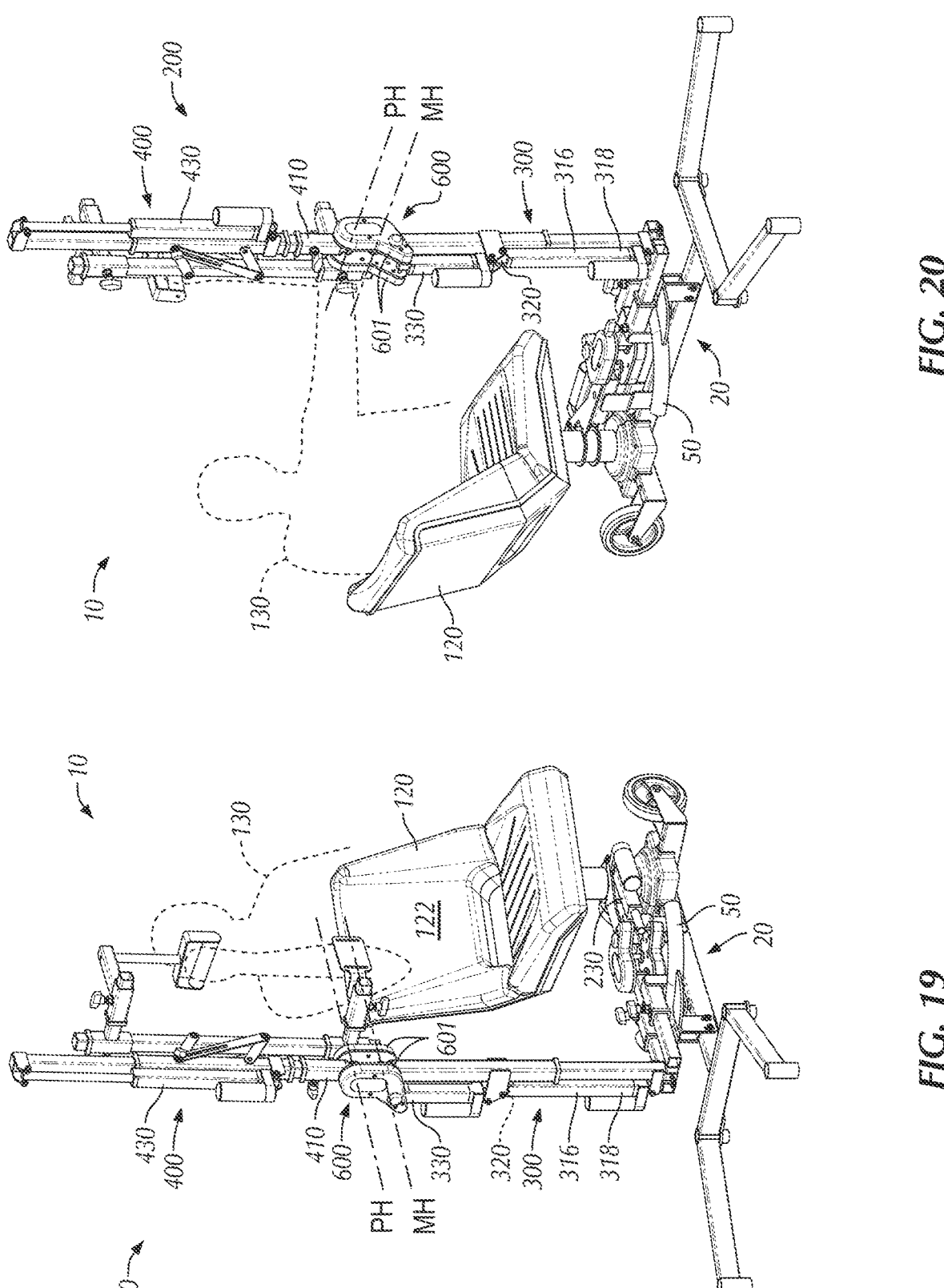
FIGS. 19 and 20 are respectively a front right perspective view and a rear right perspective view of the SROM machine of FIG. 1 arranged to manipulate the right shoulder of the user, in an eighth configuration.

Referring to FIGS. 15-20, the arm-carrier-angle linear actuator 330 may allow the arm-carrier support 400 and the arm carrier 450 to be rotated about the planet horizontal axis PH and simultaneously revolved around the main horizontal axis MH within the range of motion of the SROM machine 10. FIGS. 15 and 16 are views of the SROM machine 10 of FIG. 1 arranged in the second configuration, which is the same configuration shown in FIGS. 5 and 6, to allow convenient comparison with the seventh configuration shown in FIGS. 17 and 18 and the eighth configuration shown in FIGS. 19 and 20. FIGS. 15 and 16 are perspective views of the SROM machine 10 in the second configuration, configured for engagement of the right arm of the user 130, with the right arm of the user 130 oriented relatively internally with respect to both horizontal and vertical rotation (with the arm oriented downwardly with respect to the corresponding shoulder of the user 130). FIGS. 17 and 18 are views of the SROM machine 10 in the seventh configuration, with the right arm of the user being externally rotated in horizontal rotation in comparison to FIGS. 15 and 16. Movement of the arm-carrier support 400 and the arm carrier 450 from the second configuration of FIGS. 15 and 16 to the seventh configuration of FIGS. 17 and 18, and vice versa, may be accomplished by actuating the arm-carrier-angle linear actuator 330 to cause the desired movement with respect to the main horizontal axis MH and the planet horizontal axis PH through the action of the upper geared hinge 600. FIGS. 19 and 20 are views of the SROM machine 10 in the eighth configuration, with the right arm of the user being further externally rotated in horizontal rotation in comparison to FIGS. 17 and 18. Movement of the arm-carrier support 400 and the arm carrier 450 from the seventh configuration of FIGS. 17 and 18 to the eighth configuration of FIGS. 19 and 20, and vice versa, may be accomplished by actuating the arm-carrier-angle linear actuator 330 to cause the desired movement with respect to the main horizontal axis MH and the planet horizontal axis PH. A method of exercising or stretching a shoulder of the user 130 may comprise alternately extending and contracting the arm-carrier-angle linear actuator 330 in order to impose external and/or internal horizontal rotation upon the shoulder of the user 130, one example of which is illustrated by FIGS. 15-20.

Figures 21, 22:
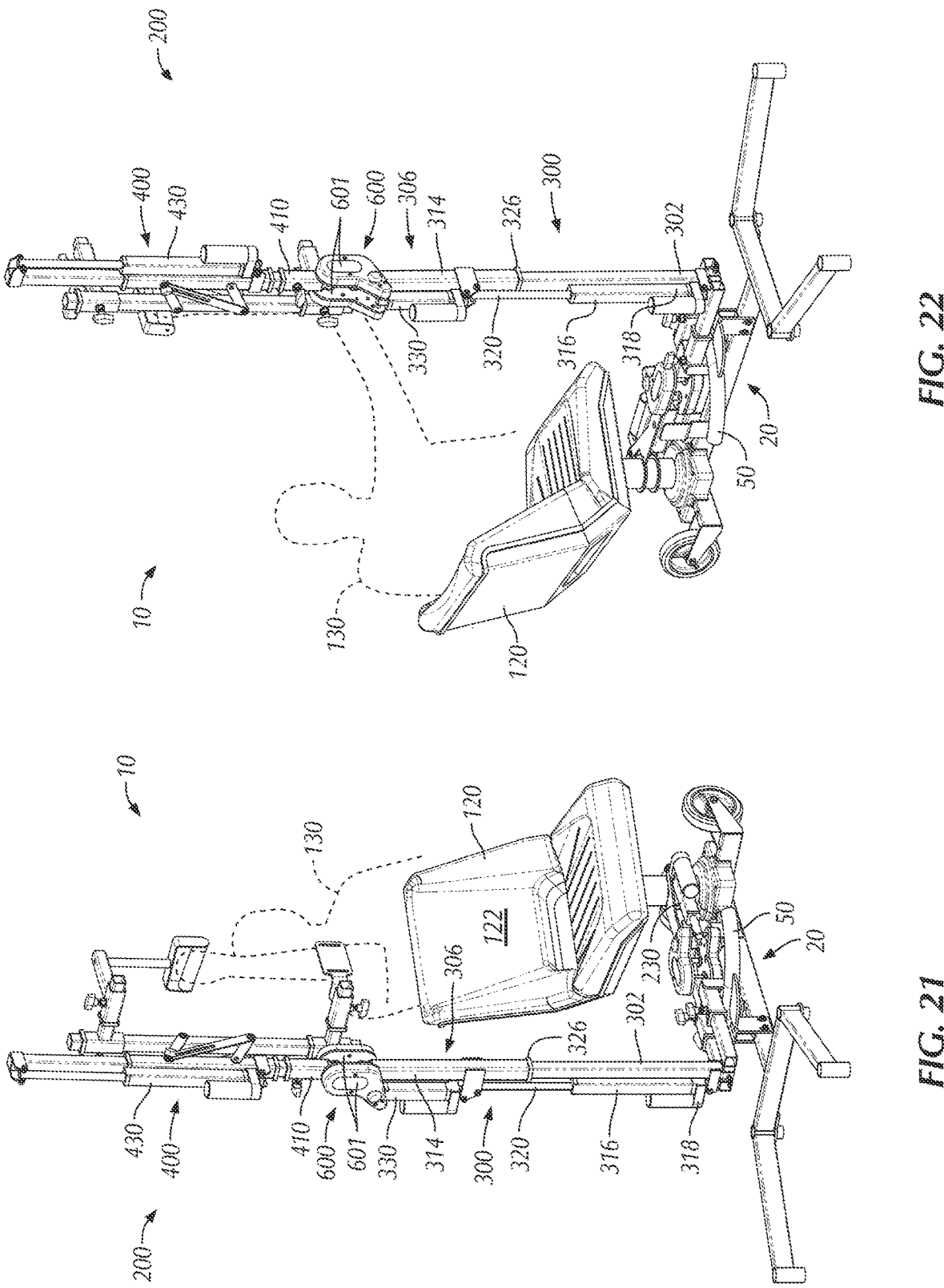
FIGS. 21 and 22 are respectively a front right perspective view and a rear right perspective view of the SROM machine of FIG. 1 arranged to manipulate the right shoulder of the user, in a ninth configuration.

Referring to FIGS. 19-22, the arm-support-length linear actuator 316 allows the vertical support 300 to be extended and contracted through relative movement of the upper vertical tube 314 with respect to the lower vertical tube 302 within the range of motion of the SROM machine 10. FIGS. 19 and 20 are views of the SROM machine 10 of FIG. 1 arranged in the eighth configuration, as discussed in the preceding paragraph. FIGS. 21 and 22 are perspective views of the SROM machine 10 in a ninth configuration, with the arm-support-length linear actuator 316 extended, thereby moving the upper vertical tube 314 further upwardly with respect to the lower vertical tube 302, thus driving the arm-carrier support 400, the arm carrier 450, and the upper geared hinge 600 upwardly as well. The arm-support-length linear actuator 316 may extend and contract to raise and lower the arm-carrier support 400, the arm carrier 450, and the upper geared hinge 600, while the arm-carrier support 400, the arm carrier 450, and the upper geared hinge 600 may be further positionable with respect to one another through actuation of the horizontal linear actuator 230, the arm-carrier-angle linear actuator 330, and the reach-movement linear actuator 430. The components need not be arranged as shown in FIGS. 19-22; see FIGS. 25-28, as discussed below. The upper vertical tube 314 of the vertical support 300 may be moved upwardly and downwardly as shown in FIGS. 19-22 through control of the arm-support-length linear actuator 316, with the movement allowing adjustment of the SROM machine 10 to the user 130. It may be advantageous to align the upper geared hinge 600 vertically with the shoulder of the user 130 so that the first phase and second phase of movement provided by the upper geared hinge may provide a corresponding movement of the shoulder of the user 130.

Figure 24:
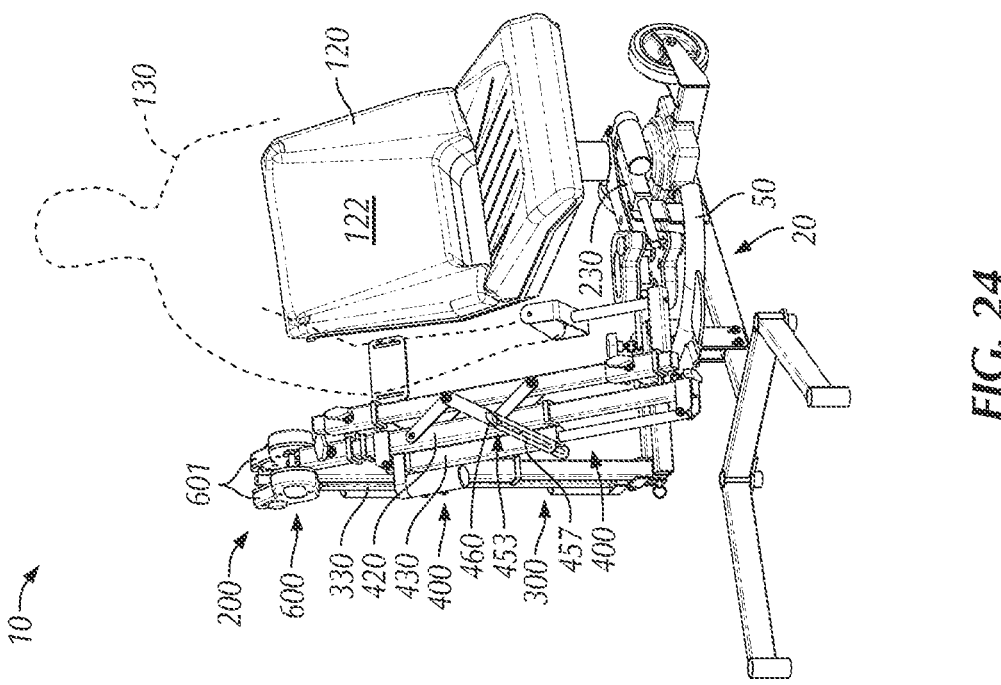
FIG. 24 is a front right perspective view of the SROM machine of FIG. 1 arranged to manipulate the right shoulder of the user, in an eleventh configuration, with an axial base of an arm carrier being set closer to a sliding base of an arm-carrier support than in the tenth configuration of FIG. 23.
Figure 23:
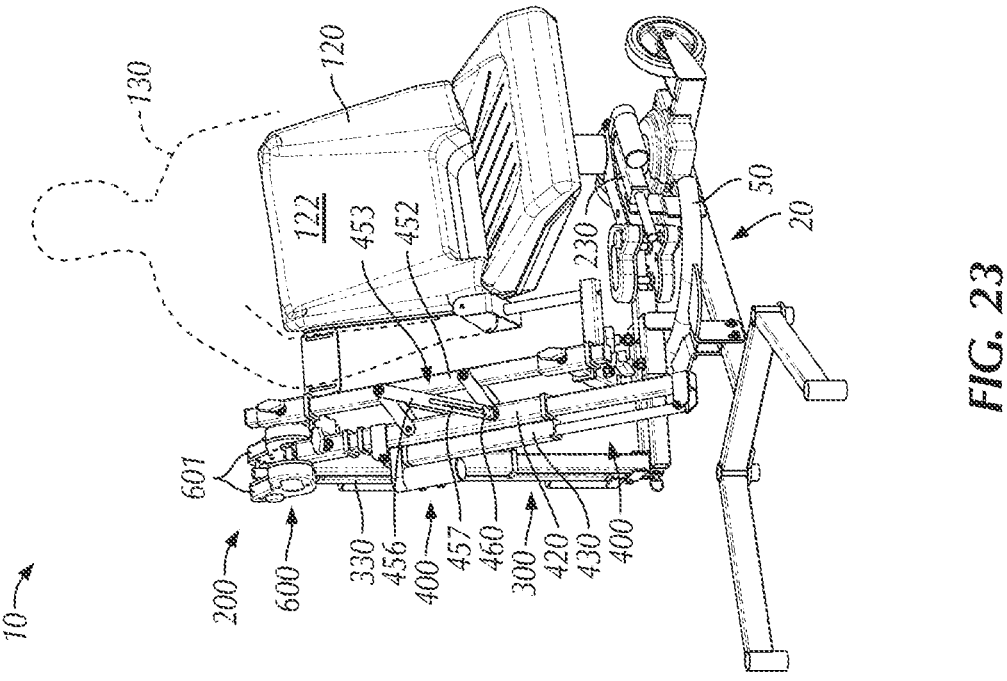
FIG. 23 is a front right perspective view of the SROM machine of FIG. 1 arranged to manipulate the right shoulder of the user, in a tenth configuration.

Referring to FIGS. 23 and 24, the effect of adjusting the connector linkages 453 is illustrated. Comparing FIG. 23 to FIG. 24, by adjustment of the position of the second pinned joint within the slot 457 of the diagonal link 456 (described in greater detail above), the distance between the axial base 452 of the arm carrier 450 and the sliding base 420 of the arm-carrier support 400 may be increased or decreased. A method of treating or exercising the shoulder of the user 130 may include adjusting the distance between the axial base 452 of the arm carrier 450 and the sliding base 420 of the arm-carrier support 400.

Figures 25, 26:
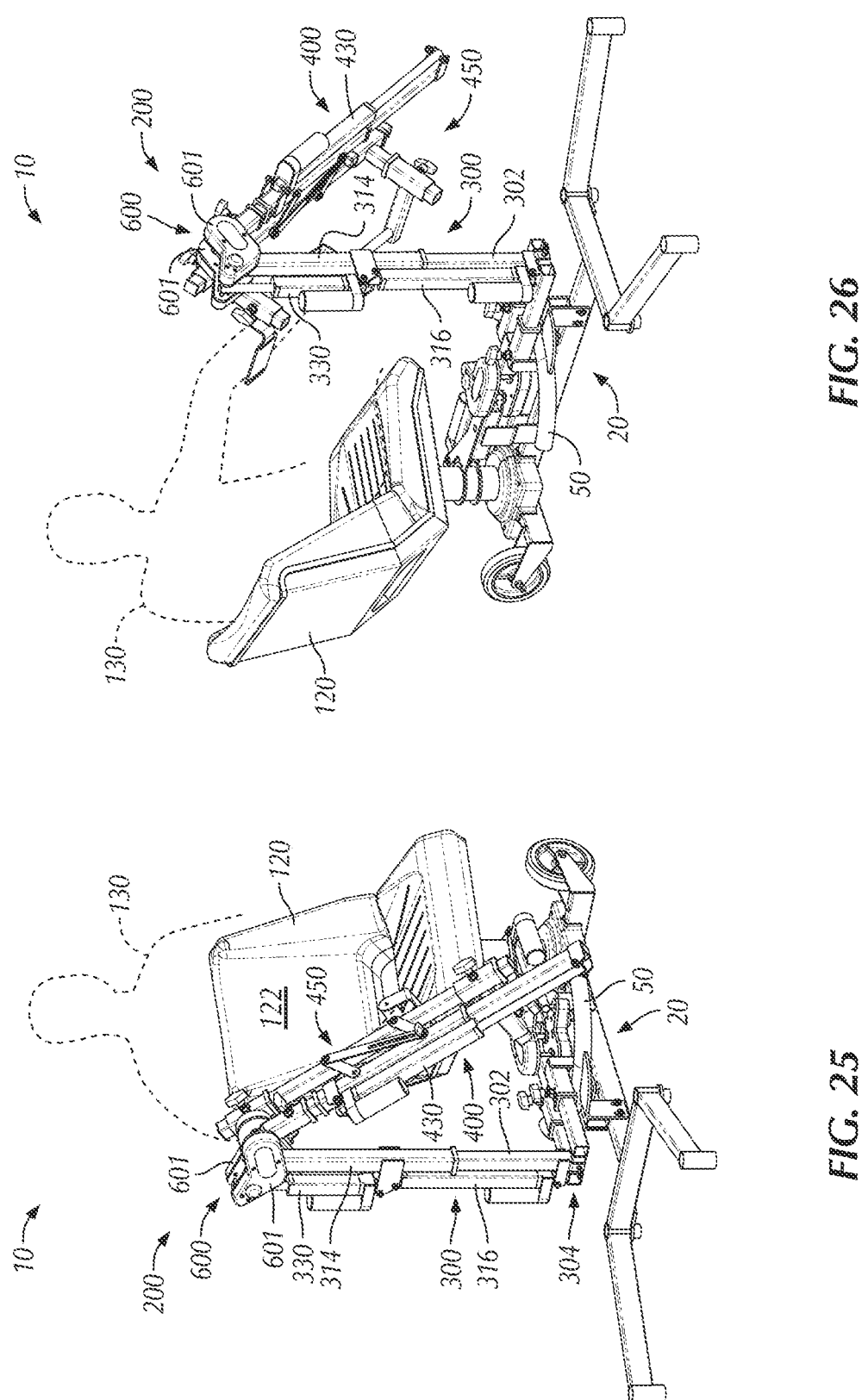
FIGS. 25 and 26 are respectively a front right perspective view and a rear right perspective view of the SROM machine of FIG. 1 arranged to manipulate the right shoulder of the user, in the second configuration, which is the configuration shown in FIGS. 5 and 6, to allow convenient comparison with a twelfth configuration shown in FIGS. 27 and 28.
Figures 27, 28:
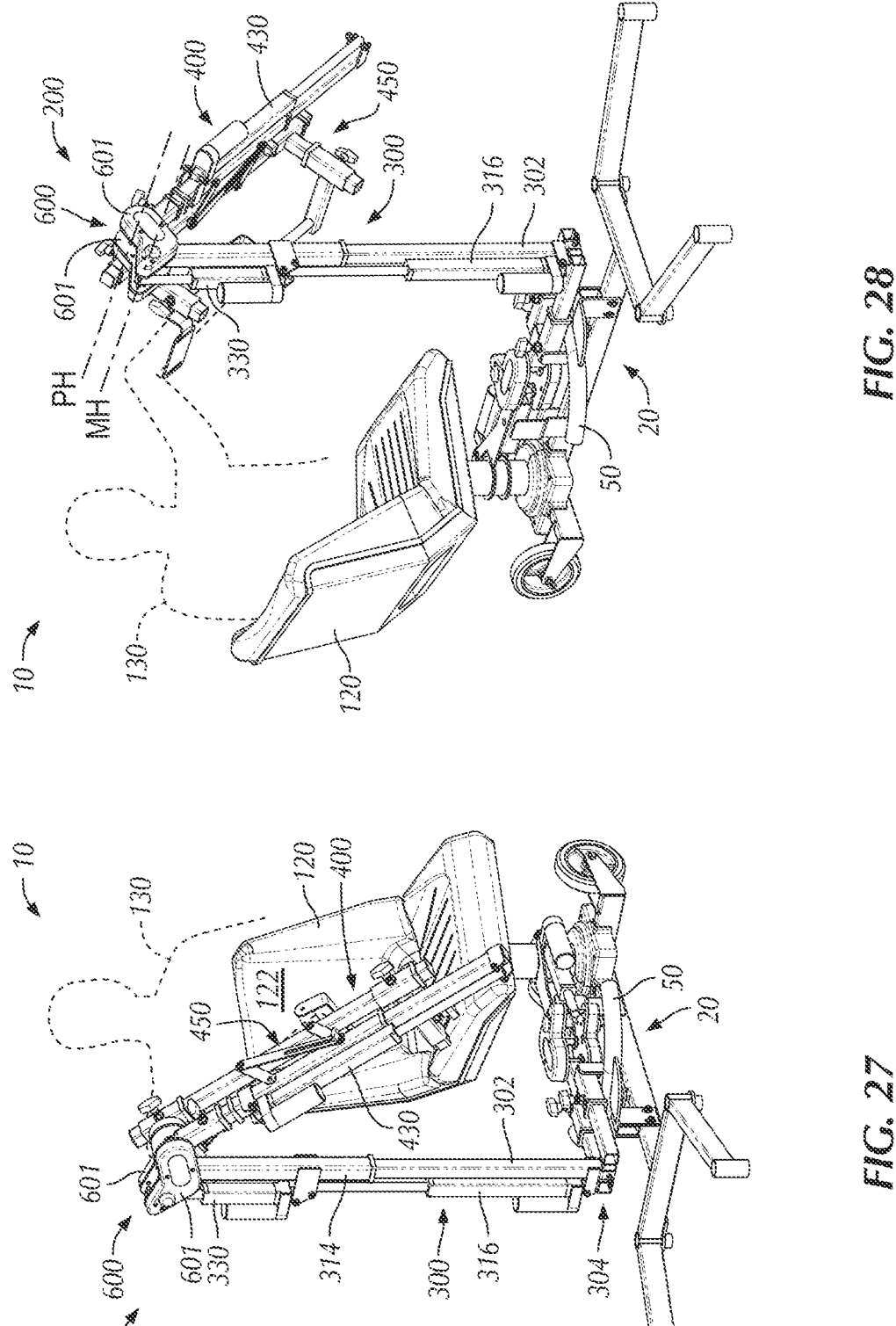
FIGS. 27 and 28 are respectively a front right perspective view and a rear right perspective view of the SROM machine of FIG. 1 arranged to manipulate the right shoulder of the user, in the twelfth configuration.

Referring to FIGS. 25-28, the arm-support-length linear actuator 316 may allow the vertical support 300 to be extended and contracted through relative movement of the upper vertical tube 314 with respect to the lower vertical tube 302, in the same fashion as discussed above with respect to FIGS. 19-22, but with the arm carrier 400 in a different orientation with respect to the vertical support 300. FIGS. 25 and 26 are views of the SROM machine 10 of FIG. 1 in the second configuration, which is the same configuration shown in FIGS. 5 and 6, to allow convenient comparison with the twelfth configuration shown in FIGS. 27 and 28, with the arm-support-length linear actuator 316 extended, thereby moving the upper vertical tube 314 further upwardly with respect to the lower vertical tube 302, thus driving the arm-carrier support 400, the arm carrier 450, and the upper geared hinge 600 upwardly as well. The arm-support-length linear actuator 316 may extend and contract to raise and lower these components regardless of their configuration relative to one another; FIGS. 19-22 and FIGS. 25-28 show two of the many distinct configurations in which this movement may occur. The upper vertical tube 314 of the vertical support 300 may be moved upwardly and downwardly as shown in FIGS. 25-28 through control of the arm-support-length linear actuator 316, with the movement allowing adjustment of the SROM machine 10 to the user 130. As noted previously, it may be advantageous to align the upper geared hinge 600 with a shoulder of the user 130 so that the first phase and second phase of movement provided by the upper geared hinge 600 may provide a corresponding movement of the shoulder. A method of exercising or treating the shoulder of the user 130 may comprise extending and contracting (including continuously and repeatedly extending and contracting) the arm-support-length linear actuator 316 of the SROM machine 10 in order to impose a force or movement upon an arm of the user 130 or to align the upper geared hinge 600 with respect to the shoulder of the user 130.

Figures 29, 30:
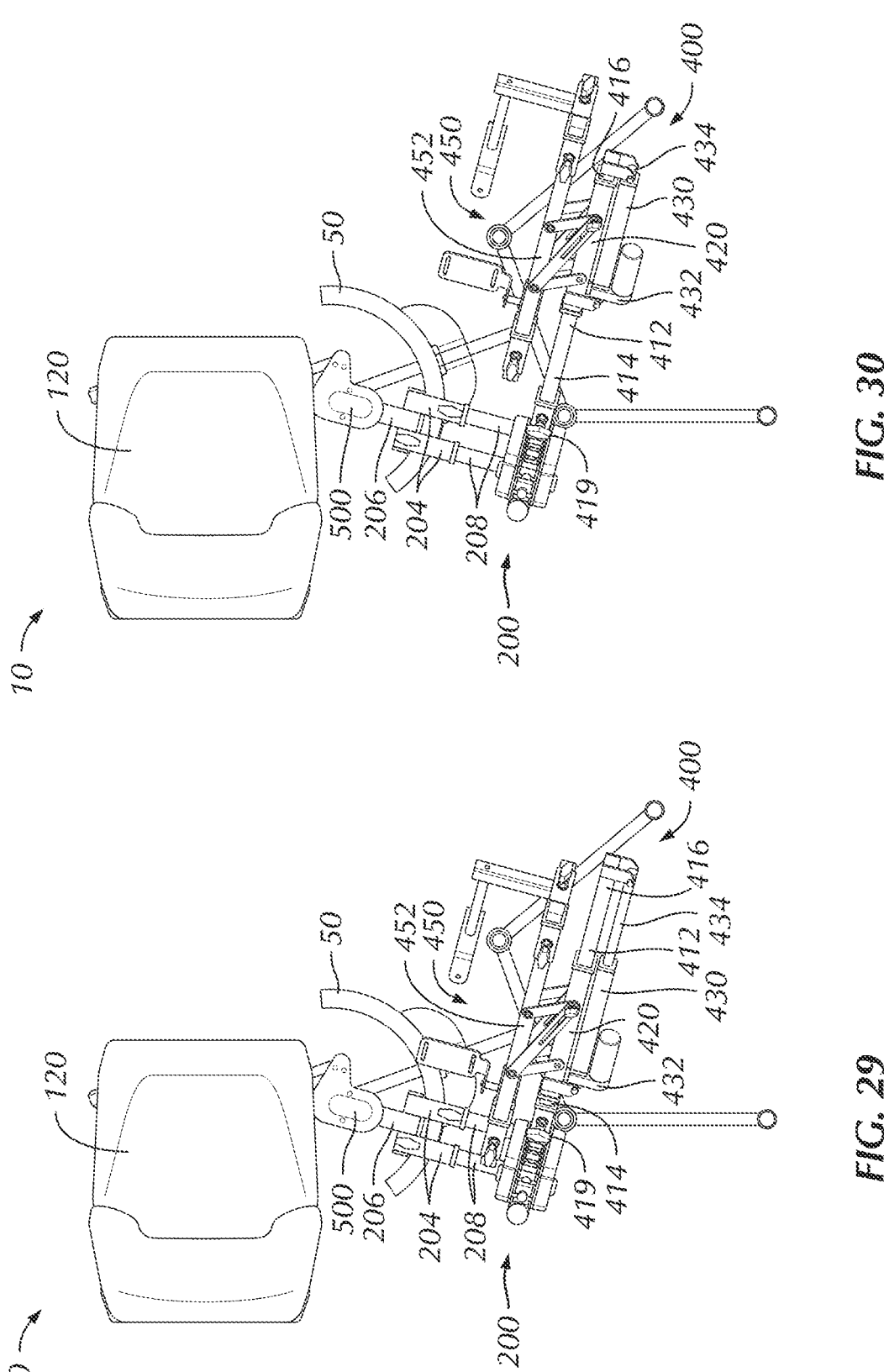
FIGS. 29 and 30 are top plan views of the SROM machine of FIG. 1 arranged to manipulate the right shoulder of the user, in a thirteenth configuration and a fourteenth configuration, respectively, with the views in combination depicting distal movement of the arm carrier with respect to the arm-carrier support.

Referring to FIGS. 29-32, the reach-movement linear actuator 430 may allow the sliding base 420 of the arm-carrier support 400 to be moved axially along the length of the inner tube 412. FIGS. 29 and 31 are views of the SROM machine 10 in the thirteenth configuration, with the sliding base 420 located toward the proximal portion 414 of the inner tube 412. FIGS. 30 and 32 are views of the SROM machine 10 in the fourteenth configuration, with the sliding base 420 located toward the distal portion 416 of the inner tube 412. Movement of the sliding base 420 and the arm carrier 450 from the thirteenth configuration of FIGS. 29 and 31 to the fourteenth configuration of FIGS. 30 and 32, and vice versa, may be accomplished by actuating the reach-movement linear actuator 430 to cause the desired movement. A method of exercising or treating a shoulder of the user 130 may comprise extending and contracting the reach-movement linear actuator 430 of the SROM machine 10 in order to impose a force or movement upon an arm of the user 130, one example of which is illustrated by FIGS. 29-32. When the reach-movement linear actuator 430 is extended and contracted in this fashion, the resulting movement may be referenced as a "reach" movement, particularly when the arm-carrier support 400 and the arm carrier 450 are oriented horizontally, as in FIGS. 29-32. The reach-movement linear actuator 430 may be extended and contracted in the same fashion with the arm-carrier support 400 and the arm carrier 450 in any orientation of which the device is capable. When the reach-movement linear actuator 430 is extended and contracted in this fashion, and the arm-carrier support 400 and the arm carrier 450 are oriented vertically or within about 45 degrees of vertical, as in FIGS. 19-22, the resulting movement may be referenced as a "wall crawl" movement.

A method of manipulating a shoulder of a user 130 may comprise one or more of the following steps using a SROM machine 10 as disclosed herein.

The seat 120, or a separate seat where the seat 120 is not provided, may be oriented so that the shoulder of the user 130 to be manipulated is oriented toward the shoulder-manipulation mechanism 200 when the user 130 is seated with the back of the user 130 oriented toward the backrest 122.

The vertical support 300 and attached elements of the shoulder-manipulation mechanism 200 may be oriented compatibly with respect to the seat 120. Orienting the vertical support 300 and attached elements of the shoulder-manipulation mechanism 200 may include detaching the vertical support 300 from the movable base frame 202, orienting the vertical support 300 so that the front side 314a of the upper vertical tube 314 faces the same direction as the user 130 seated with the back of the user 130 against the backrest 122 of the seat 120, and securing the vertical support 300 to the movable base frame 202 in the desired orientation.

The arm-carrier support 400 may be oriented compatibly with respect to the seat 120. Orientation of the arm-carrier support 400 may include detaching the inner tube 412 of the arm-carrier support 400 from the arm-carrier base 410, orienting the arm-carrier support 400 so that the arm carrier 450 is on a corresponding side of the arm-carrier support 400 as the seat 120 and the user 130, and re-attaching the inner tube 412 of the arm-carrier support 400 to the arm-carrier base 410.

A working height of the upper geared hinge 600 may be set by actuation of the arm-support length linear actuator

316. In certain embodiments, at the working height, the upper geared hinge 600 may be vertically aligned with respect to the shoulder of the user 130 for manipulation of the shoulder.

A shoulder-manipulation-mechanism position of the shoulder-manipulation mechanism 200 on the movable base frame 202 with respect to the location of a main vertical axis MV may be set. The setting of the shoulder-manipulation-mechanism position may include loosening the indexing members 208 with respect to the tubular base members 204, positioning the indexing members 208 with respect to the tubular base members 204, and locking the indexing members 208 in position with respect to the tubular base members 204.

An arm-carrier-to-arm-carrier-base position may be set. Setting of the arm-carrier-to-arm-carrier-base position may include loosening each adjustment screw 458 of each connector linkage 453 between the arm-carrier support 400 and the arm carrier 450 to allow each diagonal link 456 to slide with respect to each second pivoting joint 454b. Each adjustment screw 458 may be tightened to lock each connector linkage 453, fixing the distance between the axial base 452 of the arm carrier 450 and the sliding base 420 of the arm-carrier support 400.

The arm of the user 130 may be secured to the arm carrier 450. A handgrip 462 may be located in a desired position in relation to an arm of a user 130 by releasing, moving, and securing a handgrip mount 464, which may be releasably secured for axial movement along an axial base 452 of the arm carrier 452. The arm carrier 450 may also include a limb rest such an elbow rest 470, and securing the arm of the user 130 may include releasing, moving, and securing an elbow-rest mount 472, which may be movable along the axial base 452 of the arm carrier 450. Adjustment of the positions of the handgrip mount 464 along the axial base 452, and of the elbow-rest mount 472 along the axial base 452, may allow adjustment of the SROM machine 10 for the length of the arm of the user 130. Securing the arm of the user 130 may include securing the arm to the elbow rest 470 using a strap 480.

After the SROM machine 10 has been adjusted to the user 130 by one or more of the steps above (as needed), the SROM machine 10 may be operated to manipulate the arm and shoulder of the user 130. The controller 1000 may be operated by the user 130 or by another person acting as an operator (not shown) using one or more of the following steps.

A step for treating or exercising the shoulder of the user 130 may comprise actuating a linear actuator to apply internal or external rotation to the arm or shoulder of the user 130 and further may comprise actuating the linear actuator in alternating continuous fashion to apply internal or external rotation to the arm or shoulder of the user 130 repeatedly. In particular, the horizontal linear actuator 230 of the SROM machine 10 may be actuated to apply internal or external rotation to the arm or the shoulder of the user 130. The movement of the linear actuator 230, acting through the mechanisms described herein, may impose both rotation about a planet vertical axis PV and revolution about a main vertical axis MV upon the arm-carrier support 400 and the arm carrier 450, as described above.

A step for treating or exercising the shoulder of the user 130 may comprise actuating a linear actuator to raise and lower the arm of the user 130 to manipulate the shoulder of the user 130 and further may comprise actuating the linear actuator in alternating continuous fashion to raise and lower the arm to manipulate the shoulder of the user 130 repeatedly. In particular, the arm-support-length linear actuator 316 may be actuated to raise and lower the arm to manipulate the shoulder of the user 130. However, as noted above, such movement may be more conveniently accomplished, without altering the alignment of to the upper geared hinge 600 with respect to the user's shoulder, through movement of the arm carrier 450 along the arm-carrier support 400, as described below.

A step for treating or exercising the shoulder of the user 130 may comprise actuating a linear actuator to rotate the arm of the user 130 in an abduction or adduction movement and further may comprise actuating the linear actuator in alternating continuous fashion to rotate the arm of the user 130 in an abduction or adduction movement repeatedly. In particular, an arm-carrier-angle linear actuator 330 may be actuated and may act through a geared hinge, such as an upper geared hinge 600, to move the arm-carrier support 400 and the arm carrier 450 in an abduction or adduction movement, wherein the movement involves both rotation about a planet horizontal axis PH and revolution about a main horizontal axis MH, as described above. As described above, the upper geared hinge 600 as disclosed herein advantageously may impose two phases of movement and/or two phases of loading upon the arm and shoulder of the user 130 upon actuation of the arm-carrier-angle linear actuator 330. Alternatively, the upper geared hinge 600 may be configured in similar fashion to the previously described lower geared hinge 500.

A step for treating or exercising the shoulder of the user 130 may comprise actuating a linear actuator to impose a generally axial tensile or compressive load or movement on the arm and shoulder of the user 130 and further may comprise actuating the linear actuator in alternating continuous fashion to impose a generally axial tensile or compressive load on the arm and shoulder of the user 130 repeatedly. In particular, a reach-movement linear actuator 430 may be actuated to impose an tensile or compressive load or movement, and/or a proximal or distal movement, of the arm of the user 130, with a resulting similar load or movement being imposed on the shoulder of the user 130. The reach-movement linear actuator 430 may be actuated to apply such a load or movement with the arm of the user in a wide range of positions, as imposed by actuation of one or more of the horizontal linear actuator 230, the arm-support-length linear actuator 316, or the arm-carrier-angle linear actuator 330, as discussed above.

A method of manipulating a first shoulder of a first user 130, the shoulder being on the right side or the left side of the first user 130, may include performing (as needed) the steps of orienting the seat 120, orienting the shoulder-manipulation mechanism 200, and orienting the arm-carrier support 400, as described above. The method may further comprise manipulating a second shoulder of the first user 130 or, more commonly, of a second user 130, wherein if the first shoulder of the first user 130 was on the right side of the user 130, then the second shoulder of the second user 130 is on the left side of the user 130; and wherein if the first shoulder of the first user 130 was on the left side of the user 130, then the second shoulder of the second user 130 is on the right side of the user 130. In preparation for manipulating the second shoulder of the second user 130, the method may include the steps of orienting the seat 120, orienting the shoulder-manipulation mechanism 200, and orienting the arm-carrier support 400 (orienting the inner tube 412 with respect to the arm-carrier base 410), as described above.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

With respect to the methods and processes described herein, those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

Referring to FIGS. 45-50, a second embodiment of an SROM machine 2010 may be similar in configuration to the SROM machine 10 that is discussed above. The SROM machine 2010 may include a seat 2120, a stationary base frame 2020, a movable base frame 2202, a shoulder-manipulation mechanism 2200, a vertical support 2300, an arm-carrier support 2400, an arm carrier 2450, a lower geared hinge 2500, an upper geared hinge 2600, and a controller (FIG. 44). These elements of the SROM machine 2010, for which the reference numerals differ by 2000 from the reference numerals of identical or similar elements of the SROM machine 10 discussed above, and the sub-elements and connected elements of such elements, may be essentially identical or similar to similarly named, numbered, placed, or functioning elements of the SROM machine 10, except as otherwise understood by a person of skill in the art based on discussion herein and/or FIGS. 45-50.

Figure 45:
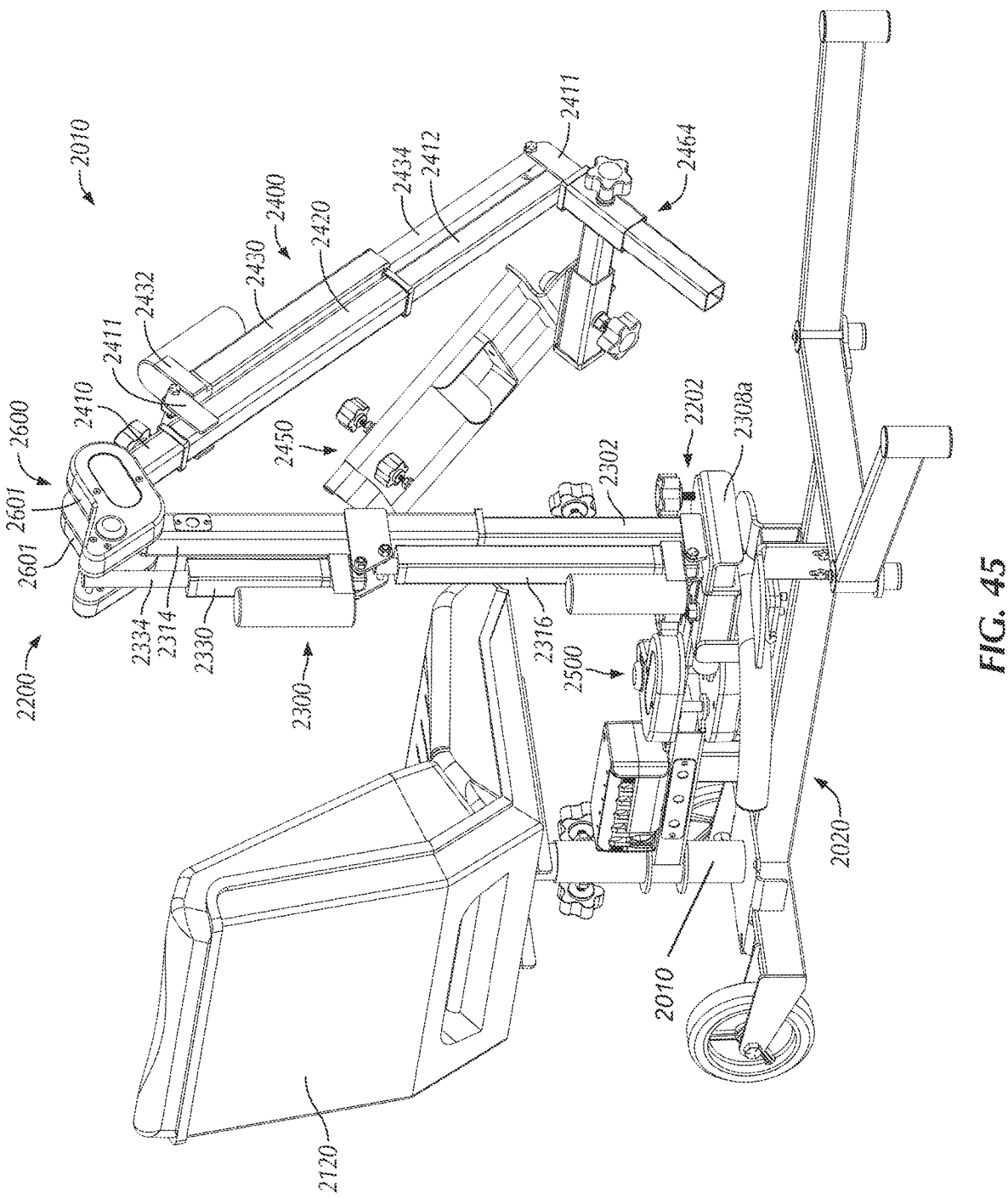
FIG. 45 is a right rear perspective view of a second embodiment of an SROM machine.
Figure 46:
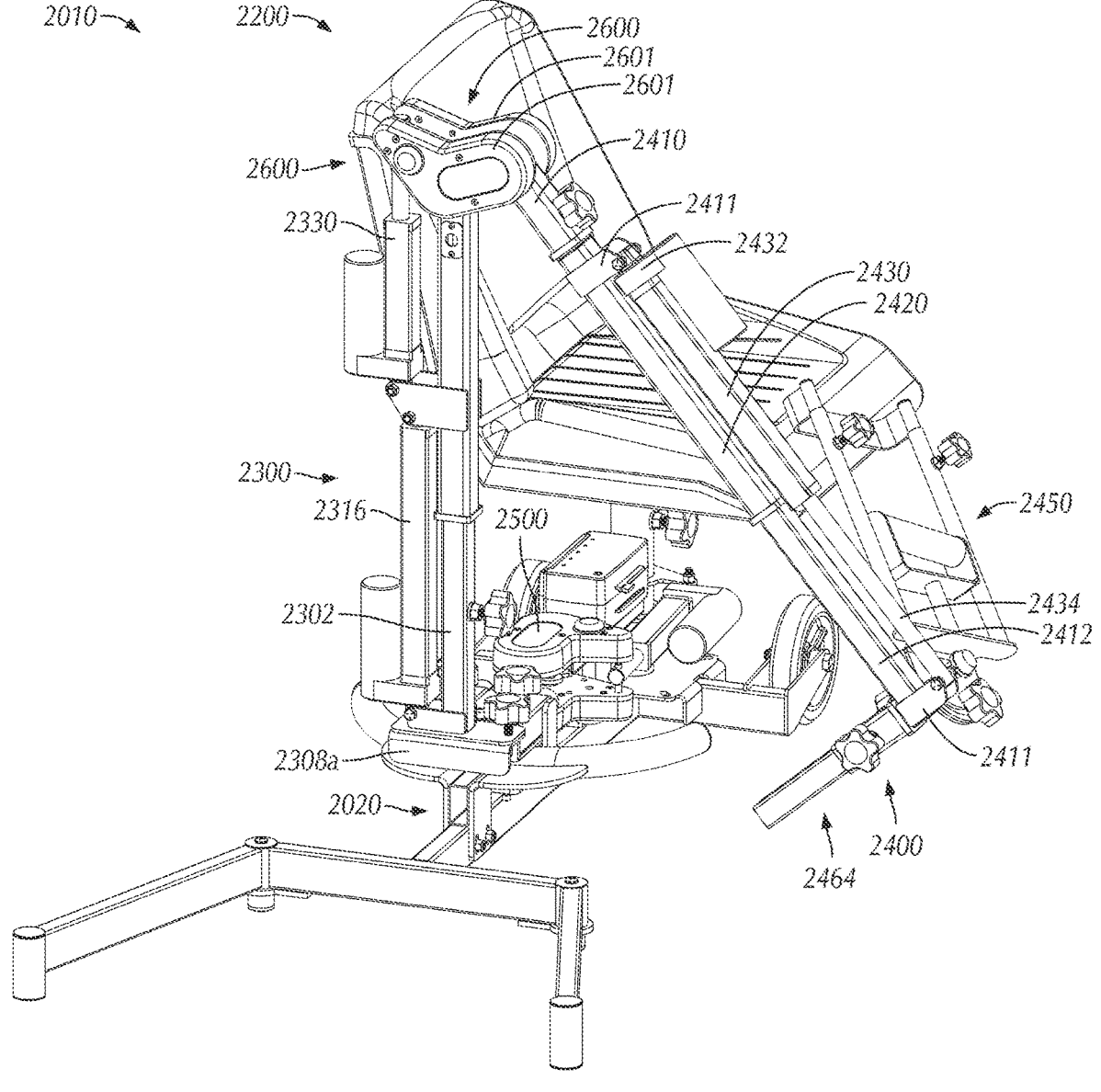
FIG. 46 is a right front perspective view of the SROM machine of FIG. 45.
Figure 48:
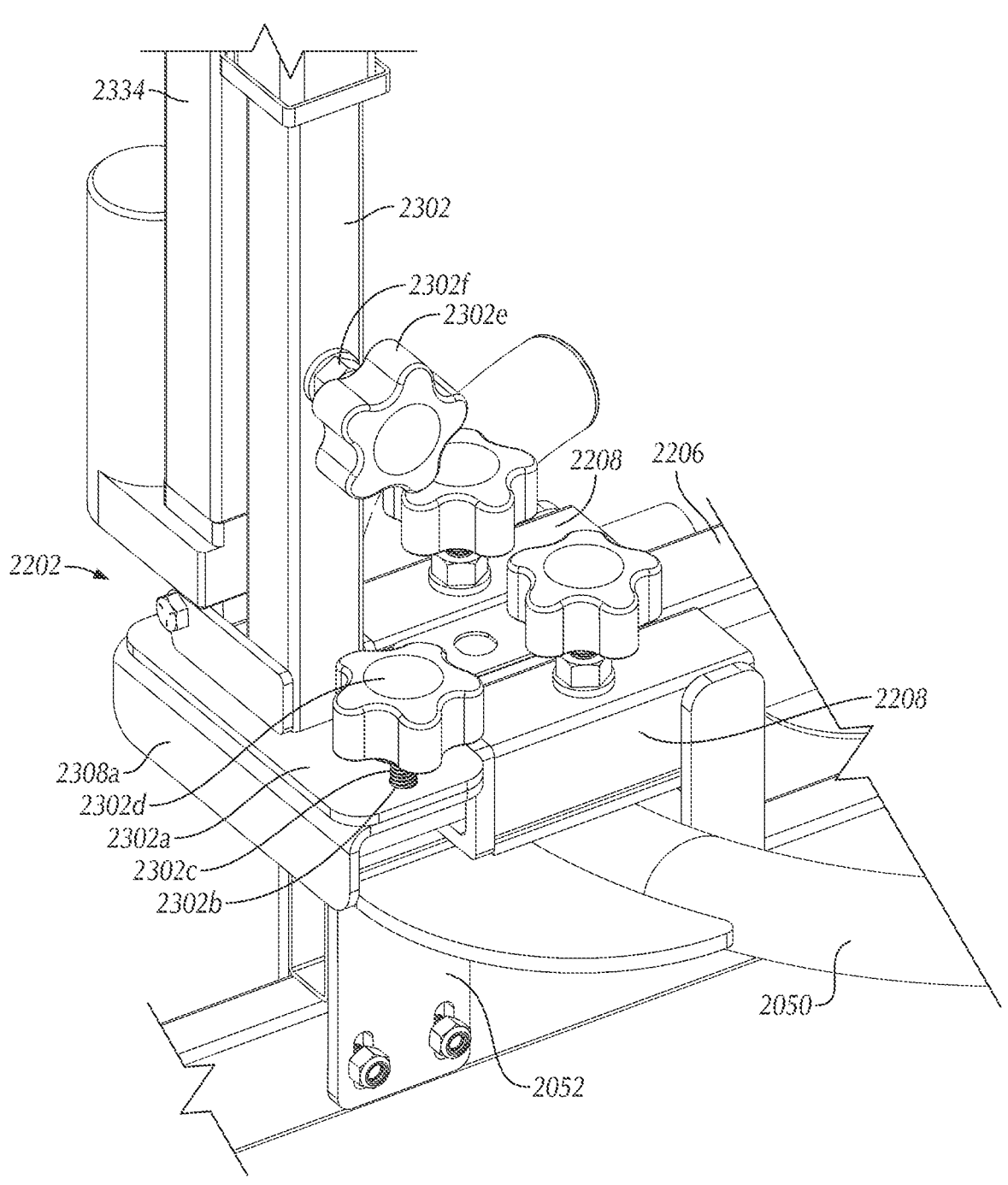
FIG. 48 is a front perspective detail view of a shoulder-manipulation mechanism supported on a stationary base frame of the SROM machine of FIG. 45.
Figure 49:
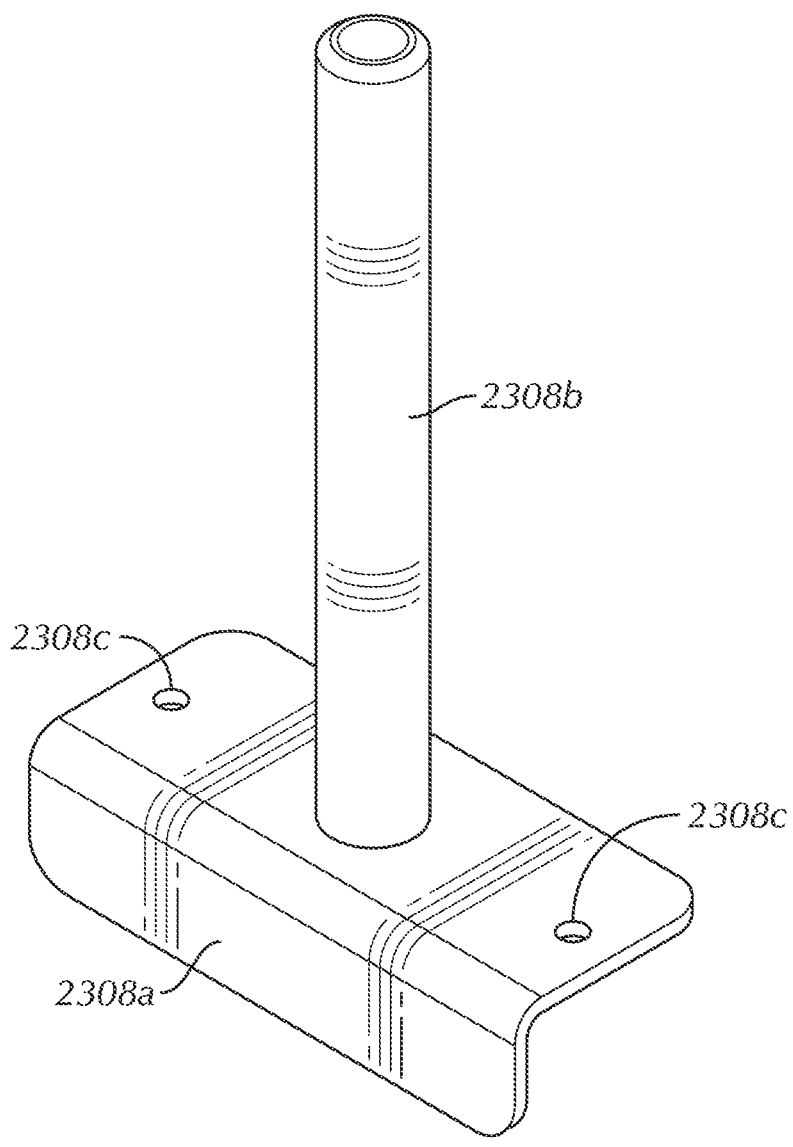
FIG. 49 is a portion of a structural member for supporting the shoulder-manipulation mechanism on the stationary base frame of the SROM machine of FIG. 49.

For example, referring to FIGS. 45, 46, and 49, in the SROM machine 2010, the vertical support 2300 may be supported on the stationary base frame 2020 by a structure distinct from the comparable structure of the SROM machine 10 discussed above. Referring particularly to FIG. 48, the vertical support 2300 may have a lower vertical tube 2302, which may be attached (by welding, adhesive, integral forming, or fasteners) to a horizontal mounting plate 2302a. The horizontal mounting plate 2302a may be supported on the movable base frame 2202 including a central base member 2206 and an indexing member 2208 (two are shown). The movable base frame 2202 may be movably supported on a support rail 2050, support brackets 2052, 2054, and ultimately on the stationary base frame 2020. The horizontal mounting plate 2302a may have a hole 2302b for engaging a fixation bolt 2302c, which may have a knob 2302d attached thereto. The horizontal mounting plate 2302a in turn may be supported on a support plate 2308a (FIG. 49), which may have a vertical support member 2308b fixed thereto and extending upwardly therefrom, the vertical support member being adapted to telescopically engage the lower vertical tube 2302. The horizontal support plate 2308a may have a pair of holes such as threaded holes 2308c, which may be symmetrically located 180 degrees apart with respect to the vertical support member 2308b. The hole 2302b in the mounting plate 2302a may alternatively be alignable with each of the two threaded holes 2308c in the horizontal support plate 2308a, allowing the horizontal mounting plate 2302a to engage and be fixed via the fixation bolt 2302c to the horizontal support plate 2308a in either of opposite orientations with respect to a vertical axis and with respect to the vertical support member 2308. The result of this arrangement provides for two positions of the vertical support 2300, with the positions being comparable to the orientations discussed above with respect to the vertical support 300. The vertical support 2300 may be rotated 180 degrees and reattached to the movable base frame 2202 and secured via the fixation bolt 2302c and the knob 2302d. A knob 2302e attached to a bolt (not shown) may pass through a threaded fitting 2302f (a bolt fixed to the lower vertical tube 2302 in this embodiment) to secure the vertical support 2300 to the vertical support member 2308b, which is telescopically received in the lover vertical tube 2302. By this arrangement, the vertical support 2300 may be releasably securable or attached to allow the SROM machine 10 to transition between a right-arm configuration suitable to engage the right arm of the user to manipulate the right shoulder of the user, and a left-arm configuration suitable to engage the left arm of the user to manipulate the left shoulder of the user. This transition may be accomplished while leaving the vertical support member 2300 vertically supported on the movable base frame 2202, without requiring an operator to lift the vertical support member 2300 to make the transition. Thus the SROM machine 2010 may be configured to manipulate either the right arm and shoulder or the left arm and shoulder of a user.

Figure 50:
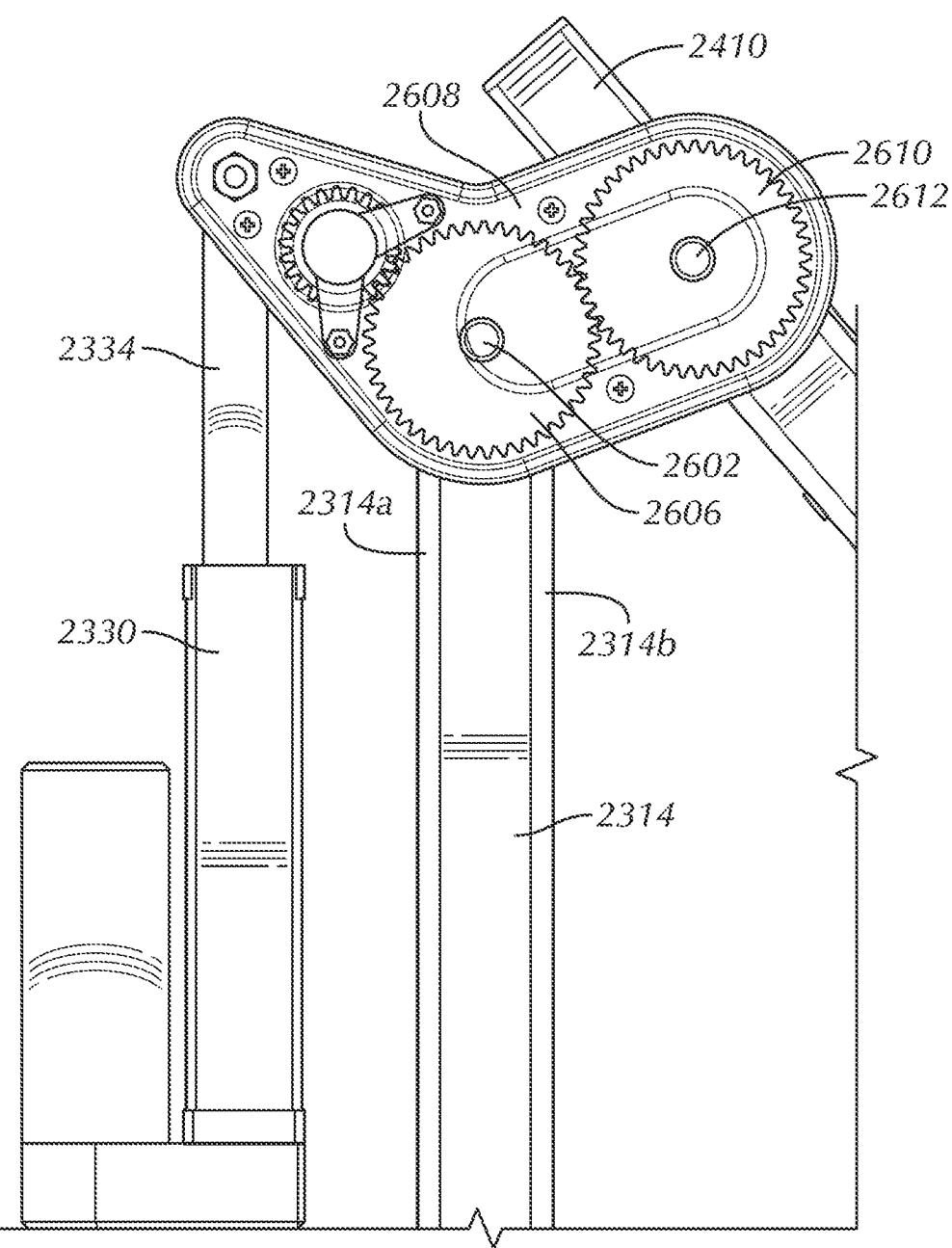
FIG. 50 is a right elevational partial cutaway view of an upper geared hinge connecting a vertical support, a linear actuator, and the arm-carrier base of the arm-carrier support of the SROM machine of FIG. 45.

As another example, referring to FIGS. 45, 46, and 50, in the SROM machine 2010, certain details of the arm-carrier support 2400 and the arm carrier 2450 may differ from the comparable structures of the SROM machine 10 discussed above. The SROM machine 2010 may include the vertical support 2300, which in turn may include an upper vertical tube 2314 (FIG. 50), a lower vertical tube 2302, an arm-support-length linear actuator 2316, and arm-angle linear actuator 2330, and an upper geared hinge 2600 with a cover 2601. The upper geared hinge 2600 may differ from the upper geared hinge 600 of the SROM machine 10 discussed above. The upper geared hinge may be configured in similar fashion to the previously described lower geared hinge 500. The upper geared hinge 2600 may comprise a main shaft 2602, which may be non-rotatably attached to the upper vertical tube 2314 by being non-rotatably attached to, for example, the main shaft 2602, which may in turn be attached to the upper vertical tube 2314 by a pair of collars (not shown) similar to the collars 604 described above. If present, the collars may be non-rotatably fixed to the upper end (not shown) of the upper vertical tube 2314 as described above. The upper geared hinge 2600 may include a sun gear 2606. Two sun gears 2606 may be provided (one is visible), each preferably having the same radius. Each sun gear 2606 may be non-rotatably attached to respective ends of the main shaft 2602, with the result being that the sun gears 2606 are non-rotatably attached to the upper vertical tube 2314. The upper geared hinge 2600 also may include a carrier plate 2608, which may be rotatably attached to the main shaft 2602. Two carrier plates 2608 (one is shown) may be disposed in parallel and spaced relation to one another and are connected to rotate together about the main shaft 2602. Together the carrier plates 2608 may be considered to form a carrier body. Each carrier plate 2608 may be connected to the upper end 2334 of the arm-carrier-angle linear actuator 2330, with the location of the connection being offset from the main shaft 2602 so that extension or contraction of the arm-carrier-angle linear actuator 2330 rotates the carrier plates 2608 about a main horizontal axis MH (see FIG. 36) of the main shaft 2602, with the main horizontal axis MH being oriented generally horizontally. A planet shaft 2612 may extend between the carrier plates 2608 and may be rotatably mounted with respect thereto. The planet shaft 612 may hold the carrier plates 608 in spaced relation to one another; alternatively, another structural element may be employed to do so. A planet gear 2610 (one is shown; two may be provided and may be of the same radius) are non-rotatably mounted with respect to the planet shaft 2612 and thus are non-rotatably mounted with respect to each other. Each planet gear 2610 may be engaged with and meshes with a corresponding one of the sun gears 2606 mounted on a corresponding side of the upper vertical tube 2314.

The arm-carrier support 2400 may have an arm-carrier base 2410, which also may be non-rotatably mounted to the planet shaft 2612 by a pair of collars (not shown) similar to the collars 604 (discussed above) and may be welded or otherwise fixed to the collars. The upper end 2334 of the arm-carrier-angle linear actuator 2330 may be pivotably attached to the carrier plates 2608 of the upper geared hinge 2600. When the arm-carrier-angle linear actuator 2330 extends or contracts, the force of the arm-carrier-angle linear actuator 2330, acting at a distance from the main shaft 2602, may result in a torque causing the carrier plates 2608 to rotate about the main shaft 2602; and the meshing of the sun gears 2606 with the planet gears 2610 may cause the planet gears 2610, the planet shaft 2612, the arm-carrier base 2410, and as a result the arm-carrier support 2400 to rotate about a planet horizontal axis PH (see FIG. 36) of the planet shaft 2612, with the planet horizontal axis PH being oriented essentially horizontally. The planet shaft 2612, in addition to rotating about the planet horizontal axis PH, may also move in a radial path (the radius thereof being the sum of the radii of the sun gears 2606 and the planet gears 2610) about the main horizontal axis MH, providing an additional component of movement of the arm-carrier support 2400 as compared to a pure rotational movement; this movement may be analogous to the movement of a human shoulder during an abduction or adduction movement.

The geared hinge 2600 may be mounted with each sun gear 2606 essentially aligned with the upper vertical tube 2314. Referring to FIG. 50, a connection point between the arm-carrier-angle linear actuator 2330 and each carrier plate 2608 may be located rearwardly or toward a rear side 2314a of the upper vertical tube 2314, and the planet shaft 2612 may be mounted to each carrier plate 2608 on frontwardly or toward an opposite front side 2314b of the upper vertical tube 2314. The geared hinge 2600 may have a limited range of motion, with the result being that the arm-carrier support 2400 may be movable with respect to the upper vertical tube 2314 in a plane oriented to the front side of the upper vertical tube 2314. To manipulate an arm of the user, the seat 2120 and the upper vertical tube 2314 may be oriented so that the front side 2314b of the upper vertical tube 2314 faces the same direction as a user facing forward in the seat 2120 (or anteriorly with respect to the user).

Figure 47:
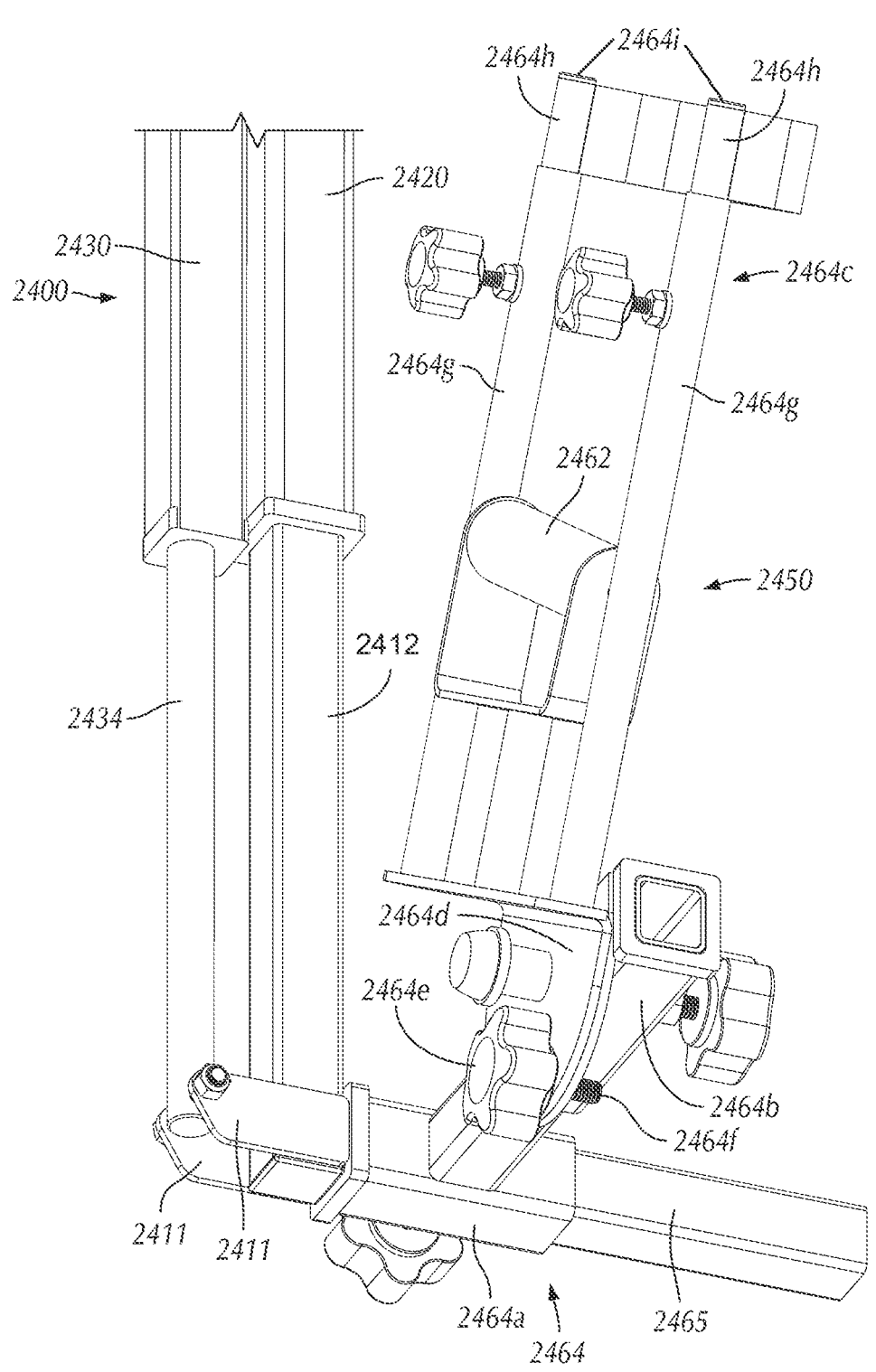
FIG. 47 is left perspective detail view of an arm carrier and a portion of an arm-carrier support of the SROM machine of FIG. 45.

As another example, referring to FIGS. 45-47, in the SROM machine 2010, the arm-carrier support 2400 and the arm carrier 2450 may be distinct from the comparable structures of the SROM machine 10 discussed above. The arm-carrier support 2400 may include a fixed base 2420 engaged with the arm-carrier base 2410 and with an inner tube 2412. A reach-movement linear actuator 2430 with a proximal portion 2432 and a distal portion 2434 may be disposed generally parallel to the fixed base 2420 and the inner tube 2412 and connected thereto by connection plates 2411 so as to extend and retract the inner tube 2412 telescopically with respect to the fixed base 2420. Upon an extension or contraction of the reach-movement linear actuator 2430, the inner tube 2412 may slide telescopically with respect to the fixed base 2420 and thereby cause a change of length of the arm-carrier support 2400 and a change of position of the arm carrier 2450. The arm carrier 2450 may be adjustably secured to the arm-carrier support 2400 and in particular may be adjustably secured to the inner tube 2412 in order to provide axial movement of the arm carrier 2450 with respect to the fixed base 2420 as a result of extension and contraction of the reach-movement linear actuator 2430. The arm carrier 2450 may be simplified and may omit or not require the axial base 452 and the connector linkage 453 of the SROM machine 10 discussed above.

Continuing to refer to FIGS. 45-47, the arm carrier 2450 may include a handgrip 2462. The handgrip 2462 may be slidably and releasably attached to a distal end of the arm-carrier support 2400 by a handgrip mount 2464. The handgrip mount 2464 may include a transverse base 2465 extending transversely with respect to the arm-carrier support 2400 in a first direction perpendicular to, and generally below, the arm-carrier support 2400 when the arm-carrier support 2400 is in a generally horizontal orientation. The handgrip mount 2464 may include a slidable base 2464a, which may be releasably secured to the transverse base 2465 for axial movement along the transverse base 2465. A transverse extension 2464b may extend from the slidable base 2464a and may support the handgrip 2462 in spaced relation with respect to the transverse base 2465. The transverse extension 2464b may extend transversely with respect to both the inner tube 2412 of the arm-carrier support 2400 (and other elements parallel thereto) and the transverse base 2465, generally proximally with respect to the user when in use. A handgrip support frame 2464c may be supported and may be rotatably supported on the transverse extension 2464b by a releasably securable pivotable body 2464d securable by action of a knob 2464e and a bolt (not shown) to a base plate 2464f. The handgrip support frame 2464c may include a pair of parallel outer legs 2464g, each of which may engage a pair of securably telescoping inner legs 2464h, which in turn may support an elbow rest 2464i extending therebetween.

Connected to the second transverse extension 2464d may be a support element, for example, a handgrip support post 2464e. The handgrip support post 2464e or other support element may extend generally parallel to the axial base 2452. A handgrip frame 2464f may support the handgrip 2462 and may be rotatably mounted with respect to the handgrip support post 2464e, or the handgrip support post 2464e may be rotatably mounted with respect to the transverse extension 2464d, or the handgrip 2462 may be otherwise rotatably mounted to give the user a degree of rotatability of the wrist of the user in grasping the handgrip 2462. The handgrip 2462 of the handgrip frame 2464f may be pivotably attached to the handgrip mount 2464. The handgrip 2462 thus may be supported in a manner to offset the handgrip 2462 from the axial base 2452 while supporting the handgrip 2462 in a manner providing a degree of rotatability of the handgrip 2462. The handgrip mount 2464 may be simplified; for example, the second slidable base 2464c may be omitted, with the second transverse extension 2464d being fixed to the transverse extension 2464b. Alternatively, a single extension may support the handgrip frame 2464f or the handgrip 2464 and may be configured to provide a three-dimensional offset as provided by the transverse extension 2464b and the second transverse extension 2464d. These adjustments may be used to adapt the position of the arm carrier 2450 to the anatomy of the user, and/or to adjust the maximum and minimum distances between the shoulder of the user and the handgrip 2462.

The operation of the SROM machine 2010 is analogous to the operation of the SROM machine 2010. The methods and method steps disclosed above with respect to the SROM machine 10 may also be practiced in analogous fashion using the SROM machine 2010.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

We claim:

1. A shoulder range of motion machine comprising:

a stationary base frame;

a shoulder-manipulation mechanism including: a movable base frame at least pivotably supported on the stationary base frame for at least pivoting motion with respect to the stationary base frame about a main vertical axis;

a horizontal linear actuator having a proximal portion and a distal portion, the proximal portion secured to the stationary base frame, and the distal portion attached to the movable base frame and configured to drive the movable base frame in at least pivoting motion with respect to the stationary base frame about the main vertical axis;

a vertical support mounted on the movable base frame and extending vertically with respect thereto;

an arm-carrier support at least pivotably mounted on the vertical support for at least pivoting motion with respect to the vertical support about a main horizontal axis;

an arm-carrier-angle linear actuator having a lower end portion and an upper portion, the lower end portion secured to the vertical support, and the upper portion attached to the arm-carrier support and configured to drive the arm-carrier support in at least pivoting motion with respect to the vertical support about the main horizontal axis; and an arm carrier mounted on the arm-carrier support; and a controller operatively connected to at least one of the horizontal linear actuator or the arm-carrier-angle linear actuator to control extension and contraction thereof, the shoulder-manipulation mechanism further comprising: an upper geared hinge at least pivotably connecting the arm-carrier support to the vertical support the upper geared hinge including:

a main shaft non-rotatably attached to the vertical support;

a first sun gear non-rotatably attached to the main shaft;

a carrier body rotatably attached to the main shaft;

a planet shaft rotatably mounted with respect to the carrier body; and a first planet gear non-rotatably mounted with respect to the planet shaft to rotate together with the planet shaft;

wherein the first sun gear and the first planet gear mesh and cooperate to be drivingly connected to provide a first phase of movement of the arm-carrier support with respect to the vertical support, wherein the upper geared hinge further comprises: a second sun gear non-rotatably attached to the main shaft; and a second planet gear non-rotatably mounted with respect to the planet shaft to rotate together with the planet shaft;

wherein the first sun gear and the first planet gear mesh and cooperate to be drivingly connected to provide a first phase of movement of the arm-carrier support with respect to the vertical support, and wherein the second sun gear and the second planet gear mesh and cooperate to be drivingly connected to provide a second phase of movement of the arm-carrier support with respect to the vertical support.

2. The shoulder range of motion machine of claim 1, wherein the first planet gear has a first-planet-gear toothed portion having a radius and extending less than 30 degrees with respect to the planet shaft, the first-planet-gear toothed portion engaging and meshing with a first-sun-gear toothed portion of the corresponding first sun gear, the first-sun-gear toothed portion having a radius, wherein the first-planet-gear toothed portion and the first-sun-gear toothed portion engage and mesh for less than 30 degrees of rotation of the first planet gear from a lowered position to provide the first phase of movement of the arm-carrier support with respect to the vertical support;

wherein upon the planet shaft completing less than 30 degrees of partial rotation from the lowered position, further relative rotation of the first planet gear and the first sun gear causes the first-planet-gear toothed portion and the first-sun-gear toothed portion to disengage; and wherein as the first-planet-gear toothed portion and the first-sun-gear toothed portion disengage, a second-planet-gear toothed portion of the second planet gear engages and meshes with a second-sun-gear toothed portion of the second sun gear, so that the second planet gear cooperates with the second sun gear to provide the second phase of movement of the arm-carrier support with respect to the vertical support.

3. The shoulder range of motion machine of claim 2, wherein at least one of the first planet gear or the first sun gear is a mutilated gear, and at least one of the second planet gear or the second sun gear is a mutilated gear.

4. The shoulder range of motion machine of claim 2, further comprising:

a lower geared hinge at least pivotably connecting the movable base frame to the stationary base frame, the lower geared hinge including:

a main shaft non-rotatably attached to the stationary base frame;

a sun gear non-rotatably attached to the main shaft;

a carrier body rotatably attached to the main shaft;

a planet shaft rotatably mounted with respect to the carrier body;

a planet gear non-rotatably mounted with respect to the planet shaft to rotate together with the planet shaft;

wherein the sun gear and the first planet gear mesh and cooperate to be drivingly connected to provide at least pivoting movement of the movable base frame with respect to the stationary base frame.

5. The shoulder range of motion machine of claim 4, further comprising:

a support post attached to the stationary base frame; and a seat rotatably supported by the support post on the stationary base frame.

6. The shoulder range of motion machine of claim 4, wherein the movable base frame comprises a tubular base member slidably and lockably engaging an indexing member, and wherein the vertical support is supported on the indexing member so that sliding the indexing member with respect to the tubular base member alters a position of the vertical support with respect to the main vertical axis of rotation.

7. The shoulder range of motion machine of claim 1, wherein the first planet gear has a first-planet-gear toothed portion having a radius and extending about 30 degrees with respect to the planet shaft, the first-planet-gear toothed portion engaging and meshing with a first-sun-gear toothed portion of the corresponding first sun gear, the first-sun-gear toothed portion having a radius, wherein the first-planet-gear toothed portion and the first-sun-gear toothed portion engage and mesh for about 30 degrees of rotation of the first planet gear from a lowered position to provide the first phase of movement of the arm-carrier support with respect to the vertical support;

wherein upon the planet shaft completing about 30 degrees of partial rotation from the lowered position, further relative rotation of the first planet gear and the first sun gear causes the first-planet-gear toothed portion and the first-sun-gear toothed portion to disengage; and wherein as the first-planet-gear toothed portion and the first-sun-gear toothed portion disengage, a second-planet-gear toothed portion of the second planet gear engages and meshes with a second-sun-gear toothed portion of the second sun gear, so that the second planet gear cooperates with the second sun gear to provide the second phase of movement of the arm-carrier support with respect to the vertical support.

8. The shoulder range of motion machine of claim 7, wherein at least one of the first planet gear or the first sun gear is a mutilated gear, and at least one of the second planet gear or the second sun gear is a mutilated gear.

9. The shoulder range of motion machine of claim 1, further comprising:

a lower geared hinge at least pivotably connecting the movable base frame to the stationary base frame, the lower geared hinge including:

a main shaft non-rotatably attached to the stationary base frame;

a sun gear non-rotatably attached to the main shaft;

a carrier body rotatably attached to the main shaft;

a planet shaft rotatably mounted with respect to the carrier body;

a planet gear non-rotatably mounted with respect to the planet shaft to rotate together with the planet shaft;

wherein the sun gear and the first planet gear mesh and cooperate to be drivingly connected to provide at least pivoting movement of the movable base frame with respect to the stationary base frame.

10. The shoulder range of motion machine of claim 9, further comprising:

a support post attached to the stationary base frame; and a seat rotatably supported by the support post on the stationary base frame.

11. The shoulder range of motion machine of claim 9, wherein the movable base frame comprises a tubular base member slidably and lockably engaging an indexing member to provide length adjustment of the movable base frame, and wherein the vertical support is supported on the indexing member so that sliding the indexing member with respect to the tubular base member alters a position of the vertical support with respect to the main vertical axis of rotation.

12. The shoulder range of motion machine of claim 9, wherein the vertical support comprises a lower portion mounted to the movable base frame, and the vertical support further comprises an upper portion movably engaged with the lower portion; and wherein an arm-support-length linear actuator is attached to the lower portion and the upper portion and configured to extend or retract the upper portion with respect to the lower portion, thereby extending or contracting the vertical support to align the arm-carrier support at a selected height.

13. The shoulder range of motion machine of claim 1, wherein the vertical support is configured to be removably securable in a first orientation and a second orientation with respect to the movable base frame, the first orientation and the second orientation differing in being rotated with respect to a vertical axis by 180 degrees, so that the vertical support and the arm-carrier support together may be selectably placed in the first orientation or the second orientation.

14. The shoulder range of motion machine of claim 13, wherein the arm carrier is configured to be removably securable in a first orientation and a second orientation with respect to the arm-carrier support, the first orientation and the second orientation differing in being rotated with respect to the arm-carrier support by 180 degrees, so that the arm carrier may be selectably placed in the first orientation or the second orientation.

15. The shoulder range of motion machine of claim 1, wherein the vertical support is configured to be securable in a first orientation and a second orientation with respect to the movable base frame, the first orientation and the second orientation differing in being rotated with respect to a vertical axis by 180 degrees, so that the vertical support and the arm-carrier support together may be selectably placed in the first orientation or the second orientation, and wherein the vertical support is configured to be rotatable from the first orientation to the second orientation with the vertical support remaining supported on the stationary base frame.

16. The shoulder range of motion machine of claim 1, wherein the arm carrier is configured to be removably securable in a first orientation and a second orientation with respect to the arm-carrier support, the first orientation and the second orientation differing in being rotated with respect to the arm-carrier support by 180 degrees, so that the arm carrier may be selectably placed in the first orientation or the second orientation.

17. The shoulder range of motion machine of claim 1, wherein the vertical support comprises a lower portion mounted to the movable base frame, and the vertical support further comprises an upper portion movably engaged with the lower portion; and wherein an arm-support-length linear actuator is attached to the lower portion and the upper portion and configured to extend or retract the upper portion with respect to the lower portion, thereby extending or contracting the vertical support to align the arm-carrier support at a selected height.

18. The shoulder range of motion machine of claim 1, wherein the arm-carrier support further comprises:

an axially fixed member;

an axially movable member movably attached to the axially fixed member;

a reach-movement linear actuator configured to move the axially movable member with respect to the axially fixed member, wherein the arm carrier is operatively connected to the axially movable member to move with the axially movable member.

\* \* \* \* \*